United States Patent
Finlayson et al.

(10) Patent No.: US 7,365,747 B2
(45) Date of Patent: Apr. 29, 2008

(54) METHODS AND SYSTEMS FOR CONTROLLING AN IMAGE GENERATOR TO DEFINE, GENERATE, AND VIEW GEOMETRIC IMAGES OF AN OBJECT

(75) Inventors: John W. Finlayson, Renton, WA (US); Dean J. Rumpza, Sumner, WA (US); Kevin D. Puterbaugh, Auburn, WA (US); Richard L. Goettling, Edmonds, WA (US); David C. Goodrich, Kent, WA (US); Neal R. Keklen, Weatherford, TX (US); Michael L. Yoder, Seattle, WA (US)

(73) Assignee: The Boeing Company, Chicago, IL (US)

( * ) Notice: Subject to any disclaimer, the term of this patent is extended or adjusted under 35 U.S.C. 154(b) by 539 days.

(21) Appl. No.: 11/006,801

(22) Filed: Dec. 7, 2004

(65) Prior Publication Data

US 2006/0119601 A1 Jun. 8, 2006

(51) Int. Cl.
*G06T 15/20* (2006.01)
(52) U.S. Cl. .................. 345/427; 345/419; 345/420
(58) Field of Classification Search ............... 345/419, 345/427, 420
See application file for complete search history.

(56) References Cited

OTHER PUBLICATIONS

McNab, A. et al., "Role of 3-D Graphics in NDT Data Processing", IEEE Proceedings: Science, Measurement and Technology, IEE, Stevenage, Herts, GB, vol. 148, No. 4, Jul. 3, 2001, pp. 149-158, XP006017099.
Berta J, "Integrating VR and CAD", IEEE Computer Graphics and Applications, IEEE USA, vol. 19, No. 5, Sep. 1999.

*Primary Examiner*—Kimbinh T. Nguyen
(74) *Attorney, Agent, or Firm*—Lee & Hayes, PLLC

(57) ABSTRACT

Methods, systems, and articles of manufacture consistent with the present invention allow a user operating on a data processing computer to view geometry of an object model produced by an image generator hosted on an image processing computer by allowing the user to define a zone associated with the object model, slices of each zone, and viewpoints associated with the slices, controlling the graphics image generator to produce geometric images of the object model in accordance with the zone, slices, and viewpoints, and selectively navigating the images in accordance with the zone, slices, and viewpoints.

132 Claims, 57 Drawing Sheets

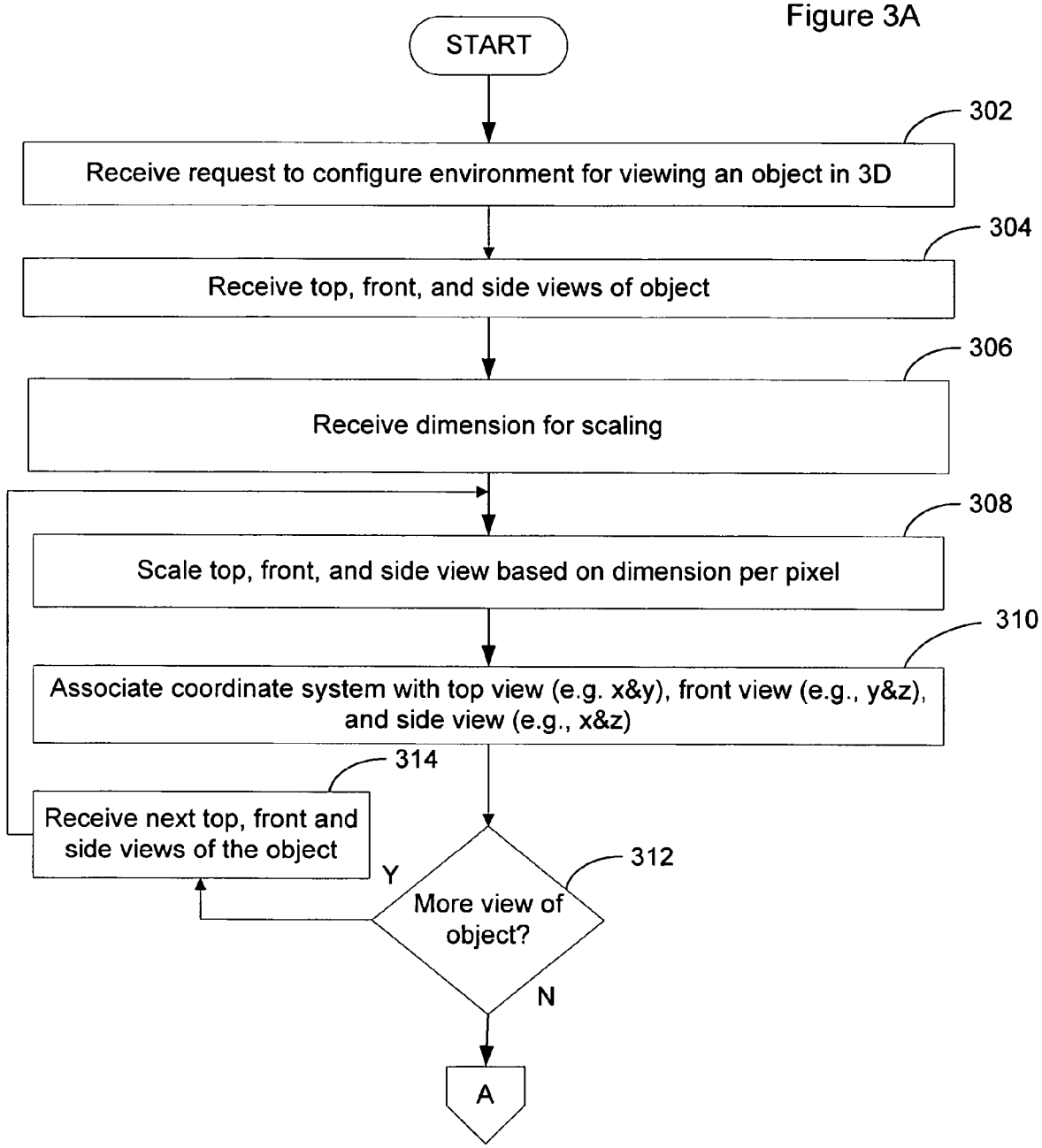

Figure 7

```
                                    ,-702
PIC TOP_1 777-200_top1.jpg
PIC TOP_2 777-200_top2.jpg ───── 708
PIC TOP_3 777-200_top3.jpg ───── 710
PIC SIDE_1 777-200_side1.jpg ──── 704
PIC SIDE_2 777-200_side2.jpg ──── 712
PIC SIDE_3 777-200_side3.jpg ──── 714
PIC FRONT_1 777-200_front1.jpg ── 706
DOT dotpat1.txt  ⎫
DOT dotpat2.txt  ⎬  716
DOT dotpat3.txt  ⎪
DOT dotpat4.txt  ⎭
BOG 1 5000 0
```

|  | 1338 1324 | | 1326 | | 1328 1330 1332 1334 1340 | | | | | 1528 1530 1532 1534 1536 1538 1540 1542 1544 | | | | | | | | |
|---|---|---|---|---|---|---|---|---|---|---|---|---|---|---|---|---|---|---|
| 1502 | z001, | 50, | 50, | 254.5, | 254, | -150, | 150, | 50, | 380, | NOSE, | 0, | 0, | 429, | 429, | 214, | 195, | 20, | 390, | 390 |
| 1504 | z002, | 200, | 200, | 300, | 300, | -150, | 150, | 50, | 380, | F254, | 20, | 0, | 454, | 454, | 247, | 195, | 10, | 390, | 390 |
| 1506 | z003, | 254.5, | 254, | 655, | 655, | -150, | 150, | 50, | 380, | S41, | 195, | 0, | 520, | 520, | 455, | 195, | 20, | 390, | 390 |
| 1508 | z004, | 600, | 600, | 700, | 700, | -150, | 150, | 50, | 380, | F655, | 450, | 2, | 416, | 416, | 658, | 195, | 15, | 390, | 390 |
| 1510 | z005, | 655, | 655, | 1035, | 1035, | -150, | 150, | 50, | 380, | S43, | 598, | 0, | 494, | 494, | 845, | 195, | 20, | 390, | 390 |
| 1512 | z006, | 975, | 975, | 1075, | 1075, | -150, | 150, | 50, | 380, | F1035, | 810, | 0, | 430, | 430, | 1025, | 195, | 20, | 390, | 390 |
| 1514 | z007, | 1035, | 1035, | 1434, | 1434, | -150, | 150, | 50, | 380, | S44, | 976, | 0, | 518, | 518, | 1235, | 195, | 20, | 390, | 390 |
| 1516 | z008, | 1375, | 1375, | 1475, | 1475, | -150, | 150, | 50, | 380, | F1434, | 1200, | 0, | 492, | 492, | 1446, | 195, | 20, | 390, | 390 |
| 1518 | z009, | 1434, | 1434, | 1832, | 1832, | -150, | 150, | 50, | 380, | S46, | 1374, | 0, | 518, | 518, | 1633, | 195, | 20, | 390, | 390 |
| 1520 | z010, | 1775, | 1775, | 1875, | 1875, | -150, | 150, | 50, | 380, | F1832, | 1610, | 0, | 430, | 430, | 1825, | 195, | 20, | 390, | 390 |
| 1522 | z011, | 1832, | 1832, | 2150, | 2150, | -150, | 150, | 50, | 380, | S47, | 1776, | 0, | 430, | 430, | 1991, | 195, | 20, | 390, | 390 |
| 1524 | z012, | 2100, | 2100, | 2200, | 2200, | -150, | 150, | 50, | 350, | F2150, | 1955, | 5, | 390, | 390, | 2150, | 195, | 5, | 390, | 390 |
| 1526 | z013, | 2150, | 2150, | 2570, | 2570, | -150, | 150, | 50, | 380, | S48, | 2087, | 0, | 546, | 546, | 2360, | 195, | 20, | 390, | 390 |

```
#Get Geometry Using Query File
ExecuteQuery  z001.fq
#Apply a statefile without changing the geometry loaded
LoadStateFileNoGeometry    ztopiz001.fi
LoadSplineFile    ztop.fs
#Choose the image type desired.  r = rgb, j = jpeg, m= mov.
EnableImageText                    0
#Apply the image size
SetImageSize    800   800
SetImageOutputType      j
#Output directory and file prefix
SetImageOutputPrefix       zones/ztop/zbgz001
#Generate images
GenerateImageSequence

#Apply statefile
LoadStateFileNoGeometry    zziz001.fi
LoadSplineFile    zziz001.fs
#Choose the file type desired.  r = rgb, j = jpeg, m= mov.
EnableImageText                    0
#Apply the image size
SetImageSize    800   800
SetImageOutputType      j
#Output directory and file prefix
SetImageOutputPrefix       zones/ztop/zziz001
#Generate images
GenerateImageSequence

#Apply statefile
LoadStateFileNoGeometry    zsiz001.fi
#Load a spline file
LoadSplineFile    zsiz001.fs
#Choose the image type desired.  r = rgb, j = jpeg, m= mov.
EnableImageText                    0
SetImageOutputType j
#output directory and file prefix
SetImageOutputPrefix       zones/z001/sliceimages/zSI
#Apply the image size
SetImageSize    800   800
#Generate images
GenerateImageSequence LoadStateFileNoGeometry    z001.fi
LoadSplineFile    z001.fs
#Choose the image type desired.  r = .rgb, j = .jpeg, m= .mov.
SetImageOutputType      j
#Output directory and file prefix
SetImageOutputPrefix       zones/z001/cubes/c
#Apply the image size
SetImageSize    800   800
EnableImageText                    1
#Generate images
GenerateImageSequence
```

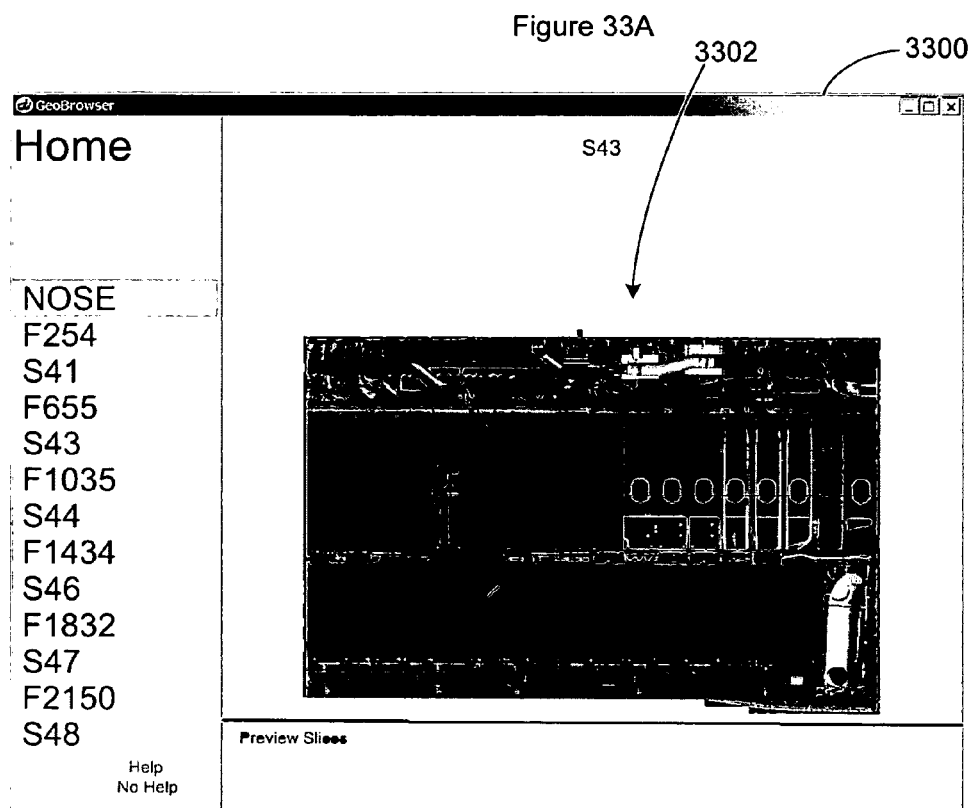
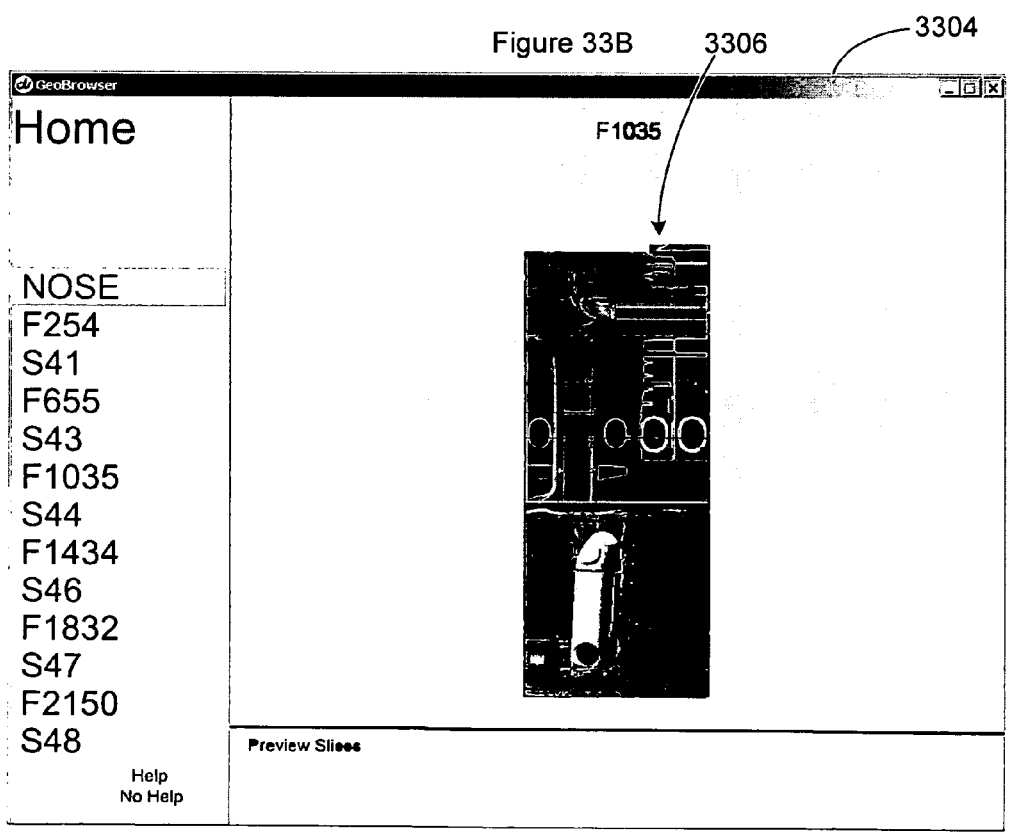

| 1338 | | | | 3704 | 1704 1914 | 1916 | 3706 | 3708 | 3710 | 3712 3714 | 3716 3718 | 3720 |
|---|---|---|---|---|---|---|---|---|---|---|---|---|
| z001 | 6 | 50 | 50 | 0 | 0 | 50 | -50 | 150 | 3 | 9999 | 1 | 9999 | 1 | 9 | 0 | 9999 |
| z001 | 6 | 50 | 50 | 0 | 1 | 50 | -50 | 200 | 4 | 9999 | 2 | 0 | 1 | 10 | 0 | 9999 |
| Z001 | 6 | 50 | 50 | 0 | 2 | 50 | -50 | 250 | 5 | 9999 | 9999 | 1 | 1 | 11 | 0 | 9999 |
| z001 | 6 | 50 | 50 | 0 | 3 | 50 | 0 | 150 | 6 | 0 | 1 | 9999 | 1 | 12 | 0 | 9999 |
| z001 | 6 | 50 | 50 | 0 | 4 | 50 | 0 | 200 | 7 | 1 | 2 | 0 | 1 | 13 | 0 | 9999 |
| z001 | 6 | 50 | 50 | 0 | 5 | 50 | 0 | 250 | 8 | 2 | 9999 | 1 | 1 | 14 | 0 | 9999 |
| z001 | 6 | 50 | 50 | 0 | 6 | 50 | 50 | 150 | 9999 | 3 | 4 | 9999 | 1 | 15 | 0 | 9999 |
| z001 | 6 | 50 | 50 | 0 | 7 | 50 | 50 | 200 | 9999 | 4 | 5 | 3 | 1 | 16 | 0 | 9999 |
| z001 | 6 | 50 | 50 | 0 | 8 | 50 | 50 | 250 | 9999 | 5 | 9999 | 4 | 1 | 17 | 0 | 9999 |
| z001 | 6 | 100 | 100 | 9 | 9 | 100 | -50 | 150 | 12 | 9999 | 10 | 9999 | 2 | 19 | 0 | 0 |
| z001 | 6 | 100 | 100 | 9 | 10 | 100 | -50 | 200 | 13 | 9999 | 11 | 9 | 2 | 18 | 0 | 1 |
| z001 | 6 | 100 | 100 | 9 | 11 | 100 | -50 | 250 | 14 | 9999 | 9999 | 10 | 2 | 25 | 0 | 2 |
| z001 | 6 | 100 | 100 | 9 | 12 | 100 | 0 | 150 | 15 | 9 | 10 | 9999 | 2 | 22 | 0 | 3 |
| z001 | 6 | 100 | 100 | 9 | 13 | 100 | 0 | 200 | 16 | 10 | 11 | 9 | 2 | 21 | 0 | 4 |
| z001 | 6 | 100 | 100 | 9 | 14 | 100 | 0 | 250 | 17 | 11 | 9999 | 10 | 2 | 25 | 0 | 5 |
| z001 | 6 | 100 | 100 | 9 | 15 | 100 | 50 | 150 | 9999 | 12 | 13 | 9999 | 2 | 22 | 0 | 6 |
| z001 | 6 | 100 | 100 | 9 | 16 | 100 | 50 | 200 | 9999 | 13 | 14 | 12 | 2 | 21 | 0 | 7 |
| ⋮ | | | | | | | | | | | | | | | | |
| z013 | 11 | 2600 | 2600 | 369 | 379 | 2600 | 0 | 305 | 384 | 372 | 380 | 374 | 0 | 9999 | 9 | 361 |
| z013 | 11 | 2600 | 2600 | 369 | 380 | 2600 | 0 | 319 | 384 | 372 | 9999 | 379 | 0 | 9999 | 9 | 362 |
| z013 | 11 | 2600 | 2600 | 369 | 381 | 2600 | 15 | 255 | 385 | 376 | 378 | 383 | 0 | 9999 | 9 | 363 |
| z013 | 11 | 2600 | 2600 | 369 | 382 | 2600 | 15 | 280 | 386 | 378 | 379 | 377 | 0 | 9999 | 9 | 364 |
| z013 | 11 | 2600 | 2600 | 369 | 383 | 2600 | 35 | 215 | 9999 | 375 | 385 | 9999 | 0 | 9999 | 9 | 365 |
| z013 | 11 | 2600 | 2600 | 369 | 384 | 2600 | 35 | 315 | 9999 | 379 | 9999 | 386 | 0 | 9999 | 9 | 366 |
| z013 | 11 | 2600 | 2600 | 369 | 385 | 2500 | 50 | 245 | 9999 | 381 | 382 | 383 | 0 | 9999 | 9 | 367 |

METHODS AND SYSTEMS FOR CONTROLLING AN IMAGE GENERATOR TO DEFINE, GENERATE, AND VIEW GEOMETRIC IMAGES OF AN OBJECT

BACKGROUND

The present invention relates to computer graphics, and, more particularly, to methods and systems for defining multiple views of an object, controlling an image generator to produce three-dimensional images in accordance with the views, and selectively navigating between the three-dimensional images.

Engineers of an enterprise typically use conventional computer-aided design (CAD) applications or systems to design and visualize an object, such as a building, car or an airplane, in three-dimensional (3D) images. The CAD system often use hundreds of thousands of polygons (e.g., triangles in three vector coordinate system) or other arithmetically derived structures to reflect the geometry of surfaces, volumes, or elements of the respective object. The conventional CAD system has a visualization system that projects the 3D polygons into a geometric image for display on a two-dimensional video screen. CAD systems also allow the user to change his viewpoint or change the geometry in real time, requiring the CAD system to render new geometric images on the fly in real time As a result, CAD applications are commonly hosted on high speed graphics work stations (such as workstation-class computers available from Sun Microsystems, Inc. or Silicon Graphics, Inc., or PC-type computers with exceptional amounts of memory and/or high-end graphics cards) to enable the CAD applications to process very large amounts of data for generating and displaying the geometric images within a rapid response time. But high speed graphics work stations are often expensive and generally not purchased by an enterprise for project employees other than design engineers. This limits the design review activity to large meetings so that the people are brought to the specialty computing machinery to view the design information. Thus, outside of these meetings, an enterprise typically uses static reproductions of the geometric images to share design information with other employees, partners, or customers.

Conventional methods have been employed for use on low-end common personal computers (e.g., a PC with a 400 mhz to 2400 mhz processor, a 2D graphics card, and minimal or no modems) to produce and dynamically view images from the 3D object data generated by the CAD application. Using this conventional method, individual parts of an object or small assemblies of an object may be viewed in an image that reflects the 3D geometry of the parts or small assemblies. But large or complex systems, such as an aircraft, often require millions of times more data to render a geometric image. This often causes problems to arise when using these conventional methods. The first conventional method converts the geometry of the 3D data into 3D polygon (e.g., triangular geometry) or a program specific proprietary format, and then uses a conventional PC-based viewer (such as a virtual reality modeling language (VRML) viewer, Java 3D viewer or a proprietary viewer) to produce and display an image by rendering the geometry directly from the 3D polygon geometry. Using this first conventional method, the limits of the low-end computer are typically exceeded when the 3D data produced by the CAD application comprise massive amounts of data causing the program executing this conventional method to stall, fail to display all of the 3D data, or to run at an unacceptable rate. In addition, the 3D polygon geometry used in this first conventional method often consists of very large files that are difficult to manage, distribute and process. Furthermore, the conventional PC-based viewer employs navigation techniques for moving between geometric images that are typically difficult to master due to lags in reaction caused by the PC-based viewer processing large amounts of data associated with the respective geometric image to be viewed. In addition, the 3D representations contain the actual precise definition of the objects. These objects can be captured within the computing device and reverse engineered, making the data vulnerable to compromise.

The second conventional method uses multiple, still, 2D images of the object produced by the 3D CAD system (or other sources of images or photographs) taken in multiple directions from a common viewpoint. Typically six images corresponding to the six faces of a cube (left, right, up, down, frontwards, backwards) are used. A conventional PC viewer, such as QuickTime VR or other proprietary viewer, then merges the images in real time, giving the appearance of being able to look in any direction from that viewpoint. However, because the conventional PC-based viewer is not directly linked to the 3D CAD system or the source of the original geometry, a separate processing environment is required. In addition, the conventional PC-based viewers typically expect a relatively small number of cubes to be produced and linked to dynamically represent the object in 3D. Preparation of the final viewable configuration of cubes is labor intensive and requires extensive effort to customize. Generation of "hot spot" navigation links requires an understanding of the desired path. This must then be coded into the application. Many of the applications require the navigation data be included within the images, thus complicating the generation of the images and increasing their size. Most navigation schemes are confined to a linear path with branches. Moreover, the links between geometric images or cubes generated using the second conventional method are typically either limited to "jumping" between cubes or require a significant amount of user programming or customization to create "seamless" movement between geometric images. Conventional PC-based viewers also typically expect the cubes are to be produced from photographic images, and thus, perform edge blending and other time consuming processes that are not necessary with digitally generated 2D images.

Therefore, a need exists for systems and methods overcoming the problems noted above and others previously experienced for producing and dynamically viewing on a low-end machine geometric images of an object generated by a CAD system or other legacy graphics image generator.

SUMMARY

Methods, systems, and articles of manufacture consistent with the present invention provide a tool to allow a user to dynamically view an object modeled in three dimensions by causing a graphics image generator to produce a group of images in accordance with one or more user-defined zones, slices associated with each zone, and viewpoints associated with the slices.

In one implementation, the tool comprises an image generator controller that allows a user with minimal skill to configure a new project in a very small amount of time (for example, 20 minutes vs. 10 days using manual methods). The image generator controller for automatic production of geometric images of an object model using vast amounts of data in very small time frames. In one example, 12 gigabytes of data was processed into 26,000 geometric images within 3 hours using the image generator controller. Thus, the image generator controller allows a user on a project to view the state of the geometry for the project daily and greatly shortens the time to identify problems.

The geometric images produced via the image generator controller may comprise 2D images that reflect a pictorial representation of the actual objects and omit information that is not in the pictorial representation (such as the inside geometry of a complex part) to provide intellectual property protection that is not possible with conventional polygon based viewers.

In another implementation, the tool comprises an image viewer that allows a user (such as any authorized member of a project, a customer of a product, student of a training course, or participant in an entertainment activity—like a virtual tour product or a museum or trade show kiosk) to view predefined geometric images on low end computers without expensive hardware and specialized training. The image viewer is operatively configured to access just the portion of cubic geometric images that is necessary to fulfill the user's request. Therefore, the portion may correspond to 0.6 megabytes or less of data from what might be a 5-gigabyte or more object model. Thus, the image viewer allows the geometric images to be accessed locally or over a network in accordance with methods and systems consistent with the present invention.

In accordance with methods consistent with the present invention, a method in an image processing system is provided for defining and viewing geometry of an object model produced using an image generator hosted on a image processing computer connected to a network. The image processing system has a data processing computer connected via the network to the image processing computer. The method comprises: displaying at least one view of the object model, defining a zone of the object model using at least one view, defining a slice of the object model in relation to the zone, defining a camera viewpoint in association with the slice so that the camera viewpoint has a position and an orientation relative to the zone, and generating, via the first data processing computer, a command sequence to cause the image generator to produce a geometric image of the object model in accordance with the camera viewpoint.

In accordance with systems consistent with the present invention, an image processing system is provided. The image processing system comprises: a first data processing computer connected via a network to an image processing computer having an image generator and an object model produced using the image generator, means for displaying at least one view of the object model; means for defining a zone of the object model using at least one view, means for defining a slice of the object model in relation to the zone, means for defining a camera In accordance with systems consistent with the present invention, an image processing system is provided. The image processing system comprises a storage device having a plurality of zone definitions of an object model produced using an image generator hosted on an image processing computer, a plurality of slice definitions associated with the zone definitions and a plurality of viewpoint definitions associated the slice definitions. The storage device further has a plurality of geometric images of the object model produced using an image generator in accordance with the zone definitions, the slice definitions, and the viewpoint definitions. The image processing computer further includes a data processing computer. The data processing computer includes a memory having an image viewer program that identifies each zone from the zone definitions, displays a respective identifier for each of the zones, determines whether one of the zone identifiers has been selected; when it is determined that one of the zone identifiers has been selected, identifies one of the geometric images as a top-level geometric image corresponding to the selected zone identifier; and displays the top-level geometric image. The data processing computer further including a processor to run the image viewer program.

In accordance with articles of manufacture consistent with the present invention, a computer-readable medium containing instructions that cause an image processing system having a viewer program to perform a method. The image processing system has a plurality of zone definitions of an object model produced using an image generator hosted on an image processing computer, a plurality of slice definitions associated with the zone definitions and a plurality of viewpoint definitions associated the slice definitions. The image processing system also has a plurality of geometric images of the object model produced using an image generator in accordance with the zone definitions, the slice definitions, and the viewpoint definitions. The method comprises: identifying each zone from the zone definitions, displaying a respective identifier for each of the zones, determining whether one of the zone identifiers has been selected, when it is determined that one of the zone identifiers has been selected, identifying one of the geometric images as a top-level geometric image corresponding to the selected zone identifier, and displaying the top-level geometric image.

Other systems, methods, features, and advantages of the present invention will be or will become apparent to one with skill in the art upon examination of the following figures and viewpoint in association with the slice so that the camera viewpoint has a position and an orientation relative to the zone, and means for generating, via the first data processing computer, a command sequence to cause the image generator to produce a geometric image of the object model in accordance with the camera viewpoint.

In accordance with articles of manufacture consistent with the present invention, a computer-readable medium containing instructions that cause an image processing system having an image generator controller program and a viewer program to perform a method. The image processing system has a plurality of data processing computers operatively connected to a network and an image processing computer operatively connected to the network. The image processing computer has an image generator and an object model produced by the image generator. The method comprises: displaying at least one view of the object model; defining a zone of the object model using the at least one view; defining a slice of the object model in relation to the zone; defining a camera viewpoint in association with the slice so that the camera viewpoint has a position and an orientation relative to the zone; and generating, via a first of the data processing computers, a command sequence to cause the image generator to produce a geometric image of the object model in accordance with the camera viewpoint.

In accordance with methods consistent with the present invention, a method in an image processing system is provided for viewing geometry of an object model produced using an image generator hosted on a image processing computer. The image processing system has a data processing computer and a plurality of geometric images of the object model produced using the image generator in accordance with a zone definition, a plurality of slice definitions associated with the zone definition, and a plurality of viewpoint definitions associated the slice definitions. The method comprises: providing the data processing computer with access to the zone definition, the slice definitions, and the viewpoint definitions, receiving, via the data processing computer, an indication of a first of the viewpoint definitions associated with one of the slice definitions, identifying, via the data processing computer, a first of the geometric images corresponding to the first viewpoint definition, and displaying the first geometric image on the data processing computer. detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIGS. 3A-3B are flow diagrams illustrating steps in a method for configuring a site in the image processing system so that a user is able to generate and view an object in 3D consistent with the present invention;

FIG. 7 depicts an object information file generated by the site configuration tool in accordance with methods and systems consistent with the present invention;

FIG. 15 depicts an exemplary zone definition file generated by the image generator controller in accordance with methods and systems consistent with the present invention;

FIG. 25 depicts an exemplary script file generated by the image generator controller to cause a sequence of geometric images to be produced by the image generator in accordance with the one or more slices associated with a defined zone and a pattern of viewpoints associated with each slice;

FIGS. 33A-B depict exemplary user interfaces generated by the image viewer, where a cross section geometric image associated with another zone is displayed in accordance with methods and systems consistent with the present invention while a cursor is near the other zone;

FIG. 37 depicts an exemplary look-up table generated by the image viewer to determine the next closet viewpoint from the selected viewpoint in a selected direction;

DETAILED DESCRIPTION

Reference will now be made in detail to an implementation in accordance with methods, systems, and products consistent with the present invention as illustrated in the accompanying drawings. The same reference numbers may be used throughout the drawings and the following description to refer to the same or like parts.

Methods, systems, and articles of manufacture consistent with the present invention allow a user operating on a data processing computer (e.g., a low-end machine) to dynamically view representations of geometry of an object model produced by an image generator (e.g., a CAD tool) hosted on an image processing computer (e.g., a high speed graphics workstation) by (1) allowing the user to define a zone associated with the object model, slices of each zone, and viewpoints associated with the slices, (2) controlling the graphics image generator to produce geometric images of the object model in accordance with the zone, slices, and viewpoints, and (3) selectively navigating the images in accordance with the zone, slices, and viewpoints. The object model may be a complex object, such as an airplane, car, building, or a component thereof, particularly a CATIA solid model digital representation of a part or assembly.

I. System Architecture

Figure 1:
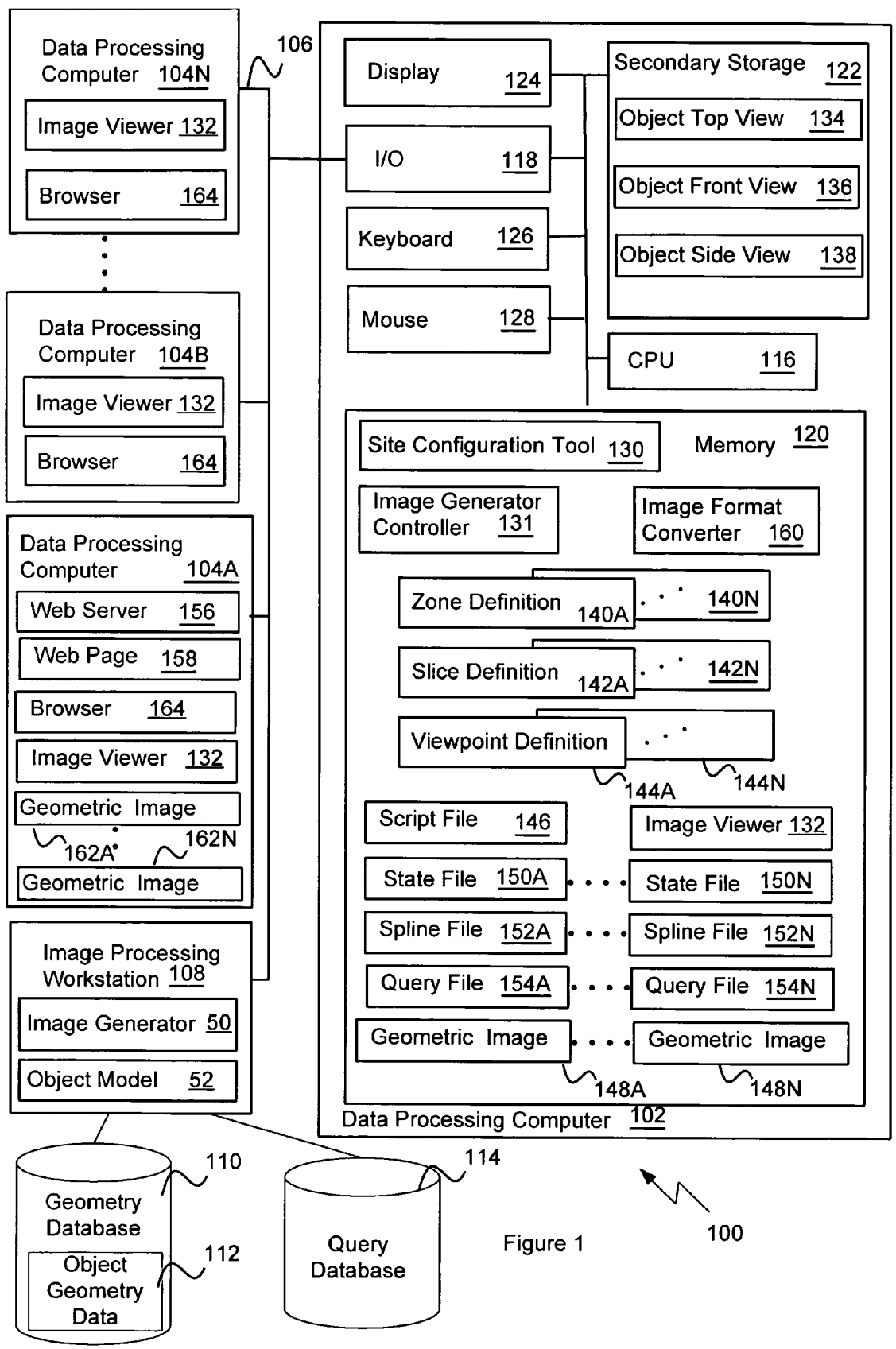
FIG. 1 is a block diagram of an image processing system suitable for dynamically modeling an object in 3D consistent with the present invention.
Figure 2:
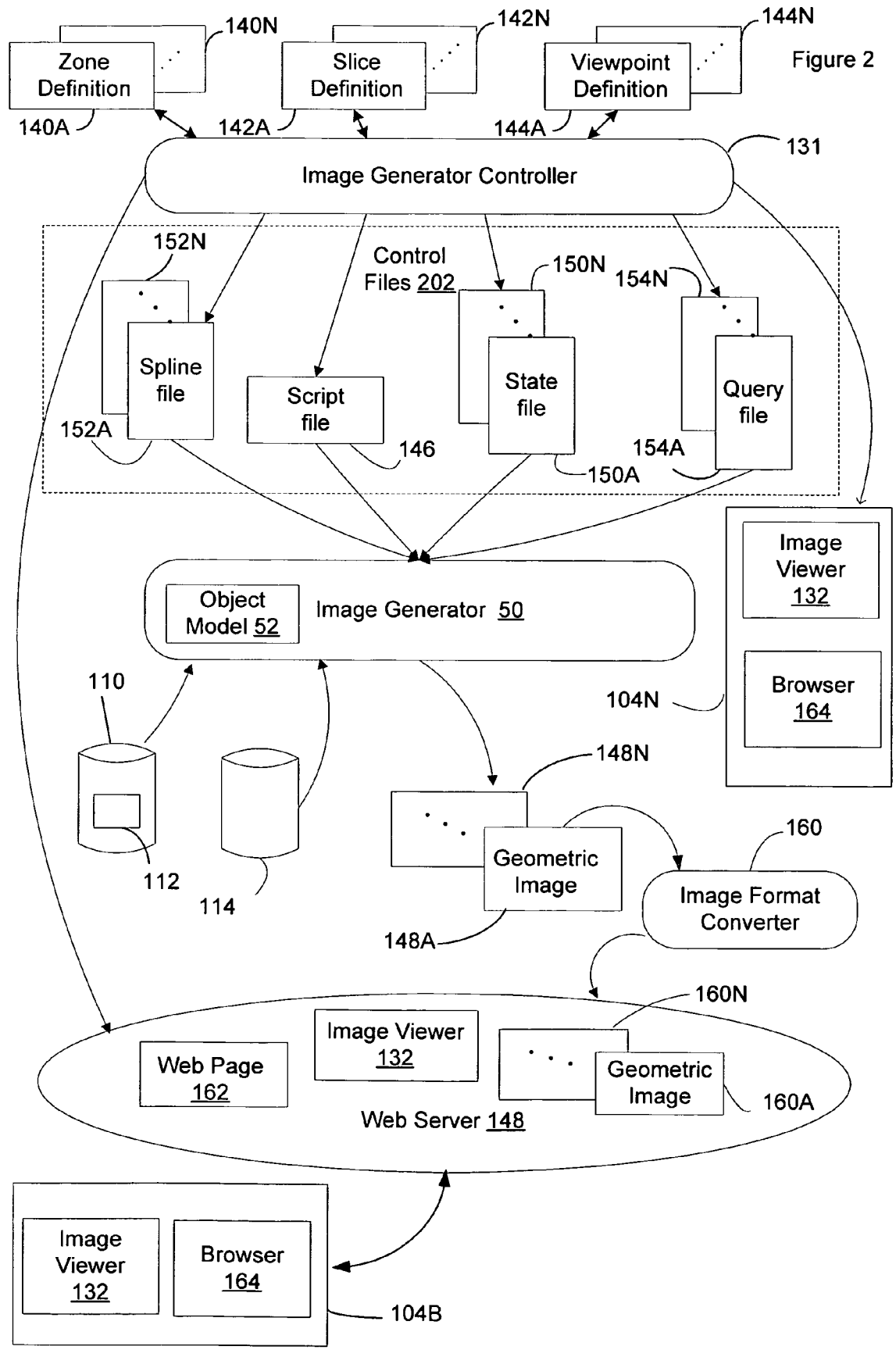
FIG. 2 is an exemplary functional block diagram of the image processing system of FIG. 1.

FIG. 1 depicts a block diagram of an image processing system 100 suitable for use with methods and systems consistent with the present invention. FIG. 2 depicts an exemplary functional block diagram of the image processing system 100. The image processing system 100 includes a data processing computer 102. The data processing computer 102 may be one of a group of data processing computers 104A-N in the image processing system 100 that are operatively connected via a network 106. The data processing computers 102 and 104A-N may be any general-purpose computer system such as an IBM compatible, Apple, or other equivalent computer. The network 106 may be any known private or public communication network, such as a local area network ("LAN"), WAN, Peer-to-Peer, or the Internet, using standard communications protocols. The network 106 may include hardwired, as well as wireless branches.

As discussed in detail below, the data processing computer 102 is operatively configured to control an image generator 50 or CAD application, such as the commercially available "CATIA" application from Dassault Systemes or the proprietary "FlyThru" application from Boeing, to produce geometric images of an object model 52 in accordance with a user defined zone of the object model 52, one or more slices of the zone, and viewpoints associated with the one or more slices of the zone. The data processing computer 102 is also operatively configured to allow a user to selectively navigate the geometric images of the object model 52 in accordance with the user defined viewpoints so the user may dynamically view representations of the object model 52 while using the data processing computer 102. In one implementation, the data processing computer 102 places the geometric images of the object model 52 on a Web site hosted on the data processing computer 102 or on another data processing computer (e.g., 104A in FIG. 1) so that a user may dynamically view the images of object model 52 using one of the data processing computers 104A-N in accordance with methods and systems consistent with the present invention. In another implementation, the data processing computer 102 allows another data processing computer 104A-N to directly access the geometric images of the object model 52 locally or across the network 106 using an image viewer 132 in accordance with methods and systems consistent with the present invention.

In the implementation shown in FIG. 1, the image generator 50 is hosted on an image processing workstation 108 operatively connected to the data processing system 102 across the network 106. In this implementation, the image processing workstation 108 is operatively connected to an object geometry database 110. While using image processing workstation 108, an engineer or other enterprise user may operate the image generator 50 to model an object in 3D and store object geometry data 112 corresponding to the object model 52 in the object geometry database 110. Alternatively, the data system computer 108 may include a query database 114 containing a description of the geometry to be loaded by the image generator 50 to produce the object model 52 from the object geometry data 112. The object model 52 may require hundreds of thousands of polygons or gigabytes of data (e.g., object geometry data 112) to represent surfaces, volumes, or elements of the object as a geometric image for display on the image processing workstation 108 using the image generator 50. Accordingly, the image processing workstation 108 may be a high speed graphics work station (such as workstation-class computer available from Sun Microsystems, Inc. or Silicon Graphics, Inc.) or a personal computer having a high-end graphics card and a sufficient amount of memory to allow the image generator 108 to generate and display geometric images of the object model 52 from the geometry data 112 within a rapid response time.

As shown in FIG. 1, the data processing computer 102 comprises a central processing unit (CPU) 116, an input output (I/O) unit 118, a memory 120, a secondary storage device 122, and a display 124. The data processing system 102 may further comprise standard input devices such as a keyboard 126, a mouse 128 or a speech processing means (not illustrated). The CPU 116 may be a low-end processor, such as a processor having a processing speed as low as 400 MHz. These various components of a data processing computer 102 may be physically located remotely from each other and connected via the network 106.

Memory 120 stores a site configuration tool 130, an image generator controller 131, and an image viewer 132. As discussed in detail below, the site configuration tool 130 enables a user, such as a project administrator, to configure the data processing computer 102 so another user involved in the project is able to use the image generator controller 131 to access object information specific to the project to define, produce, and navigate geometric images of the object model.

Figure 18:
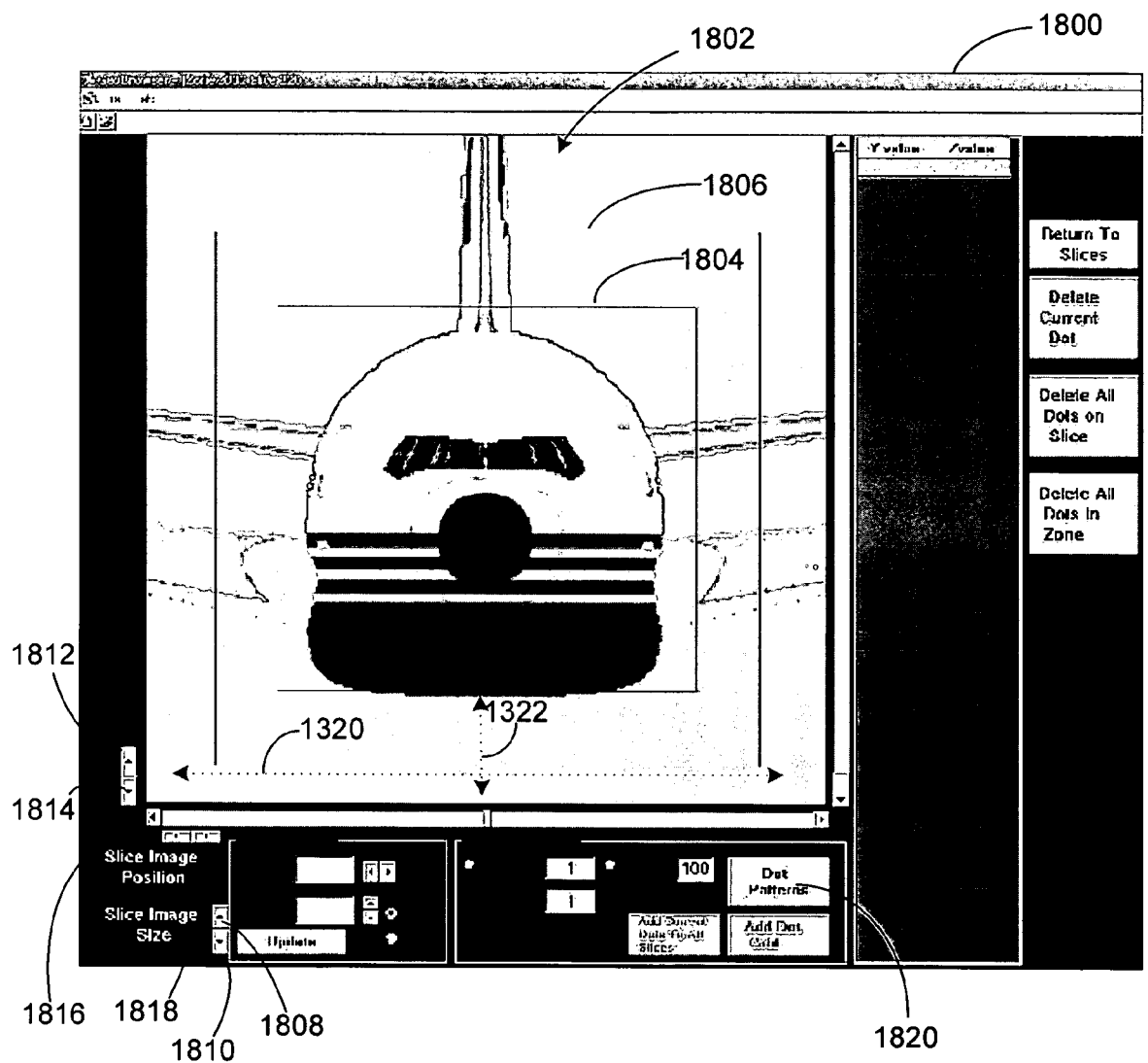
FIGS. 18-20 depict exemplary user interfaces displayed by the image generator controller to allow a user to define a pattern of viewpoints for a selected slice.

In one implementation, the object information includes a top view 134, a front view 136, and a side view 138 of an object that has been modeled, for example by a design engineer, using the image generator 50 on the high-speed image processing workstation 108. The object top, front, and side views 134, 136, and 138 may be stored in secondary storage 122, memory 108, or other remote storage. The object top, front, and side views 134, 136, and 138 may be two dimensional images in a known image format, such as jpeg, tiff, or bitmap. As discussed below, the site configuration tool 130 automatically scales the object views 134, 136, and 138 for a pre-defined resolution of the display 124, such as an inch per pixel, to allow for display registration between images (e.g., views 134, 136, and 138 or geometric images 148A-N) and the object model 52 of at least the following: zone boundaries (e.g., the first window 1308 in FIG. 13 and the second window 1310 reflecting zone 1306), slice selection image boundaries (e.g., slice selection image boundary 1602 in FIGS. 16A-B), slice boundaries (e.g., slice image boundary 1806 in FIG. 18), slice lines or planes (e.g., planes 1658 . . . 1668 in FIGS. 16A-B), and camera viewpoints (e.g., viewpoints 1926 . . . 1938 in FIG. 19.

The object information may also include a pre-defined pattern of viewpoints that a user selectively associates with one or more of the object views 134, 136, and 138 using the site configuration tool 130 or using the image generator controller 131. The viewpoints are used by the image generator controller 131 to cause the image generator 50 to produce corresponding geometric images that may then be dynamically viewed on data processing computers 104A-104N using the image viewer 132 in accordance with methods consistent with the present invention.

The object information may further include a location in a grid or coordinate system (e.g., x-axis 1318, y-axis 1320, and z-axis 1322 in FIG. 13) corresponding to a camera angle or viewpoint used to capture the object views 134, 136, and 138. In another implementation, the object views 134, 136, and 138 may be perspective views (not shown in figures) of the object. In this implementation, the object information may include one or more rotation angles (e.g., rotation angles 508 in FIG. 5) enabling the site configuration tool 130 or the image generator controller 131 to rotate the perspective view of the object about a respective x-axis, y-axis, and z-axis so that the perspective view of the object is centered in relation to the display 124.

The site configuration tool 130 may associate a location of the image generator 50 in the image processing system 100 with the object information so the image generator controller 131 is able to access and manage the image generator 50 in accordance with methods and systems consistent with the present invention.

The image generator controller 131 allows a user to define one or more zones (e.g., area or cubic volume) of the object using one or more of the object views 134, 136, and 138, define one or more slices (e.g., plane orthogonal to an axis of the respective zone) in accordance with the one or more zones, and associate one or more viewpoints (e.g., a pre-defined pattern of viewpoints) with the one or more slices. In one implementation, the image generator controller 131 stores, in memory 120 or secondary storage 122, each zone in a zone definition file 140A-140N, each slice in a slice definition file 142A-142N, and each viewpoint associated with a respective slice in a viewpoint definition file 144A-144N. In one implementation, the image generator controller 131 may generate a script file 146 including commands to cause the image generator 50 to generate object geometric images 148A-148N in accordance with the zone definition files 140A-140N, slice definition files 142A-142N, and viewpoint definition files 144A-144N. In another implementation, the image generator controller 131 may pipeline the commands directly to the image generator 50 following a known application programming interface (not shown in FIG. 2 or 3) for the image generator 50.

In one implementation, the image generator controller 131 is able to recognize the type of image generator 50, such as a CATIA or FlyThru system, based on a name or other parameter associated with the image generator 50. In another implementation, the image generator controller 131 is customized to operate with a singe type of image generator 50. Depending on the type of image generator 50, the image generator controller 131 may generate one or more control files 202 to control the image generator 50 to produce the geometric images 148A-N in accordance with a defined zone (e.g., the zone defined in file 140A), the one or more slices associated with the zone (e.g., the slices defined in the file 142A), and the one or more camera viewpoints associated with each slice of the zone (e.g., the viewpoints defined in the file 144A). In the implementation shown in FIG. 2, the control files 202 include the script file 146, as well as one or more state files 150A-150N, spline files 152A-152N, and query files 154A-154N accessed via the script file 146 to cause the image generator 50 to produce the geometric images 148A-148N in accordance with methods and systems consistent with the present invention. The state files 150A-150N are generated by the image generator 50 to cause the image generator 50 to select geometry and set imaging visualization parameters, such as a near clipping plane, in accordance with the zone definitions 140A-140N and the corresponding object geometry data 112. The query files 154A-154N include a description of the geometry selected in state files 150A-150N. The spline files include a list of viewpoint coordinates corresponding to the viewpoint definitions 144A-144N. The image generator controller 131 may store the state files 150A-150N, the spline files 152A-152N, and query files 154A-154N in memory 120 or in secondary storage 122. Alternatively, image generator controller 131 may store or transfer the state files 150A-150N, the spline files 152A-152N, and query files 154A-154N to the image processing workstation 108 so the image generator is able to access these files locally when accessing the script file 146 or when responding to commands generated by the image generator controller 131. When triggered by the image generator controller 131 to access the script file 146, the image generator 50 is directed to select a state file 150A-150N, load the selected geometry, load the viewpoints identified in the corresponding spline file 152A-150N, set output parameters (e.g., file names for object geometric images 148A-148N), and to generate object geometric images 148A-148N.

In one implementation, one of the data processing computers (e.g., data processing computer 104A) includes a web server 156, such as Apache HTTP Server or Microsoft's Internet Information Services (IIS) Server, and a web page 158 generated by the image generator controller 131 for accessing object geometric images 148A-148N using the image viewer 132. In this implementation, the image generator controller 131 may transfer the geometric images 148A-148N to the data processing computer 104A hosting the web page 158.

Memory 120 may also store an image format converter 160 operatively configured to convert object geometric images 148A-148N from one format (e.g., rgb) to another format (e.g., jpeg) to produce corresponding object geometric images 162A-162N, which may then be transferred by image generator controller 131 to the data processing computer 104A hosting the web page 158 or a pre-determined location accessible by the image viewer 132.

In one implementation, the image viewer 132 may comprise a multimedia player, such as a QuickTime Player commercially available from Apple Computer, Inc., adapted with a plug-in module to access geometric images 148A-N via the web page 158 in accordance with methods and systems consistent with the present invention. In this implementation, a user operating on one of the data processing computers 104A-N may initially access the image viewer 132 and the web page 158 via a standard browser 164, such as Internet Explorer or Netscape.

In another implementation, the image viewer 132 may be an executable application developed in accordance with methods and systems consistent with the present invention using a multimedia tool, such Macromedia Director MX commercially available from Macromedia, Inc. In this implementation, a user operating one of the data processing computers 104A-N may initially access and upload the image viewer 132 from the data processing computer 102 using the standard browser 164 or known network file access protocols hosted on the respective data processing computer.

The site configuration tool 130, the image generation controller 131, and image viewer 132 each may comprise or may be included in one or more code sections containing instructions for performing respective operations. The site configuration tool 130 may be incorporated into the image generation controller 131, for example, when the users of the image processing system 100 have the same administrative privileges for accessing the site configuration tool 130. Although the site configuration tool 130, the image generation controller 131 and other programs are described as being implemented as software, the present invention may be implemented as a combination of hardware and software or hardware alone. Also, one of skill in the art will appreciate programs may comprise or may be included in a data processing device, which may be a server, communicating with image processing system 100.

In addition, although aspects of one implementation shown in FIG. 1 are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of image processing system 100 have been described, an image processing system suitable for use with methods, systems, and articles of manufacture consistent with the present invention may contain additional or different components.

II. Site Configuration

Figure 3B:
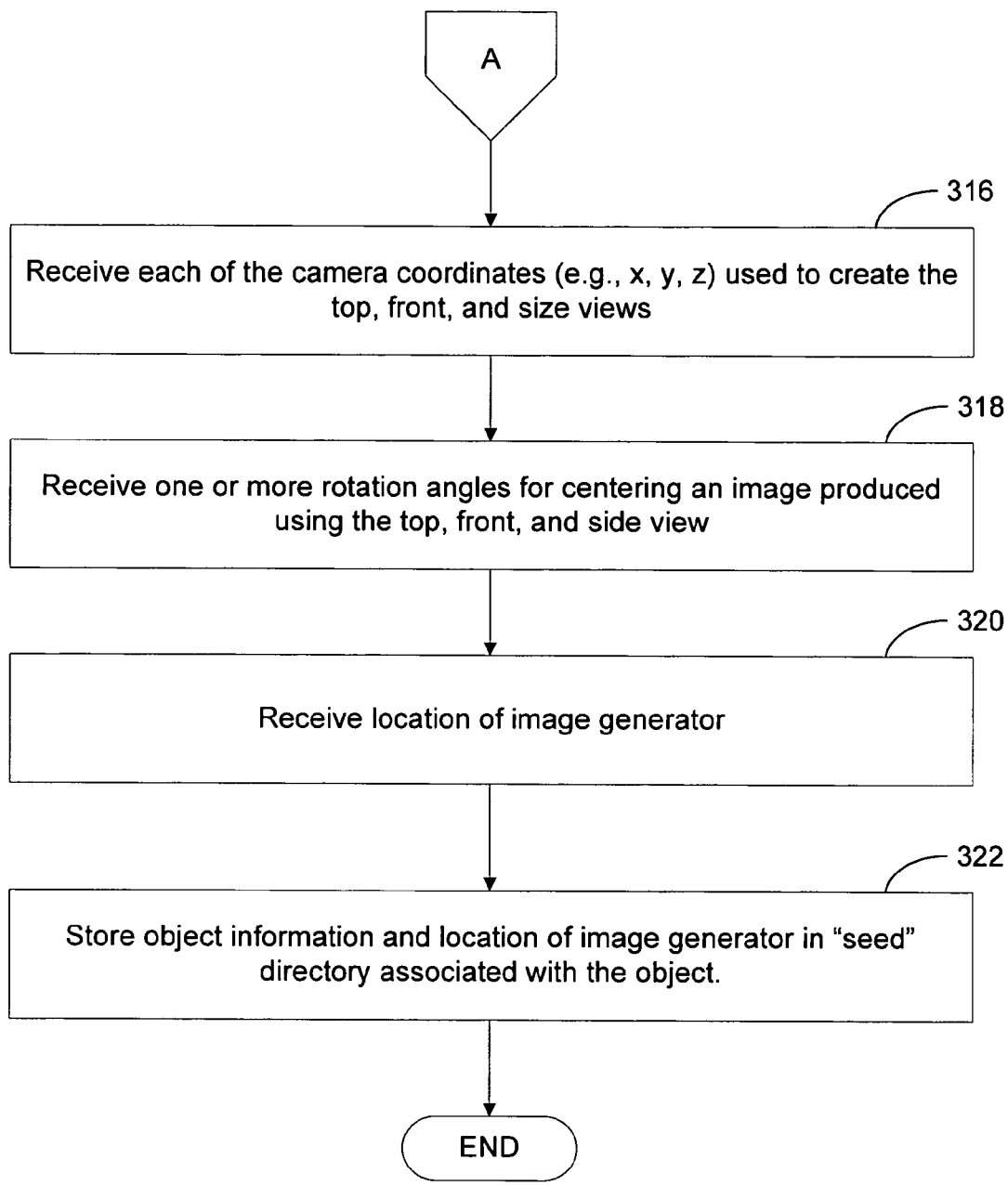

FIGS. 3A-3B depict a flow diagram illustrating steps in a process 300 performed by the site configuration tool 130 for configuring a site (e.g., data processing computer 102) in the image processing system 100 so a user is able to generate and view an object in 3D consistent with the present invention. Initially, the site configuration tool 130 receives a request to configure an environment for viewing an object in 3D (step 302). A user, such as a project administrator, may identify the request to the site configuration tool 130 via a known input technique, such as mouse 128 or keyboard 126 input. To control access to the site, the site configuration tool 130 may authenticate the request by the user by validating an id and password provided by the user against a pre-defined user profile (not shown in the figures).

Figure 4:
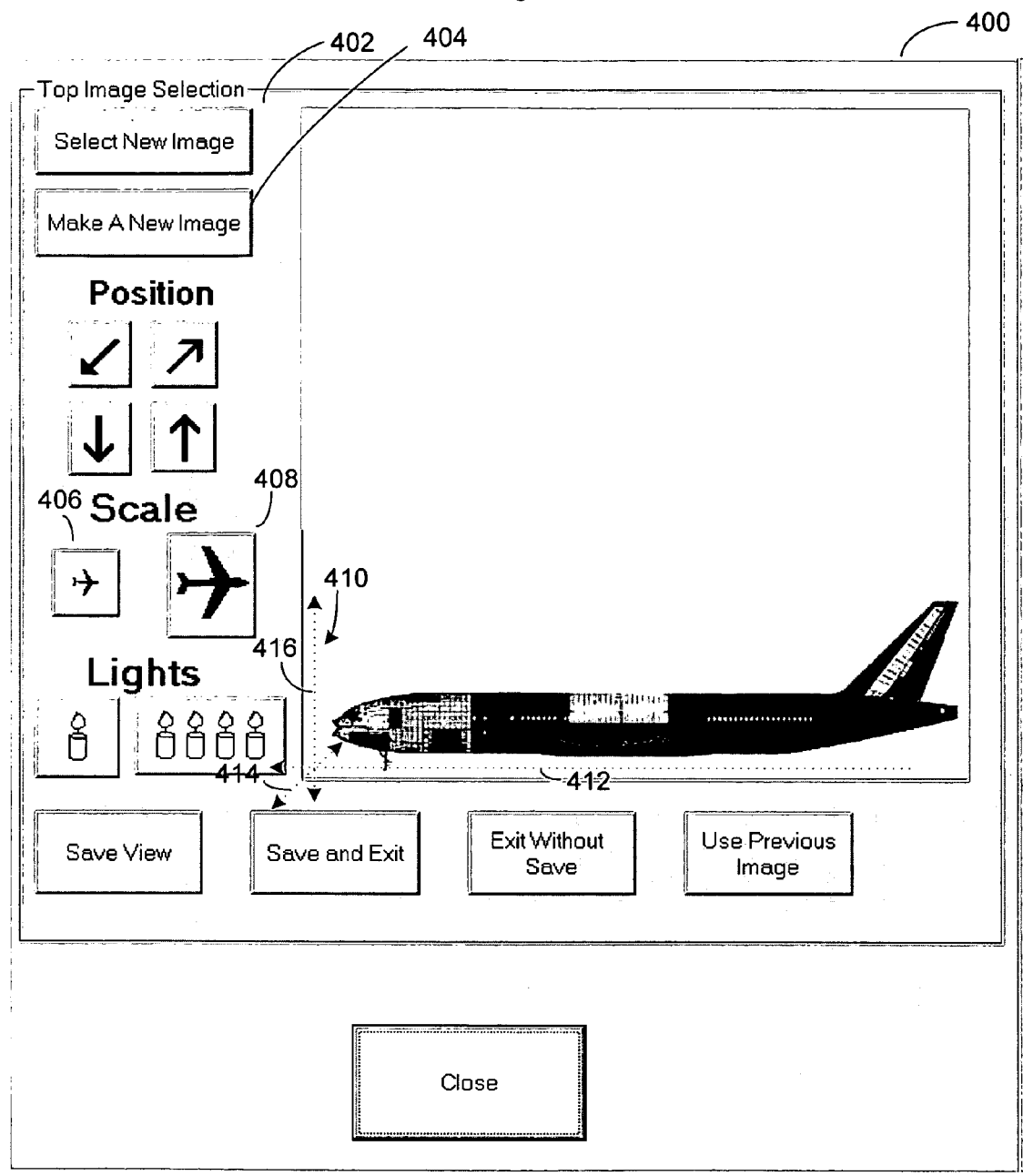
FIG. 4 depicts an exemplary user interface displayed by a site configuration tool of the imaging processing system for receiving a top view, a front view, and a side view of the object.

Next, the site configuration tool 130 receives a top view 134, a front view 136, and a side view 138 of the object (step 304) and a dimension for scaling the views 134, 136, and 138 (step 306). In one implementation, the site configuration tool 130 generates a user interface 400 as shown in FIG. 4 to allow the project administrator or other user to identify the views 134, 136, and 138 by selecting push button 402 to identify a new image stored on the network 106 or selecting push button 404 to make a new image using the image generator 50 or a known image editor tool, such as industry standard Adobe PhotoShop software.

In one implementation, the site configuration tool 130 may be configured to use a default scaling dimension (e.g., one inch per pixel) to correlate the actual size of the object (e.g., a typical airplane may be 1500 to 3000 inches in length) to the size of a display 124 of a data processing computer 104A-N that may be used to view images produced via the image generator controller 131. In another implementation, the site configuration tool 130 determines the scaling dimension 402 based upon a dimension of the object (e.g., the length of the airplane shown in views 134, 136, and 138) and a pre-defined or maximum resolution of the display 124, such as 1024 by 1024 pixels. Alternatively, the site configuration tool 130 may allow the project administrator to select a scaling push button 406 or 408 to identify a respective small (¼ inch per pixel) or large (1 inch per pixel) scaling dimension to the site configuration tool 131. In another implementation, the site configuration tool 130 receives the scaling dimension 502 via an input file 500 associated with the type of image generator 50 (e.g., Flythru type 504 in FIG. 5).

The site configuration tool 130 then scales the top 134, front 136, and side 138 views based on the dimension per pixel of the display (step 308) and associates a coordinate system with the views 134, 136, and 138 (step 310). In the example shown in FIG. 4, the site configuration tool 130 scales the views 134, 136, and 138 at one inch to the pixel and associates the views with an x, y, and z coordinate system 410. The coordinate system 410 corresponds to a horizontal, a center, and a vertical axis of the display 124. In this implementation, the site configuration tool 130, the controller 131, and the viewer 132 associate each top view 134 with the x-axis and y-axis at z=0, the front view 136 with the y-axis and the z-axis centered at x=0, and each side view of an image (e.g., the side view 138 depicted in FIG. 4 or geometric images 148A-N) with the x-axis and the z-axis centered at y=0. The site configuration tool 131 allows the user to manipulate the geometry of a view of the object model 52 (e.g., geometry of side view 138 in FIG. 4) by controlling the image generator 50 in accordance with methods and systems consistent with the present invention. The user can adjust the position, rotation, scale and lighting of the geometry to arrive at the desired images for the top 134, front 136, and side 138. Images 148A-N and 162A-N are generated using the image generator controller 131 to correspond to the same x, y, and z coordinate system 400 associated with views 134, 136, and 138 in accordance with methods and systems consistent with the present invention.

The process 300 may be performed manually by the project administrator with knowledge of the location in which the views 134, 136, and 138 are stored on the network 106, of the scaling dimension to be used, and access to a known image editor tool, such as industry standard Adobe PhotoShop software.

Returning to FIG. 3A, the site configuration tool 130 determines whether there are more views of the object (step 312). A project administrator or other user may request to identify a second top, front, or side view of the object, for example, to allow a user to reference another level or internal views of the object when using the image generator controller 131 to generate geometric images 148A-N and 162A of the object. The project administrator may select a user interface menu button or use other known data input technique to request to identify a second top, front, or side view to the site configuration tool 130. If there are more views of the object, the site configuration tool 130 receives the next top, front, or side view (step 314) and continues processing at step 308.

Figure 5:
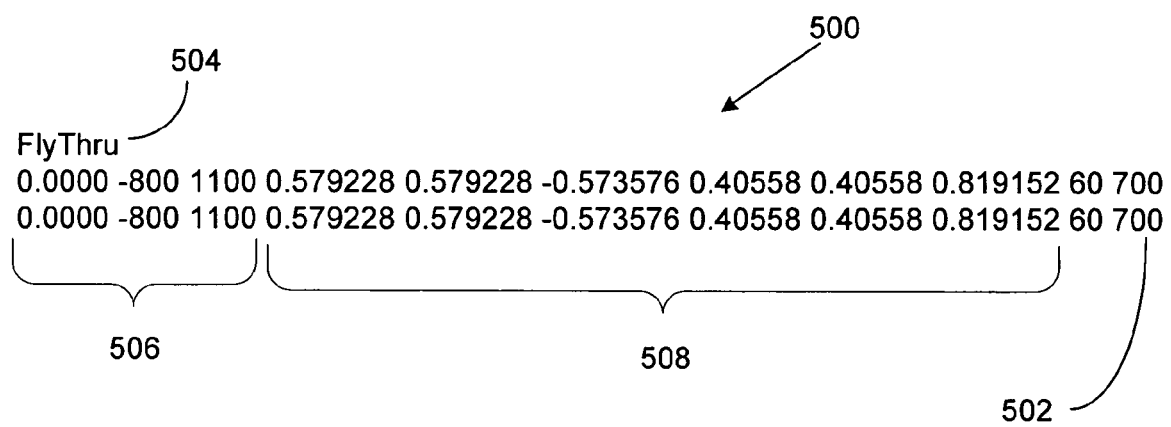
FIG. 5 depicts an exemplary input file received by the site configuration tool for receiving camera coordinates used to generate the top, the front, and the side views of the object.

If there are no more views of the object, the site configuration tool 130 receives each of the camera coordinates used to create the top 134, the front 136, and the side 138 views of the object (step 316). The site configuration tool 130 may also receive one or more rotation angles for centering an image produced using the top 134, the front 136, and the size 138 views (step 318). FIG. 5 depicts an exemplary input file 500 received by the site configuration tool 132 to identify camera coordinates 506 used to generate the front 136 views. The site configuration tool 132 may receive a similar input file 500 to receive the camera coordinates used to generate the top and side views 134 and 138. The input file 500 also includes rotation angles 508 for rotating an image about the x-axis, y-axis, and z-axis shown in FIG. 4 so the image generator controller 131 causes geometric images 148A-148N to be produced in the proper perspective.

Figure 6:
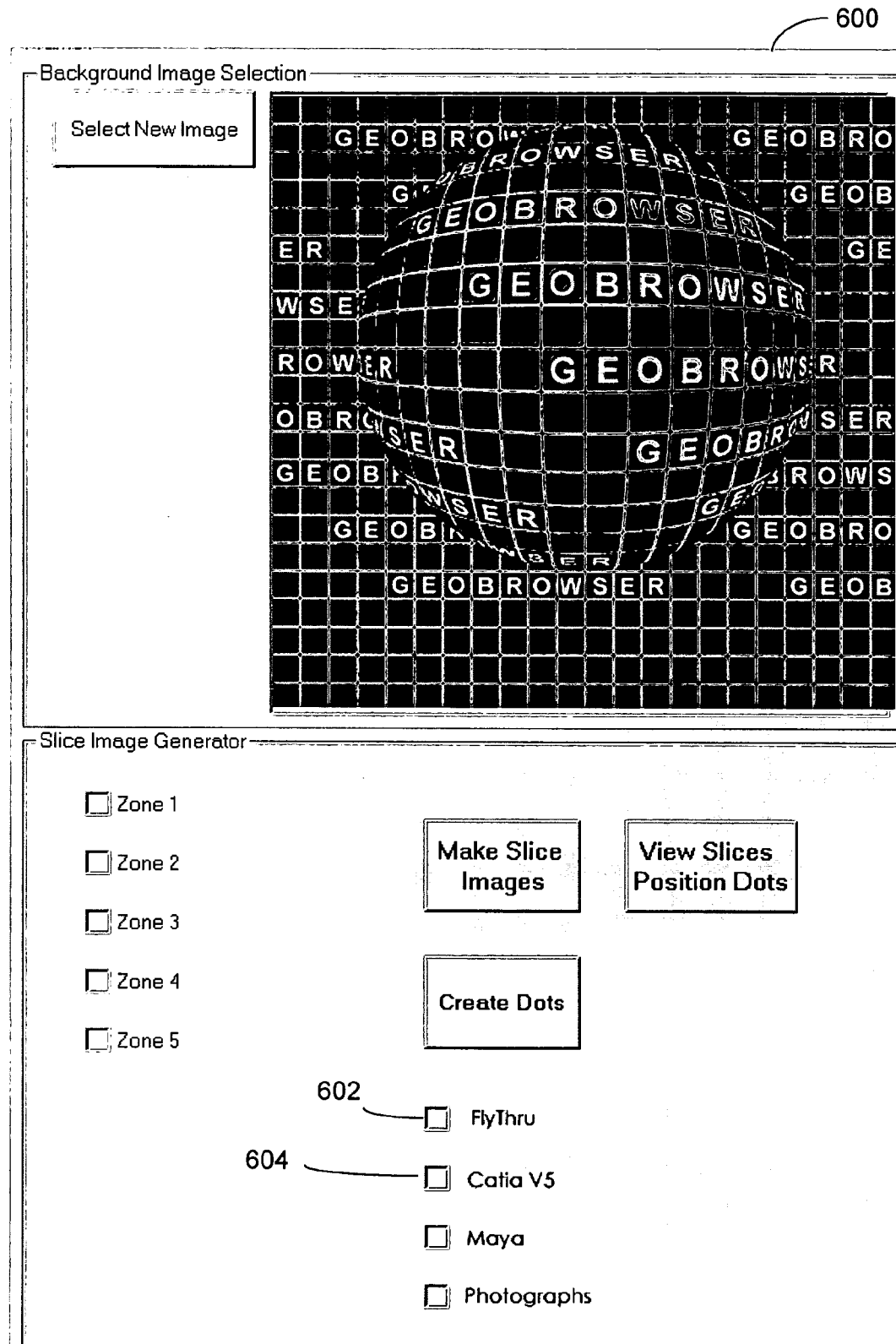
FIG. 6 depicts an exemplary user interface displayed by the site configuration tool to allow a user to identify an image generator to associate with the object.

The site configuration tool 130 also receives a location of the image generator 50 in the image processing system 100 (step 320). In the example shown in FIG. 6, the project administrator may signal the location of the image generator 50 to the site configuration tool 130 by first identifying the type 602 or 604 of image generator 50 to be accessed. The site configuration tool 130 is able to recognize the location of the image generator 50 based on the type 602 or 604 selected. Alternatively, the location may be conveyed to site configuration tool 130 via a startup script file (not shown in figures) or other known data input technique. The location may include a network path and image generator name (e.g., Flythru 602 or CATIA V5 604).

The site configuration tool 130 then stores the object information and location of the image generator 50 in a "seed" directory associated with the object (step 322) and ends processing. FIG. 7 depicts an exemplary object information file 700, "AC_info.gbf," generated and stored by the site configuration tool 130 in response to performing the process 300. The object information file 700 includes respective path identifiers 702, 704, 706 for the top view 134, the side view 138, and the front view 136 so the controller 131 is able to locate the views 134, 136, and 138. In the implementation shown in FIG. 7, the object information file 700 also includes path identifiers path identifiers 708, 710 to identify additional top views and path identifiers 712, 714 to identify additional side views of the object model 52. The object information file 700 may also store viewpoint patterns 716 that the controller 131 may allow a user to select to associate with a slice of a zone as explained in further detail below.

III. Defining a Zone, Slices of the Zone, and Viewpoints of an Object Model

FIGS. 8A-8F depict a flow diagram illustrating a process 800 performed by the image generator controller 131 to allow a user or project affiliate working on the data processing computer 102 or 104A-N to define multiple viewpoints of an object and to control the image generator 50 across the network 106 to produce geometric images 148A-N and 162A-N of the object model 52 in accordance with the viewpoints. In one implementation, the user may then use the image generator controller 131 to produce the web page 158 to link the geometric images 148A-N and 162A-N such that the user or other project affiliate can dynamically view and navigate the geometric images using the image viewer 132 without having to be at the image processing workstation 108 on which the image generator 50 is hosted. Alternatively, the image generator controller 131 may store the geometric images 148A-N and 162A-N in a hierarchical structure at a pre-determined location known to the image viewer 132 such that a user operating on one of the data processing computers 104A-N is able to dynamically view and navigate the geometric images 148A-N and 162A-N.

Figure 9:
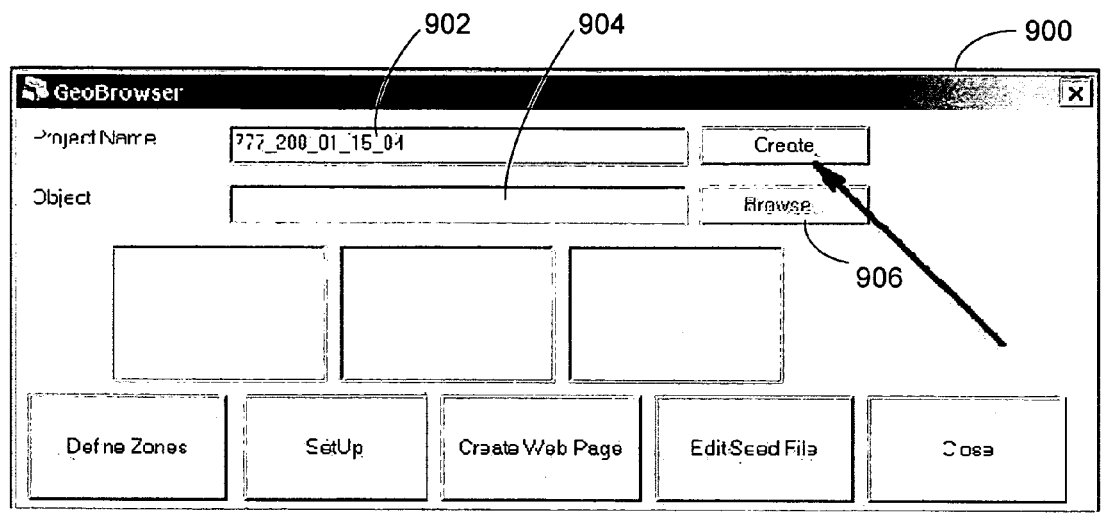
FIG. 9 depicts an exemplary user interface displayed by an image generator controller of the imaging processing system to allow a user to define a project for viewing an object in 3-D in accordance with the present invention.
Figure 10:
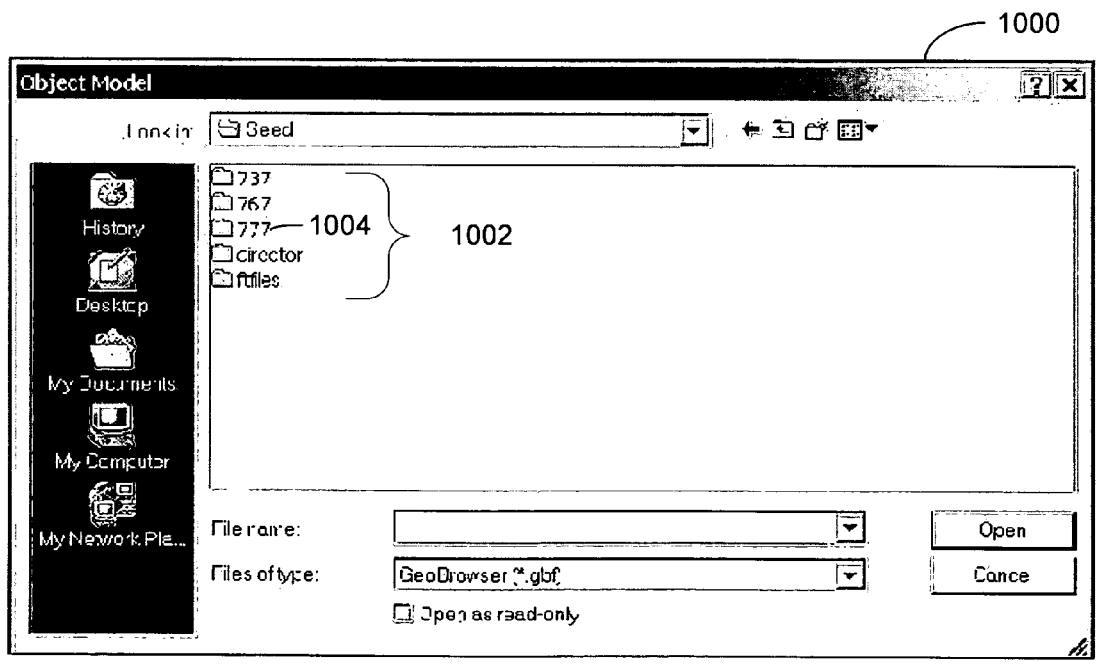
FIGS. 10-11 depict exemplary user interfaces displayed by the image generator controller to allow a user to identify a seed file to associate with the project.
Figure 11:
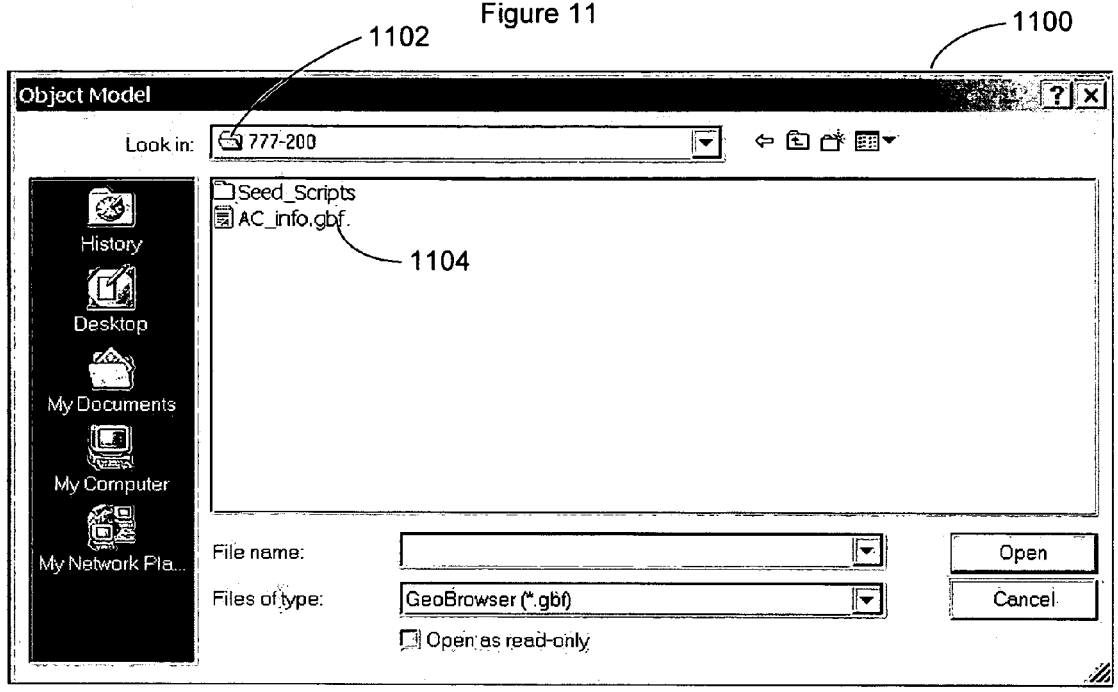

Initially, the image generator controller 131 receives a project name (step 802) and receives an identification of a "seed file" or object information file to associate with the project (step 804). As shown in FIG. 9, the controller 131 may display a user interface 900 in which the user is able to identify a project name 902 and an object information file 904 to associate with the project name. In this implementation, the user may first select a browse option 906 to identify one of the object seed directories 1002 in which the desired object information file was stored by the site configuration tool 130. The object seed directories 1002 correspond to objects, such as airplanes, cars, or buildings, that have been modeled in 3D (e.g., object model 52) using the image generator 50 on the image processing workstation 108. An object seed directory (e.g., 1004 in FIG. 10) may include one or more subdirectories (e.g., 1102 in FIG. 11) holding one or more object information files (e.g., object information file name 1104) that may be selected by the user. In the example shown in FIG. 11, the object information file name 1104 identifies the object information file 700 in FIG. 7.

Figure 12:
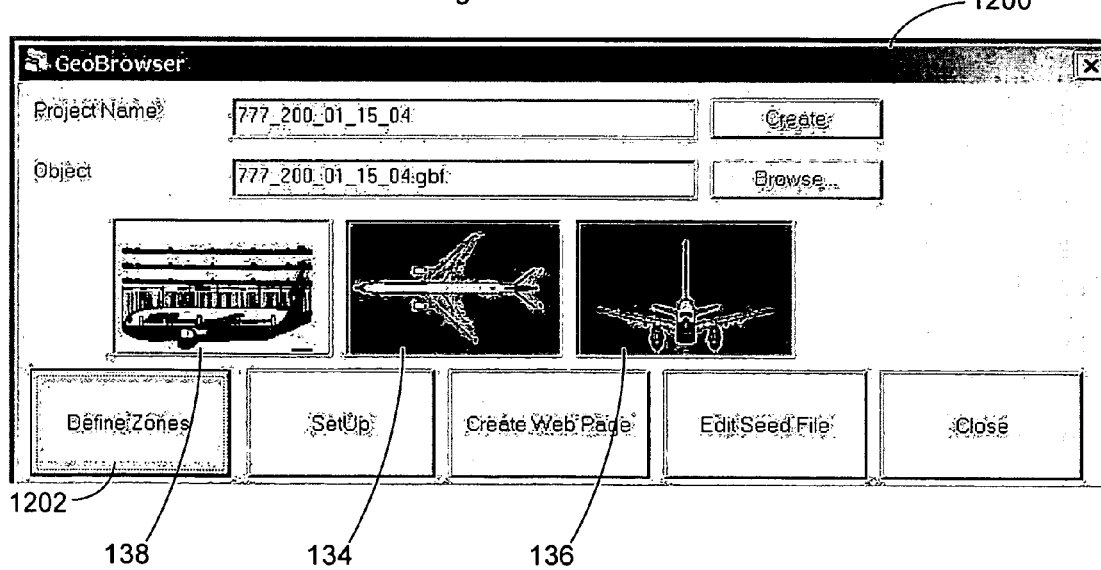
FIG. 12 depicts an exemplary user interface displayed by the image generator controller, where top, front, and side views of the object associated with the seed file are displayed.

Next, the controller 131 retrieves the top view 134, the front view 136, and the side view 138 of the object associated with the seed or object information file (step 806). The controller 131 accesses the object information file 700 to identify the location of the top view 134, the front view 136, and the side view 138. The controller 131 may then display the views 134, 136, and 138 of the object as shown in FIG. 12 so the user is able to confirm the correct object information file 700 was selected for the project.

The controller 131 then determines whether a request has been received to define a zone of the object (step 808). In the implementation shown in FIG. 12, a user or affiliate working on the project may request to define a zone of the object by selecting a button 1202 on the user interface 1200 generated by the controller 131. If a request to define a zone is not received, the controller 131 waits until an end command (e.g., "Close" button in FIG. 12) is received from the user continuing processing. Alternatively, the controller 131 may end processing if a request to define a zone is not received within a predetermined period.

Figure 8A:
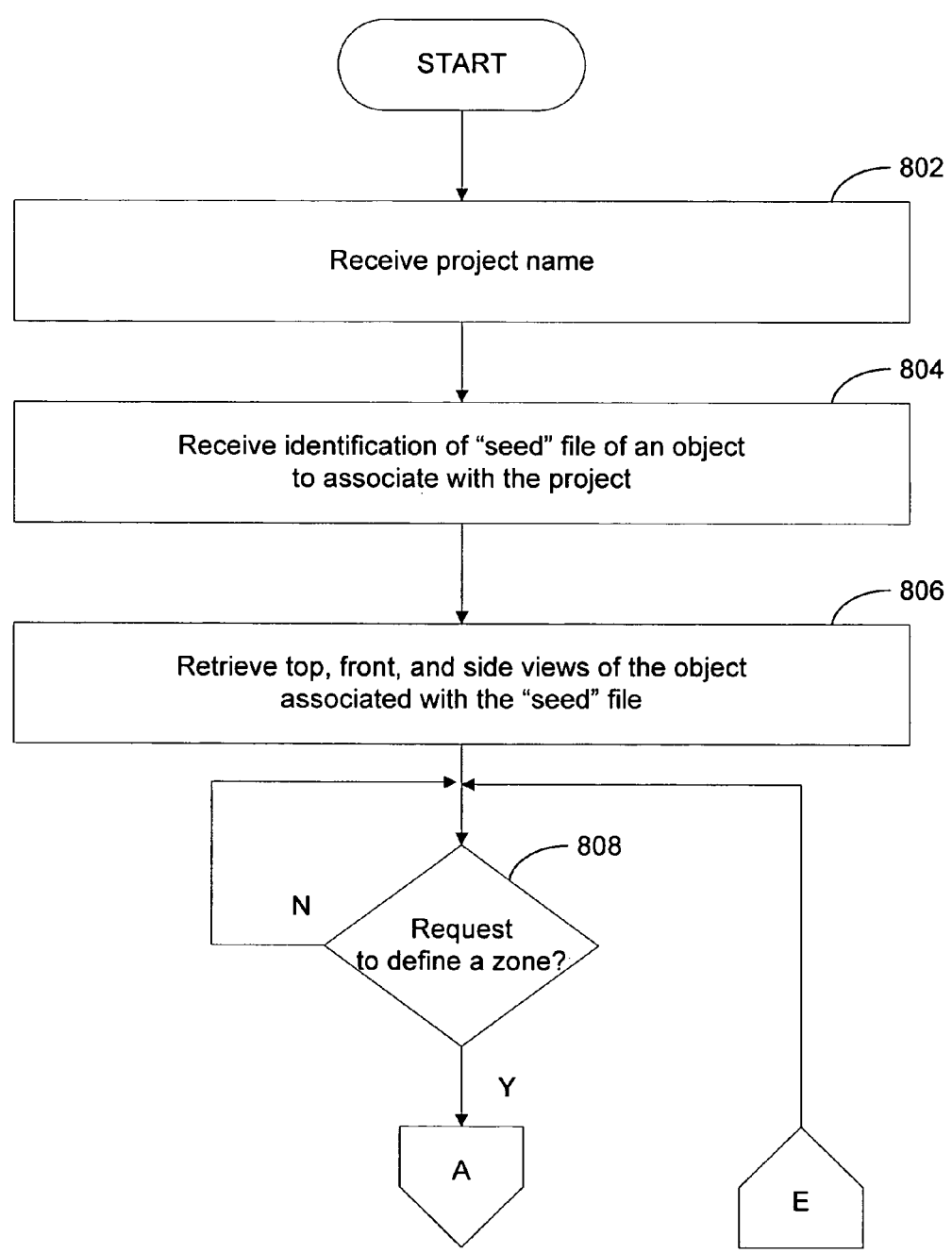
FIGS. 8A-8F are flow diagrams illustrating steps in a method for defining multiple camera viewpoints of an object and controlling the image generator to produce geometric images of the object in accordance with the camera viewpoints.
Figure 8B:
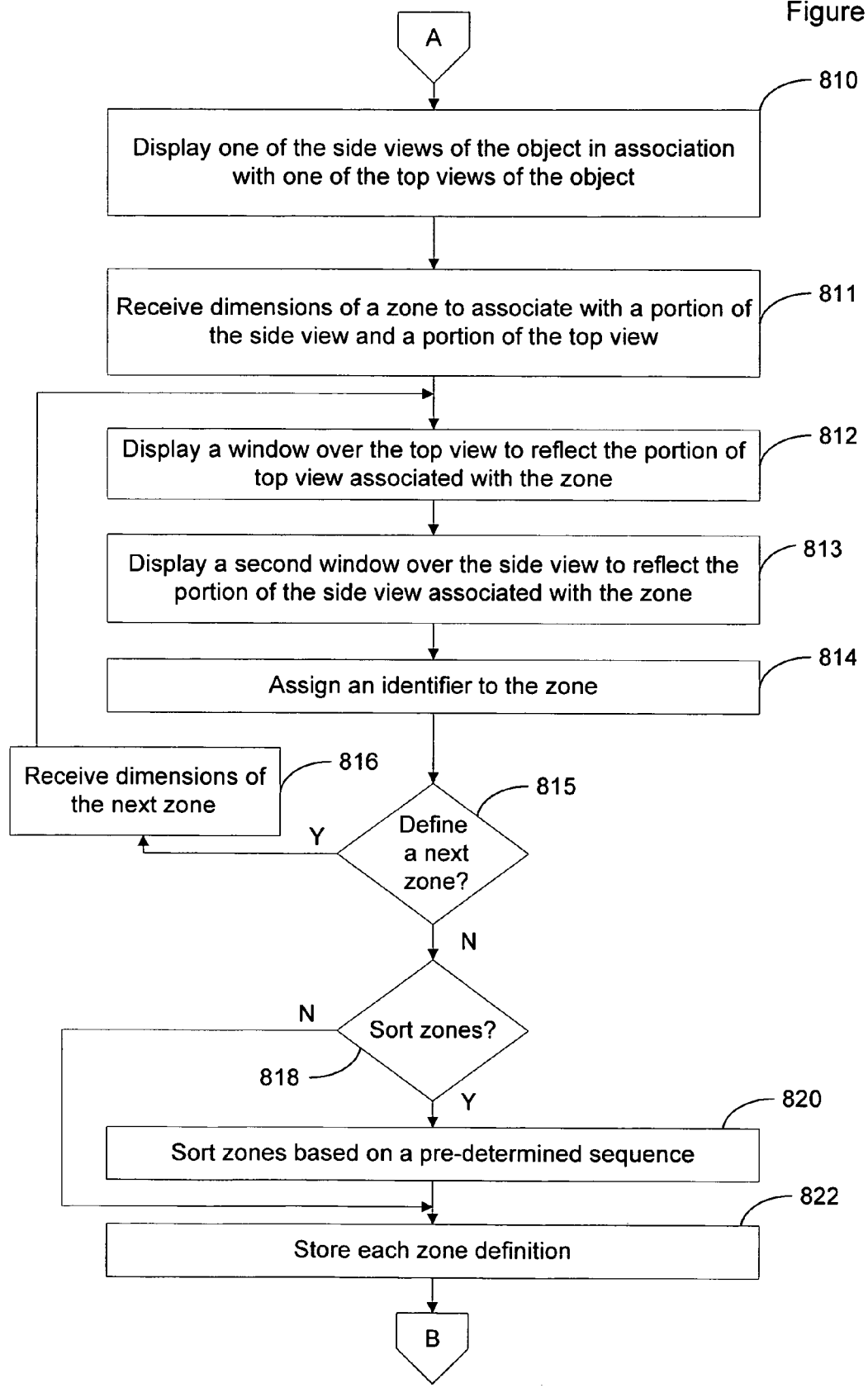
Figure 13:
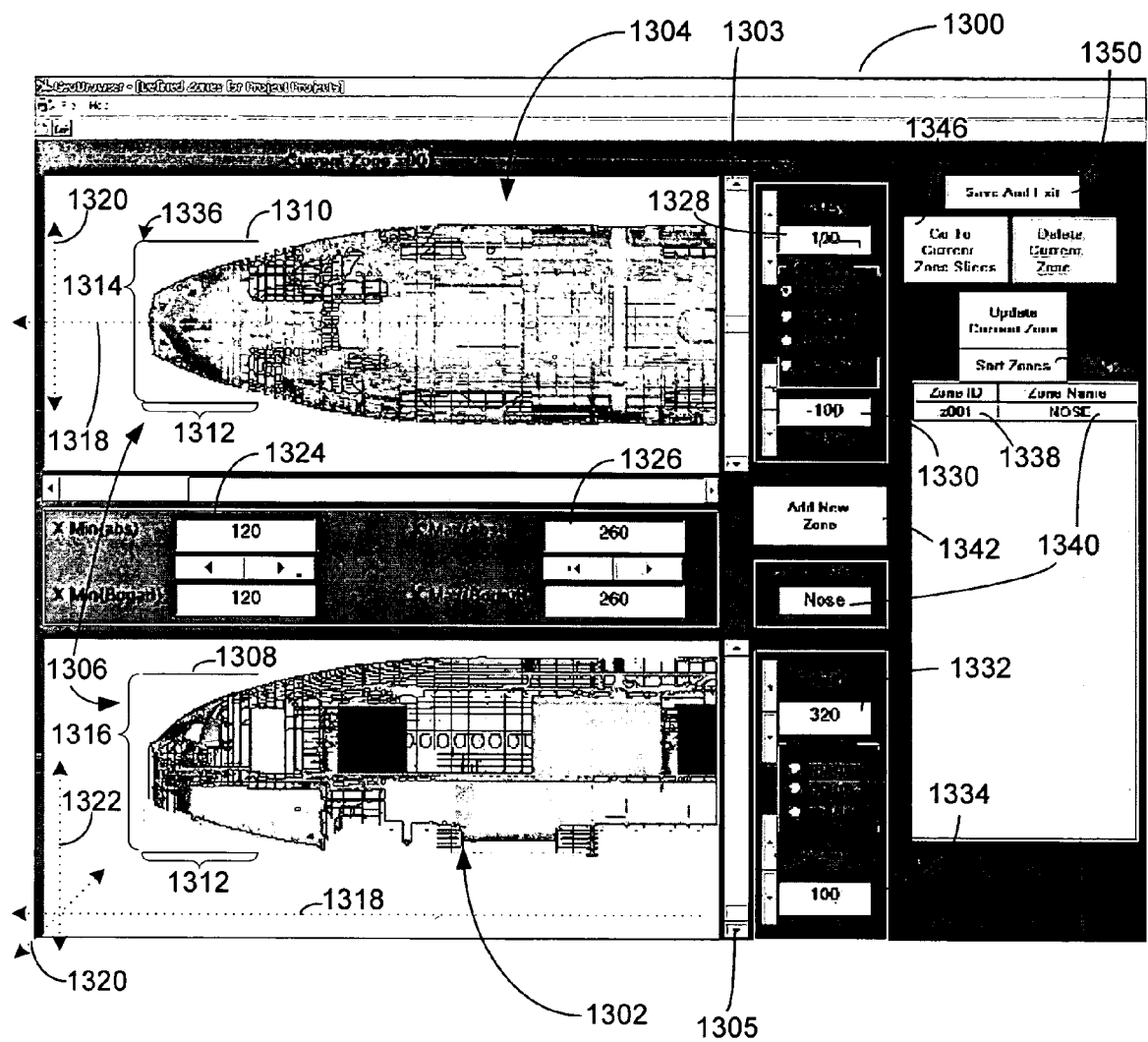
FIGS. 13-14 depict an exemplary user interface displayed by the image generator controller, where one of the side views of the object is displayed in association with one of the top views of the object to allow a user to define a zone of the object.

If a request to define a zone is received, the controller 131 then displays one of the side views of the object in association with one of the top views of the object (step 810 in FIG. 8B). In one implementation, the image generator controller 131 displays a user interface 1300 as shown in FIG. 13 in which the side view 1302 of the object is displayed below and in alignment with the top view 1304 of the object to enable the user to more easily define a zone of the object. The image generator controller 131 allows the user to actuate the scroll bars 1303 and 1305 to move other portions of the side view 1302 and the top view 1304 into display such that the complete views 134 and 138 may be seen. Additional side and top views are available so the user can display alternate views of complex objects.

Next, the controller 131 receives one or more dimensions of a zone to associate with a portion of the side view and a portion of the top view (step 811). The controller 131 then displays a first window over the top view to reflect the portion of top view associated with the zone (step 812) and displays a second window over the side view to reflect the portion of the side view associated with the zone (step 813). The dimensions of the zone (e.g., zone 1306 in FIG. 13 as reflected by the first window 1308 and the second window 1310) may include a width 1312, a depth 1314, and a height 1316 as referenced from one of the views of the object (e.g., side view 1302). Although the zone 1306 defined in FIG. 13 has a rectangular shape, the zone 1306 may have a radius dimension (not shown in figures) and be defined to have a corresponding cylindrical or spherical shape.

The dimensions 1312, 1314, and 1316 and position of the zone 1306 may initially be identified by the controller 131 and then modified or adjusted by the user. The zone dimensions 1312, 1314, and 1316 may be defined in relation to the x, y, z, coordinate system (e.g., x-axis 1318, y-axis 1320, and z-axis 1322) so the position of the zone 1306 is derived from the zone dimensions. For example, in the implementation depicted in FIG. 13, the user may identify the width 1312 of the zone to the controller 131 by specifying a first coordinate 1324 and a second coordinate 1326 in relation to a first axis (e.g., y-axis 1320) in the direction of a second axis (e.g., x-axis 1318) that is perpendicular to the first axis. The difference between the first 1324 and second 1326 coordinates defines the width 1312 in the direction of the second axis or x-axis 1318 in FIG. 13. The user may identify the depth 1314 of the zone to the controller 131 by specifying a third coordinate 1328 and a fourth coordinate 1330 in relation to the second axis (e.g., x-axis 1318) in the direction of the first axis (e.g., y-axis 1320). The difference between the third 1328 and fourth 1330 coordinates defines the depth 1314 in the direction of the first axis or y-axis in FIG. 13. The user may identify the height 1316 of the zone to the controller 131 by specifying a fifth coordinate 1332 and a sixth coordinate 1334 in relation to the second axis (e.g., x-axis 1318) in the direction of a third axis (e.g., z-axis 1322). The difference between the fifth 1332 and sixth 1334 coordinates defines the height 1316 in the direction of the first axis or z-axis in FIG. 13.

The user may alternatively identify the position of the zone and the zone dimensions 1312, 1314, and 1316 by using the mouse to 128 to designate a point 1336 on either the side view 1304 or the top view 1306 and dragging the mouse away from the point 1336, causing the image generator controller 131 to display the first window and the second window at the desired zone position and with the desired zone dimensions.

Returning to FIG. 8B, the controller 131 next assigns an identifier to the zone (step 814). As shown in FIG. 13, the controller 131 assigns the zone identifier 1338 to the zone 1306. The controller 131 may also allow the user to associate a name 1340 with the respective zone 1306. Each zone 1306 defined using the controller 131 has a different identifier so that the controller 131 may differentiate between stored zone definition files.

The controller 131 then determines whether a next zone is to be defined (step 815). In the implementation shown in FIG. 13, the user selects a button 1342 on the user interface 1300 to signal the controller 131 that a next zone is to be defined. If a next zone is to be defined, the controller 131 receives the dimensions of the next zone (step 816) in a similar manner as in step 811 and continues processing at step 812.

If a next zone is not to be defined, the controller 131 determines whether the zones are to be sorted (step 818). If the zones are to be sorted, the controller 131 sorts the zones (e.g., zone 1306) based on a pre-determined sequence (step 820). Because the controller 131 allows a user to arbitrarily define or modify zones with regard as to the position of each zone (e.g., zone 1306) in reference to a view (e.g., side view 1302) of the object, the controller 131 enables the user to prompt the controller 131 to sort the defined zones in a pre-determined sequence 1402 so that the controller 131 subsequently presents images 148A-N in a corresponding order when accessed by the user via a browser 164. In the implementation shown in FIGS. 13 and 14, the user may select button 1342 to prompt the controller 131 to sort the defined zones (e.g., zone 1306) in the pre-determined sequence 1402. The pre-determined sequence 1402 may reflect an ordering of the zones in a direction along the x-axis 1318, y-axis 1320, or z-axis 1322 of the coordinate system. For example, zones of the aircraft object depicted in the side view 1302 and top view 1304 in FIGS. 13 and 14 may be sorted from the nose to the tail of the aircraft when the pre-determined sequence 1402 reflects an ordering from left to right along the x-axis 1318. Alternatively, the pre-determined sequence 1402 may reflect a viewing arrangement of the zones as identified by the user such as the order of the zones as originally defined by the user.

Figure 14:
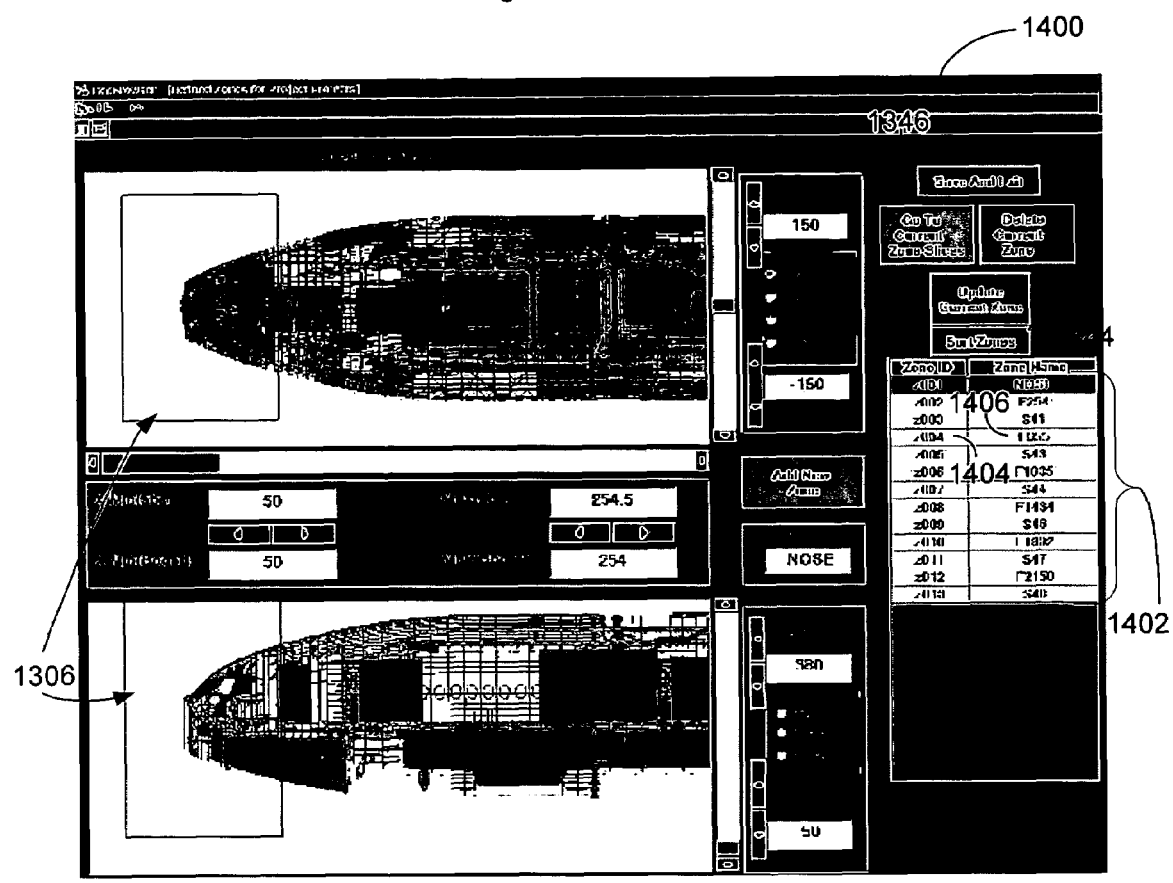

If zones are not to be sorted or after the zones are sorted based on the pre-determined sequence 1402, the controller 131 then stores each zone definition in a file 140A-N (step 822). FIG. 15 depicts an exemplary zone definition file 1500 generated by the controller 131 in accordance with methods and systems consistent with the present invention. The zone definition file 1500 includes zone definitions 1502, 1504, 1506, 1508, 1510, 1512, 1514, 1516, 1518, 1520, 1522, 1524, and 1526. In this example, zone definition 1502 is generated and stored by the controller 131 to reflect zone 1306 as shown in FIG. 14. In one implementation, each zone definition (e.g., 1502) stored in a respective zone definition file 140A-N (e.g., file 1500) includes the coordinates 1324, 1326, 1328, 1330, 1332, and 1334 that identify the position of the zone within the x, y, z coordinate system associated with the views of the object as depicted in FIG. 13. In this implementation, the controller 131 may derive the zone dimensions (e.g., width 1312, depth 1314, and height 1316) during subsequent processing from the coordinates 1324, 1326, 1328, 1330, 1332, and 1334. Alternatively, the controller 131 may store the zone dimensions 1312, 1314, and 1316 for each zone with a single x, y, z coordinate (e.g., 1324, 1328, and 1332, respectively) in the zone definition file 140A-N to identify the size and relative position of the respective zone (not shown in figures). The controller 131 also stores the zone identifier 1338 and name 1340, if provided, with the zone definition (e.g., definition 1502 for zone 1306). The controller 131 may also store dimensions (e.g., x-coordinate 1528 for the left side, the y-coordinate 1530 for the bottom, width 1532, and height 1534, x-coordinate 1536 of the center) for deriving a cross section (e.g., slice selection image boundary 1602 in FIGS. 16A-B) of the zone that encompasses each of the slices defined for the zone as discussed below. In one implementation, the controller 131 uses the cross-sectional dimensions to generate a corresponding cross section geometric image used by the image viewer 132 to allow a user to navigate between slices of the zone in accordance with methods consistent with the present invention. The controller 131 may also store dimensions (e.g., y-coordinate 1538 for left side, z-coordinate 1540 for bottom, width 1542, and height 1544) for deriving a boundary for each slice image (e.g., slice image boundary 1806 in FIG. 18) defined for the zone. The controller 131 may store multiple zone definitions in the same zone definition file (e.g., definition file 140A) or in different zone definition files (e.g., definition files 140A-N).

Figure 8C:
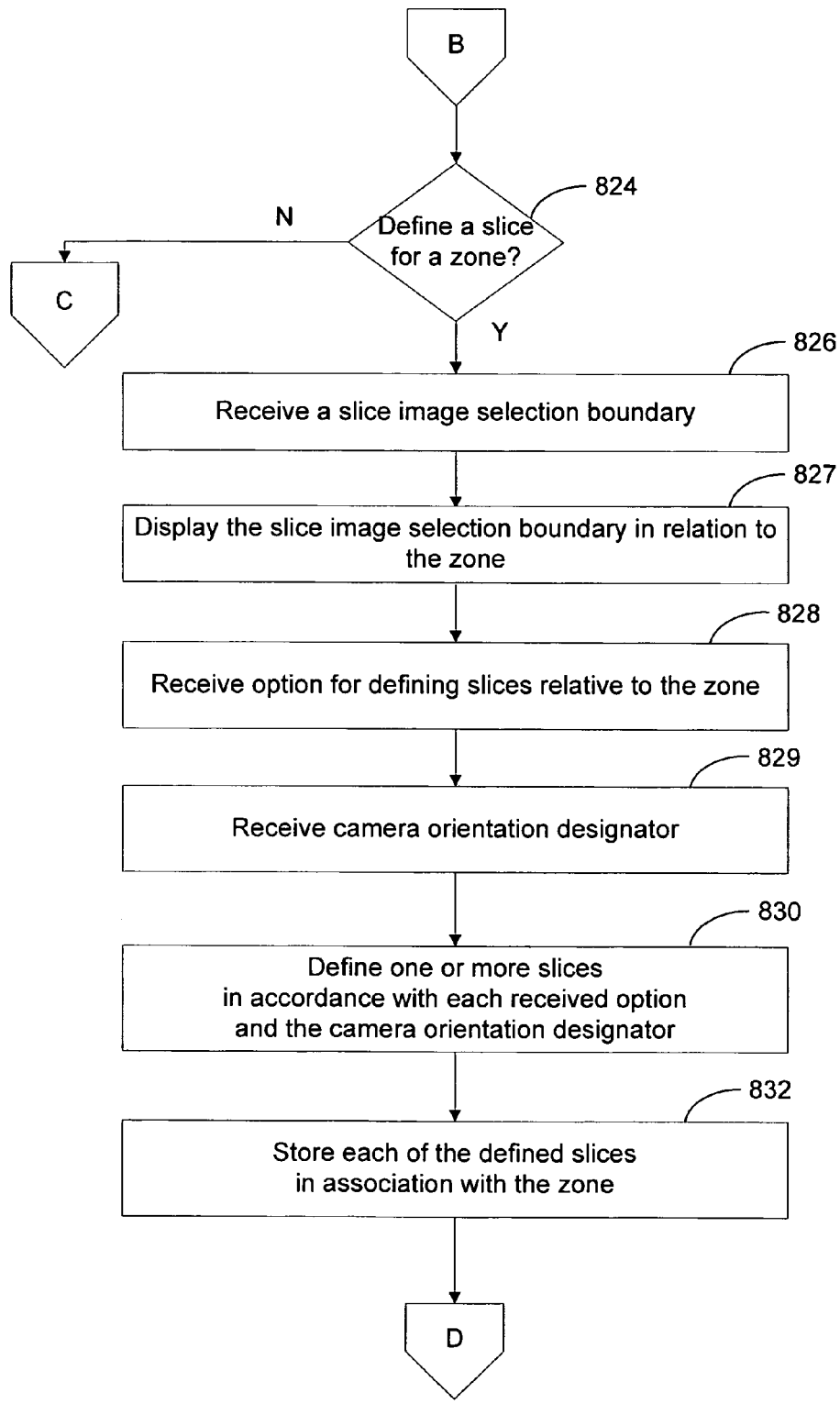

Turning to FIG. 8C, the controller 131 next determines whether to define a slice for a selected zone (step 824). In the implementation shown in FIGS. 13-14, the user selects button 1346 on the user interface 1300 to signal the controller 131 to define a slice for a currently selected zone (e.g., zone 1306). Alternatively, the user may identify one of the defined zones as reflected by the pre-determined sequence 1402 to the controller 131 by clicking on the identifier 1404 or name 1406 of the zone. If a slice is not to be defined (e.g., the user has not selected button 1346 within a predetermined time), the controller 131 may end processing.

Figure 16A:
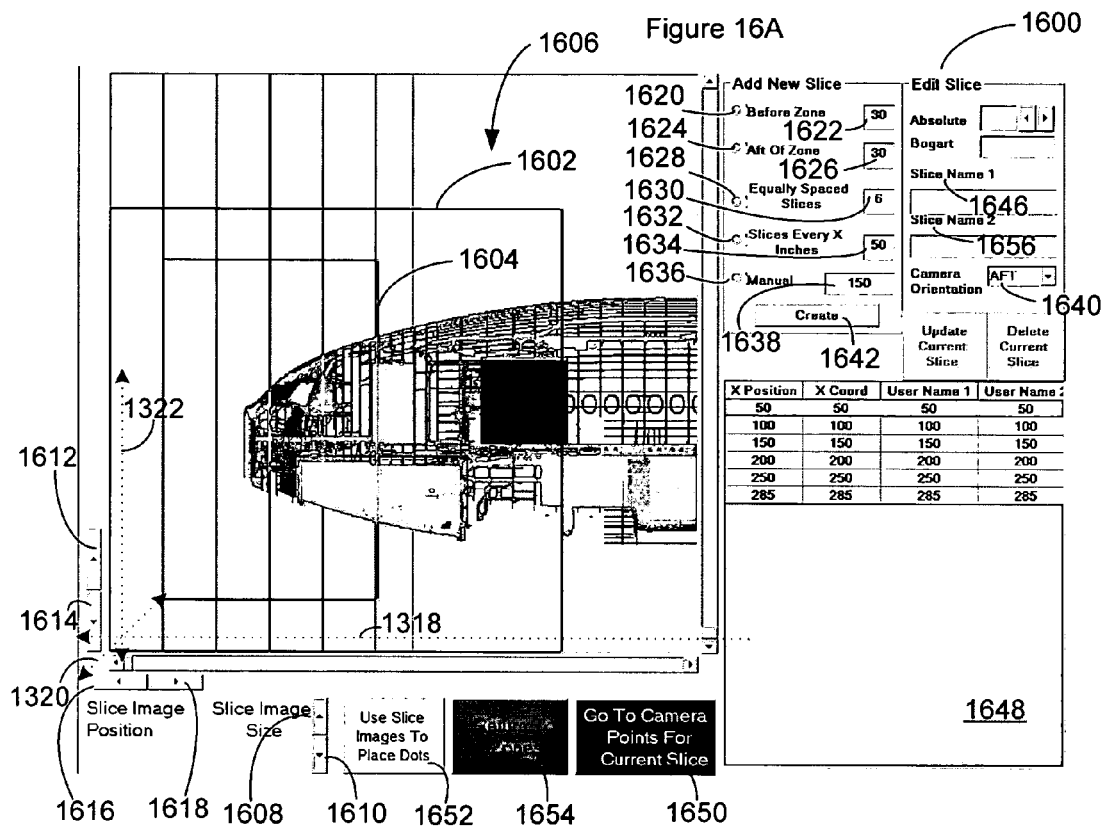
FIG. 16A depicts an exemplary user interface displayed by the image generator controller to allow a user to define one or more slices to associate with a defined zone of the object.
Figure 16B:
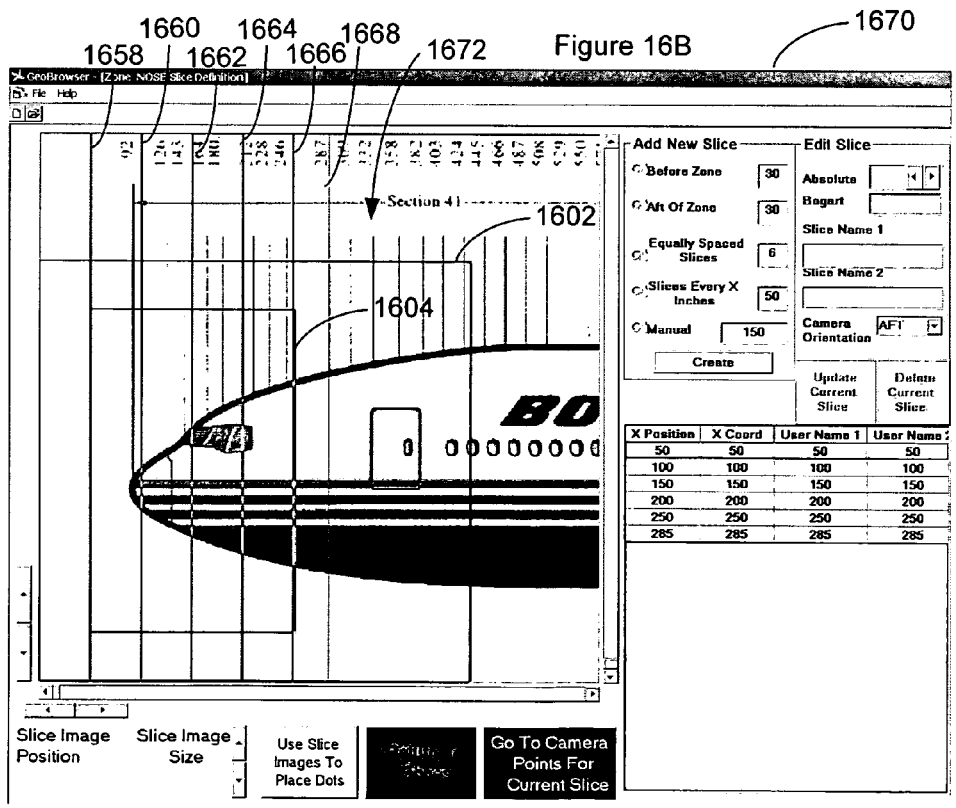
FIG. 16B depicts another exemplary user interface displayed by the image generator controller to allow a user to define one or more slices to associate with a defined zone of the object.

If a slice is to be defined, the controller 131 then receives a slice selection image boundary (step 826) and displays the slice selection image boundary in relation to the selected zone (step 827). FIG. 16A depicts a user interface 1600 generated by the controller 131 in which the slice selection image boundary 1602 is displayed in relation to the selected zone 1604 as previously defined in association with a portion of the side view 1606. In the implementation shown in FIG. 16A, the side view 1606 is a cross section geometric image of the object model 50 the controller 131 previously caused the image generator 50 to produce and that was identified in the object information file 700 in accordance with methods and systems consistent with the present invention. FIG. 16B depicts another user interface 1670 generated by the controller 131 that corresponds to the user interface 1600. In the implementation shown in FIG. 16B, the side view 1672 is a photograph or artist rendered image of the object that corresponds to the cross section geometric image 1606 and that may be identified in the object information file 700 in accordance with methods and systems consistent with the present invention. Although both user interfaces 1600 and 1670 may be used to define slices in relation to the selected zone 1604, for brevity in the discussion, user interface 1600 will be explained in detail.

The slice selection image boundary 1602 is used by the controller 131 to set the boundary of the image that the viewer 132 uses to present a cross section geometric image to the user for selecting a slice to view. As discussed in further detail below, the controller 131 provides the slice selection image boundary 1602 as a clipping plane to the image generator 50 so that the corresponding cross section geometric image produced by the image generator excludes geometry data 112 outside the boundary 1602. The size of the slice selection image boundary 1602 may initially be set by the controller 131 to be larger than, equal to, or smaller than the size of the selected zone 1604. The controller 131 allows the user to adjust the slice selection image boundary 1602 size using buttons 1608 and 1610 to respectively increment or decrement the slice selection image boundary 1602 size. The controller 131 also allows the user to adjust the slice selection image boundary 1602 position relative to the selected zone 1604. For example, the user may select buttons 1612 and 1614 of user interface 1600 to respectively increment or decrement the position of the slice selection image boundary 1602 relative to the z-axis 1322 of the coordinate system in which the selected zone 1604 has been defined. The user may also select buttons 1616 and 1618 of user interface 1600 to respectively increment or decrement the position of the slice selection image boundary 1602 relative to the x-axis 1318 of the coordinate system. The controller 131 may also be configured to provide another set of buttons (not shown in the figures) to adjust the position of the slice selection image boundary 1602 relative to the y-axis 1320, for example, in a user interface in which the slice selection image boundary 1602 is displayed in relation to the selected zone 1604 as defined in association with the top view (e.g., 1304 of FIG. 3).

Next, the controller 131 receives one or more options for defining slices relative to the zone (step 828). In the implementation shown in FIG. 16A, the user may identify to the controller 131 a first option 1620 requesting a slice or plane be generated by the controller 131 at a first pre-determined distance 1622 in front of the selected zone 1604, a second option 1624 requesting a slice be generated by the controller 131 at a second pre-determined distance 1626 behind the selected zone 1604, a third option 1628 requesting that a pre-determined number 1630 of equally spaced slices be generated by the controller 131 within the selected zone 1604, a fourth option 1632 requesting a slice be generated by the controller 131 at each pre-determined interval 1634 within the selected zone 1604 along the x-axis 1318 of the coordinate system, or a fifth option 1636 ("manual option") requesting a slice be generated by the controller 131 at a third pre-determined distance 1638 from the z-axis 1322 along the x-axis 1318. The fifth option 1636 allows the user to specify a slice that may be outside the slice selection image boundary 1602. The controller 131 allows the user to select one or more of the options 1620, 1624, 1628, 1632, and 1636.

The controller 131 also may receive a camera orientation designator 1640 to associate with each slice to be defined (step 829). The camera orientation designator 1640 is used by the viewer 132 to define an initial orientation when the viewer 132 first displays one of the six geometric images 148A-N associated with a selected camera viewpoint. The camera orientation designator 1640 may be set to "Aft" to indicate that a camera viewpoint associate with the respective slice is positioned to look to the rear of the object model 52, "For" to indicate that a camera viewpoint associated with the respective slice is positioned to look to the front of the object model 52, "Top" to indicate that a camera viewpoint associated with the respective slice is positioned to look down from the top of the object model 52, "Bot" to indicate that a camera viewpoint associated with the respective slice is positioned to look up from the bottom of the object model 52, "Rht" to indicate that a camera viewpoint associated with the respective slice is positioned to look from the center towards the right of the object model 52, and "Lft" to indicate that a camera viewpoint associated with the respective slice is positioned to look from the center towards the left of the object model 52.

Figure 17:
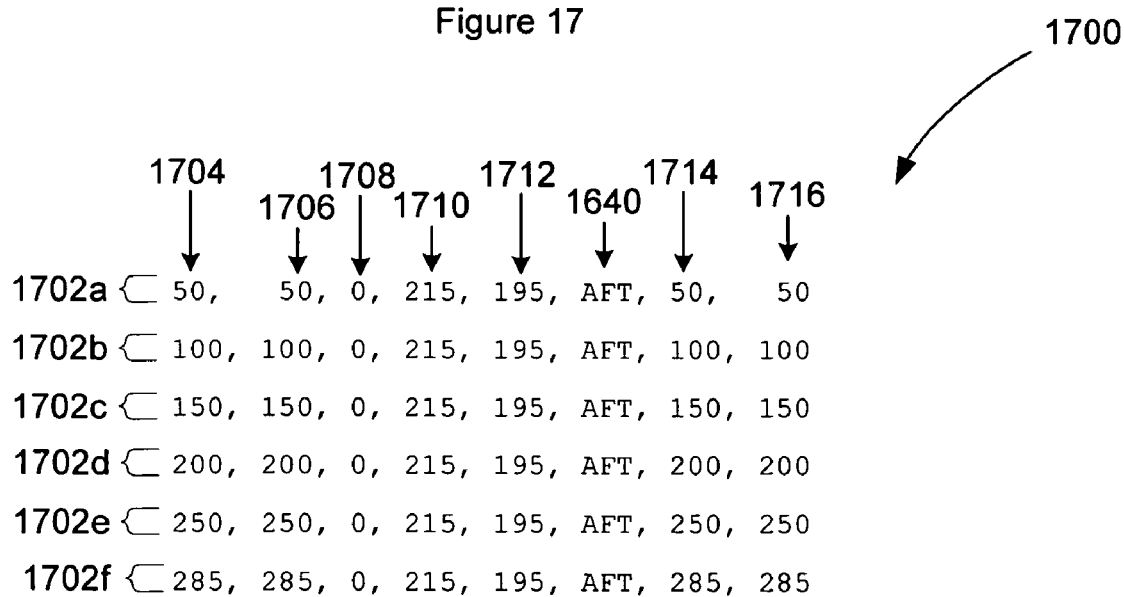
FIG. 17 depicts an exemplary slice definition file generated by the image generator controller in accordance with methods and systems consistent with the present invention.

The controller 131 then defines one or more slices in accordance with each received option (step 830) and stores each of the defined slices in association with the selected zone (step 832). In the implementation shown in FIG. 16A, the user actuates the "create" button 1644 to prompt the controller 131 to define slices in accordance with each selected option 1620, 1624, 1628, 1632, and 1636. In the implementation shown in FIGS. 16A-B, the controller displays planes or lines 1658 . . . 1668 to reflect the defined slices in relation to the selected zone 1604. The controller 131 stores each slice definition defined in accordance with each selected options in one or more slice definition files 142A-N. FIG. 17 depicts an exemplary slice definition file 1700 generated by the controller 131 in accordance with methods and systems consistent with the present invention. As shown in FIG. 17, each slice definition 1702*a-f* includes a first slice coordinate 1704 of the respective slice 1702*a-f* along an axis (e.g., x-axis 1318) of the cross-section (e.g., slice selection image boundary 1602) of the zone used to define the slice. In the implementation shown in FIG. 17, the slices definitions 1702*a-f* were created by the controller 131 to correspond to six slices having a respective coordinate 1704 of 50, 100, 150, 200, 250, and 285 along the x-axis 1318 of the slice selection image boundary 1602 in response to the third option 1628 ("equally spaced slices") and the fifth option 1636 ("manual entry"). Each slice definition 1702*a-f* may also include a second slice coordinate 1706 that is a translation of the first coordinate 1704 to another coordinate system.

Each slice definition 1702*a-f* further includes a respective camera orientation designator 1640 and two coordinates 1708 and 1710 identifying a slice camera viewpoint in a plane parallel to or inline with the respective slice. In accordance with methods and systems consistent with the present invention, the controller 131 uses the camera orientation designator 1640 and the two coordinates 1708 and 1710 to cause the image generator 50 to produce a corresponding slice geometric image. For example, the controller 131 is able to access the slice definition 1702*d*, provide the image generator 50 with a camera viewpoint corresponding to the slice coordinates 1708 and 1710 identified in the slice definition 1702*d*, provide the image generator 50 with the camera orientation designator 1640 from the slice definition 1702*d*, and prompt the image generator 50 to render a slice geometric image (e.g., 3208 in FIG. 32B) along a plane located at the slice coordinate 1704 identified in the slice definition 1702*d*, such as the plane located at the x-coordinate of 200 and perpendicular to the x-axis 1318 of the aircraft object model 50.

Figure 23A:
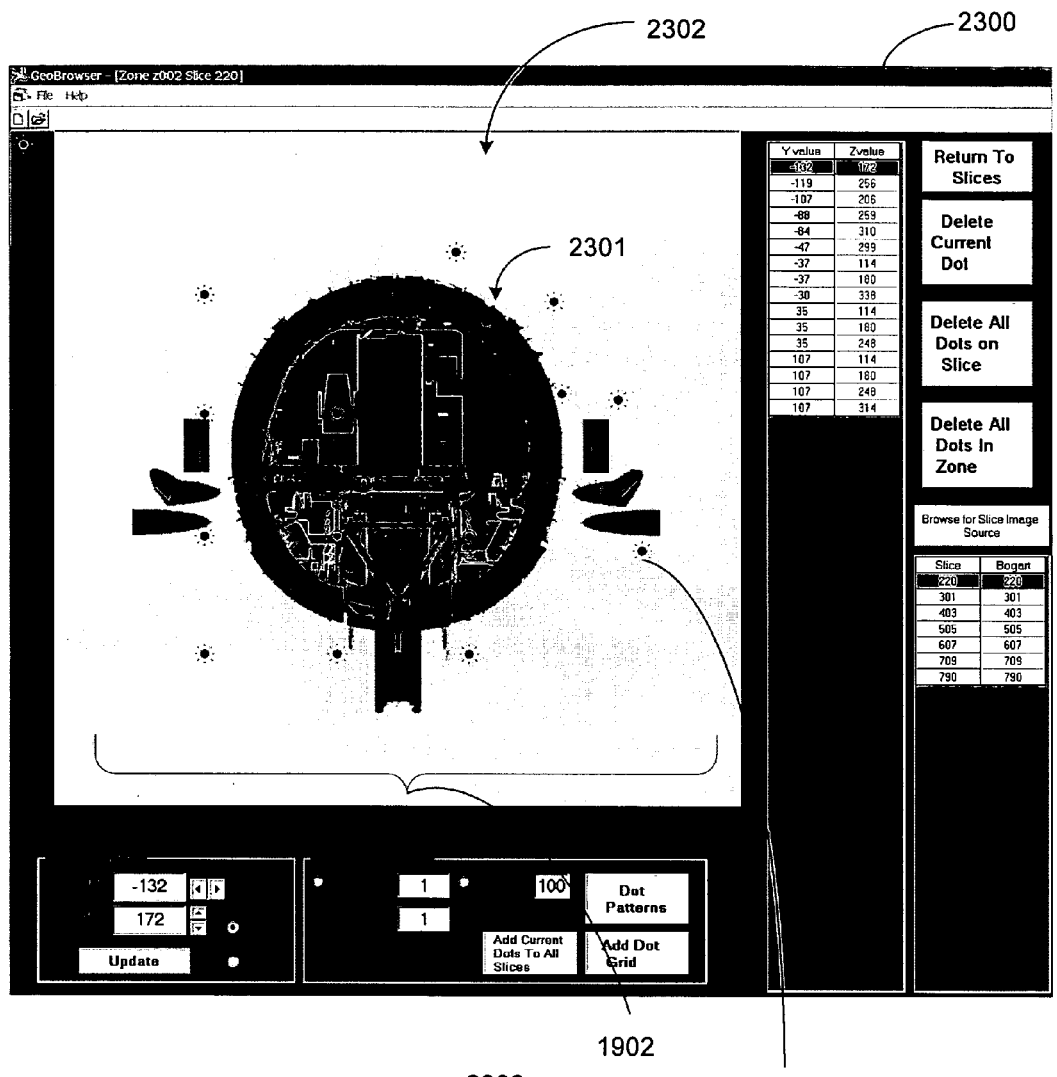
FIG. 23A depicts an exemplary user interface displayed by the image generator controller, where the pattern of viewpoints for the selected slice is displayed in association with the selected slice geometric image.

Each slice definition 1702*a-f* may also include a scale factor 1712 and a slice name 1714. The scale factor 1712 is used to size the geometry of the object (e.g., geometry 2301 in FIG. 23A) within the slice geometric image (e.g., image 2302 in FIG. 23A) so that the image viewer 132 is able to accurately position control objects, such as viewpoint 1926 in FIG. 23A. The slice name 1714 may be identified by a user to the controller 131 via a window 1646 of user interface 1600. After each slice is defined, the controller 131 displays the first slice coordinate 1704 (e.g., "x Position" in FIG. 16A), the second slice coordinate 1706 (e.g., "x Coord" in FIG. 16A), the slices names 1714 and 1716 for each defined slice in panel 1648 and 1656 of user interface 1600. If the user has not provided a second slice name 1716 to denote another plug or version of the object model 52, the second slice name 1716 is set by the controller to be the same as the first slice name 1714.

Figure 8D:
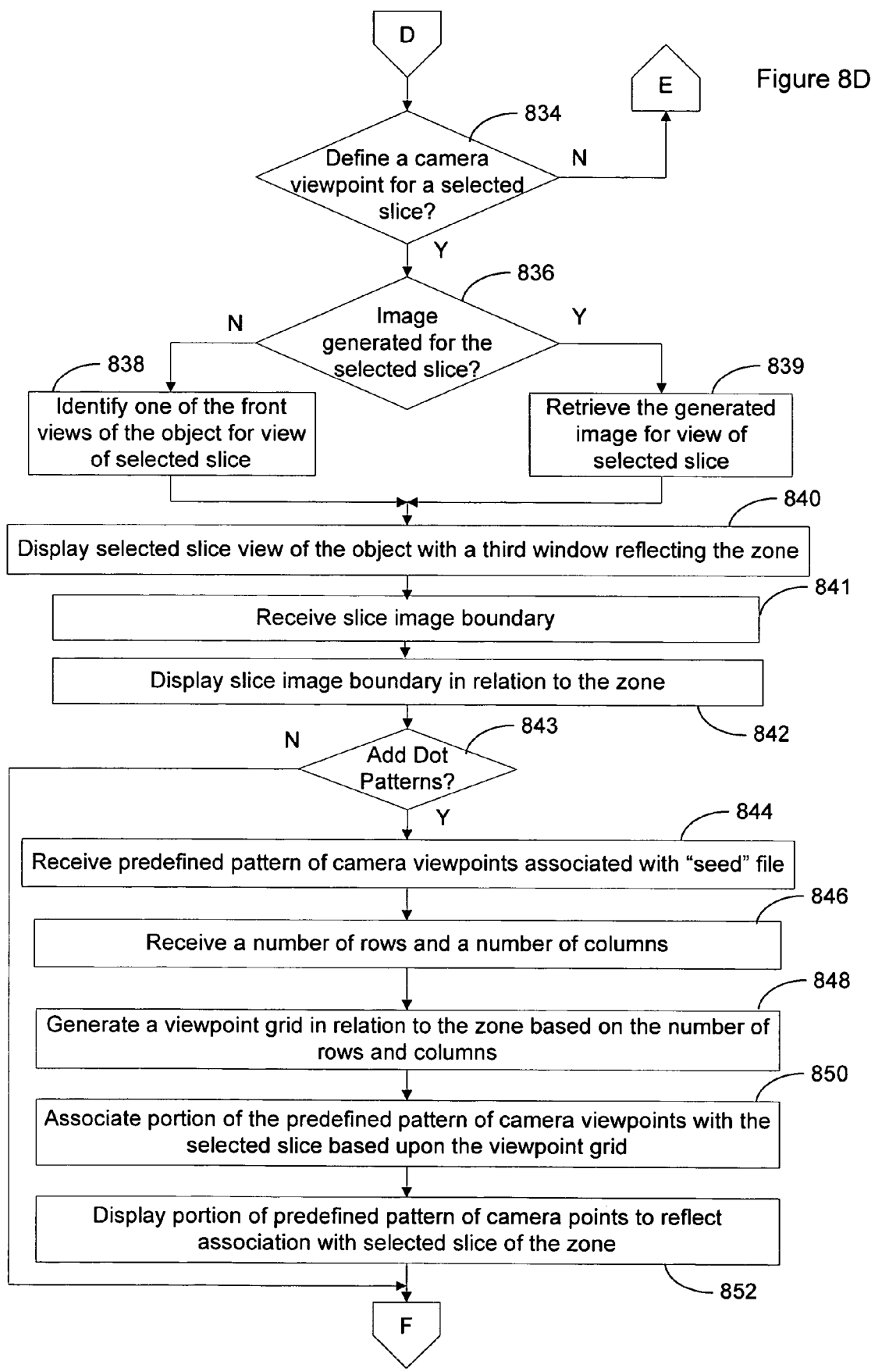

Turning to FIG. 8D, the controller 131 next determines whether to define a camera viewpoint for a selected slice (step 834). The user may identify the currently selected slice from among the defined slices by clicking on the respective slice name displayed by the controller in panel 1648 of the user interface 1600. In the implementation shown in FIG. 16A, the user selects a user interface button 1650 to signal the controller 131 to define one or more camera viewpoints for the currently selected slice as discussed in reference to FIGS. 18, 19, 20. In another implementation, the user may select another button 1652 to signal the controller 131 to use a slice geometric image previously generated by the controller 131 and associated with the project name 902 in accordance with the definition of the selected slice (e.g., slice geometric image 2302 in FIG. 23A corresponding to the slice definition 1702*a* having an x-coordinate of 50 in FIG. 17) before allowing the user to define or modify a camera viewpoint for the currently selected slice. Alternatively, the user may select another user interface button 1654 to prompt the controller 131 not to define camera viewpoints and to return to displaying zone user interface 1400. Accordingly, if no camera viewpoint is to be defined, the controller 131 proceeds to step 808 to continue processing.

Figure 22:
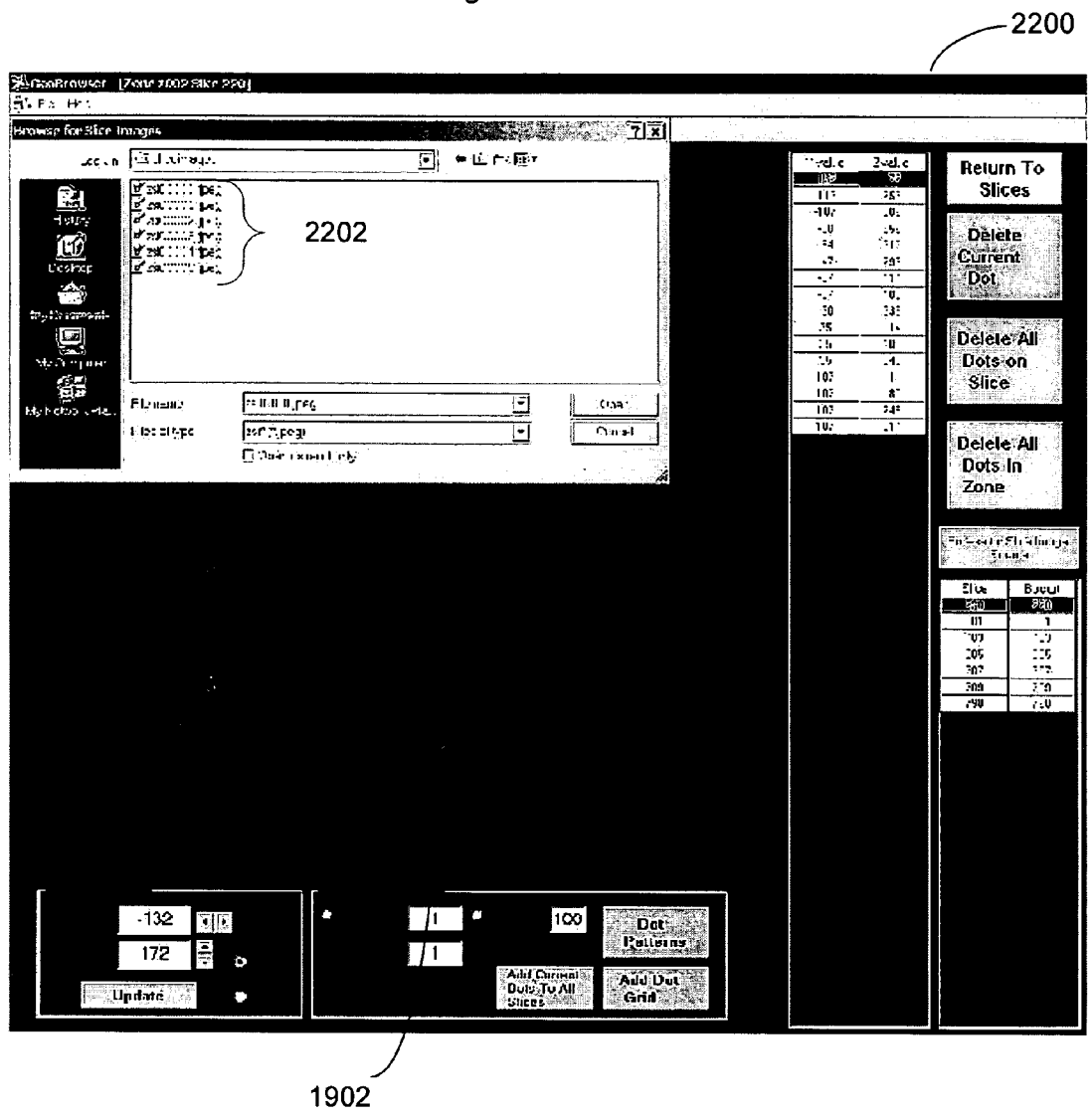
FIG. 22 depicts an exemplary user interface displayed by the image generator controller to allow a user to select an existing slice geometric image corresponding to the selected slice.

If a camera viewpoint is to be defined, the controller 131 determines whether an image is generated for the selected slice (step 836). If an image is not generated for the selected slice, the controller 131 identifies one the front views of the object as the selected slice view (step 838). If an image is generated for the selected slice, the controller 131 retrieves the generated image for the selected slice view (step 839). The user may indicate to the controller 131 that an image for the selected slice has not yet been generated by signaling the controller 131 via push button 1650 in FIG. 16A. In one implementation, the controller 131 may verify or automatically recognize whether an image (e.g., slice geometric image 2402 in FIG. 24) has been generated by searching for an image having an identifier or name corresponding to the identifier or name of the selected slice. Alternatively, the user may indicate to the controller 131 that an image for the selected slice has been generated by first signaling the controller 131 via button 1652 to locate slice geometric images associated with the selected zone 1604 in FIG. 16A and to display identifiers 2202 corresponding to the located images as shown in FIG. 22. The user may then select one of the image identifiers 2202 to identify to the controller 131 the image 2402 for the selected slice so the user may view and modify the pattern of camera viewpoints associated with the selected slice as further explained below.

Next, the controller 131 displays the selected slice view of the object with a third window reflecting the zone (step 840). In the implementation depicted in FIG. 18, after determining an image has not been generated for the selected slice, the controller 131 displays a user interface 1800 with a front view 1802 of the object as the selected slice view and displays the third window 1804 to reflect the zone associated with the selected slice.

The controller 131 then receives a slice image boundary (step 841) and displays the slice image boundary in relation to the zone (step 842). In the implementation shown in FIG. 18, the controller 131 displays window 1806 to reflect the slice image boundary associated with the slice associated with the zone 1804. The slice image boundary 1806 is used by the controller 131 to set the boundary of each slice geometric image that the viewer 132 may present to the user. The controller 131 provides the slice image boundary 1802 as a clipping plane to the image generator 50 so that the corresponding slice geometric image produced by the image generator excludes geometry data 112 outside the boundary 1806.

The controller 131 initially sets the slice image boundary 1806 to have a size and position that encompasses the zone 1804. The size and position of the 1806 are derived from the slice image boundary dimensions (e.g., y-coordinate of the left side 1538, the z-coordinate of the bottom 1540, width 1542, and height 1544) stored in the definition 1502 for the zone. The controller 131 allows the user to adjust the slice image boundary 1806 size using buttons 1808 and 1810 to respectively increment or decrement the slice image boundary 1806 size. The controller 131 also allows the user to adjust the slice image boundary 1806 position relative to the selected zone 1804. For example, the user may select buttons 1812 and 1814 of user interface 1800 to respectively increment or decrement the position of the slice image boundary 1806 relative to the z-axis 1322 of the coordinate system in which the selected zone 1804 has been defined. The user may also select buttons 1816 and 1818 of user interface 1600 to respectively increment or decrement the position of the slice image boundary 1806 relative to the y-axis 1320 of the coordinate system.

The controller 131 next determines whether to associate a pattern of viewpoints with the selected slice as part of the definition for the selected slice (step 843). In the implementation shown in FIG. 18, the user signals the controller 131 to associate a predefined pattern of viewpoints with the selected slice (e.g., slice corresponding to slice definition 1702*a* having a x-coordinate 1704 of 50 and reflected by the front view 1802) by actuating a button 1820 ("Dot Patterns" button) on user interface 1800. If a predefined pattern of viewpoints is not to be associated with the selected slice, the controller 131 continues processing at step 856. If a pattern of viewpoints is to be associated with the selected slice, the controller 131 receives a predefined pattern of camera viewpoints associated with the "seed" file (step 844). The controller 131 may receive the predefined pattern of camera viewpoints by accessing the seed or object information file 700 to identify the respective position (e.g., x-coordinate and y-coordinate) relative to the selected slice of each of the camera viewpoints in the predefined pattern 1902 as reflected in the user interface 1900 in FIG. 19.

The controller 131 may also receive a number of rows and a number of columns to associate and display the pattern of camera viewpoints with the selected slice (step 846). The user may identify the number of rows 1904 and the number of columns 1906 to the controller 131 via user interface 1900.

Figure 19:
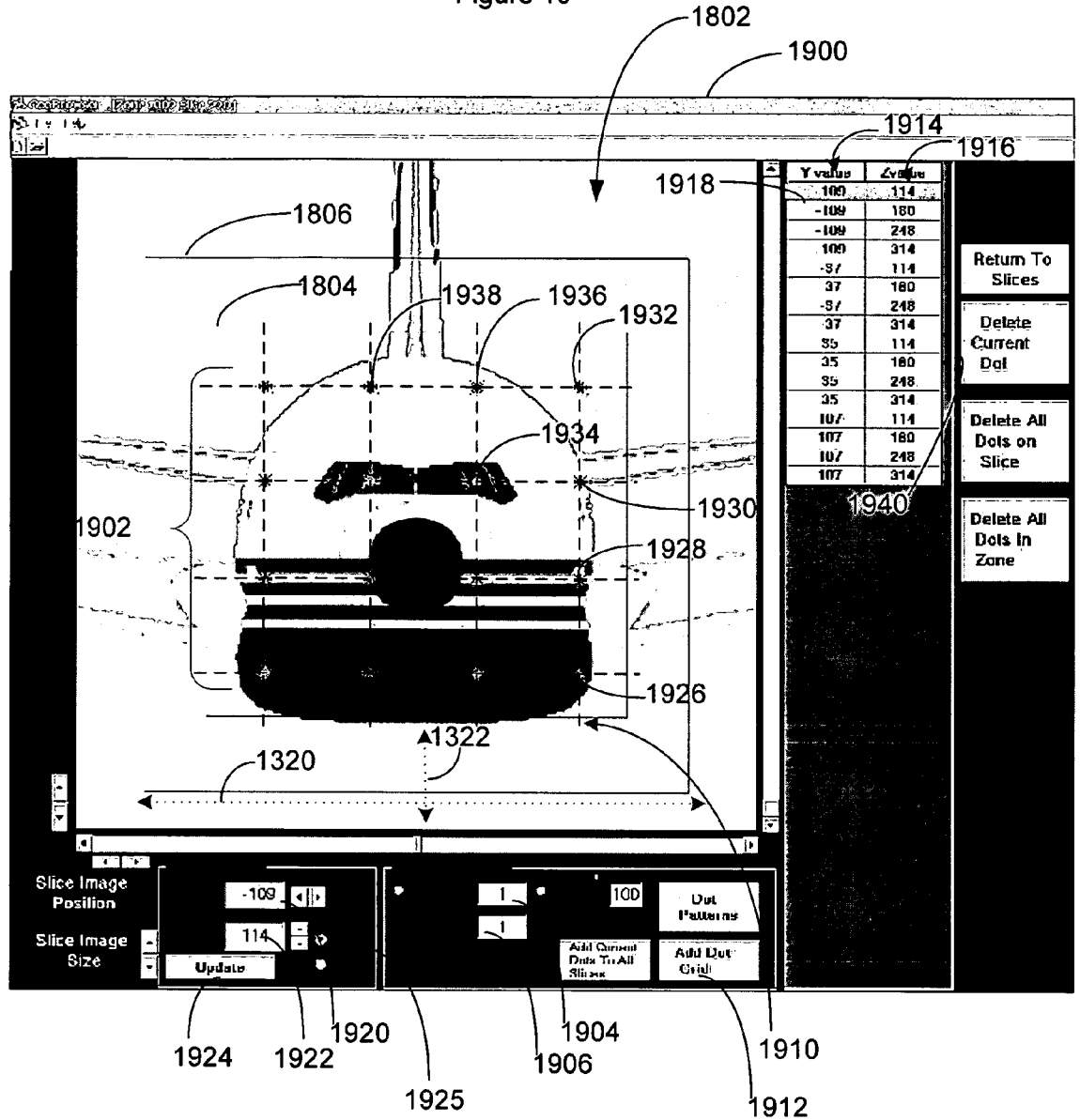

The controller 131 then generates a viewpoint grid in relation to the zone based on the number of rows and columns (step 848), the pattern of camera viewpoints with the selected slice based upon the viewpoint grid (step 850), and displays the predefined pattern of camera viewpoints to reflect the association with selected slice of the zone (step 852). For example, as shown in FIG. 19, the controller 131 generates the viewpoint grid 1910 in relation to the zone identified by the window 1804 (e.g., zone 1804), associates the viewpoints 1902 with the selected slice of the zone 1804 as reflected by the front view 1802 or the slice geometric image 2302 in FIG. 23A, where the position of each of the viewpoints 1902 corresponds to a row and column crossing in the grid 1910. The grid 1910 is shown in broken lines to indicate that it is not necessarily displayed by the controller 131. In one implementation, the user may signal the controller 131 via user interface button 1912 to display the grid 1910, enabling the user to more accurately move or add a camera viewpoint.

As shown in FIG. 19, the position of each of the viewpoints 1902 may be defined by first and second coordinates 1914 and 1916 relative to two axes (e.g., y-axis 1320 and z-axis 1322) of the object model 52 coordinate system that are parallel to the plane formed by the selected slice (e.g., slice 2302 in FIG. 23A) within the zone 1804. The controller 131 may display the first and second coordinates 1914 and 1916 for each of the viewpoints 1902 in a panel 1918 of the user interface 1900.

Figure 8E:
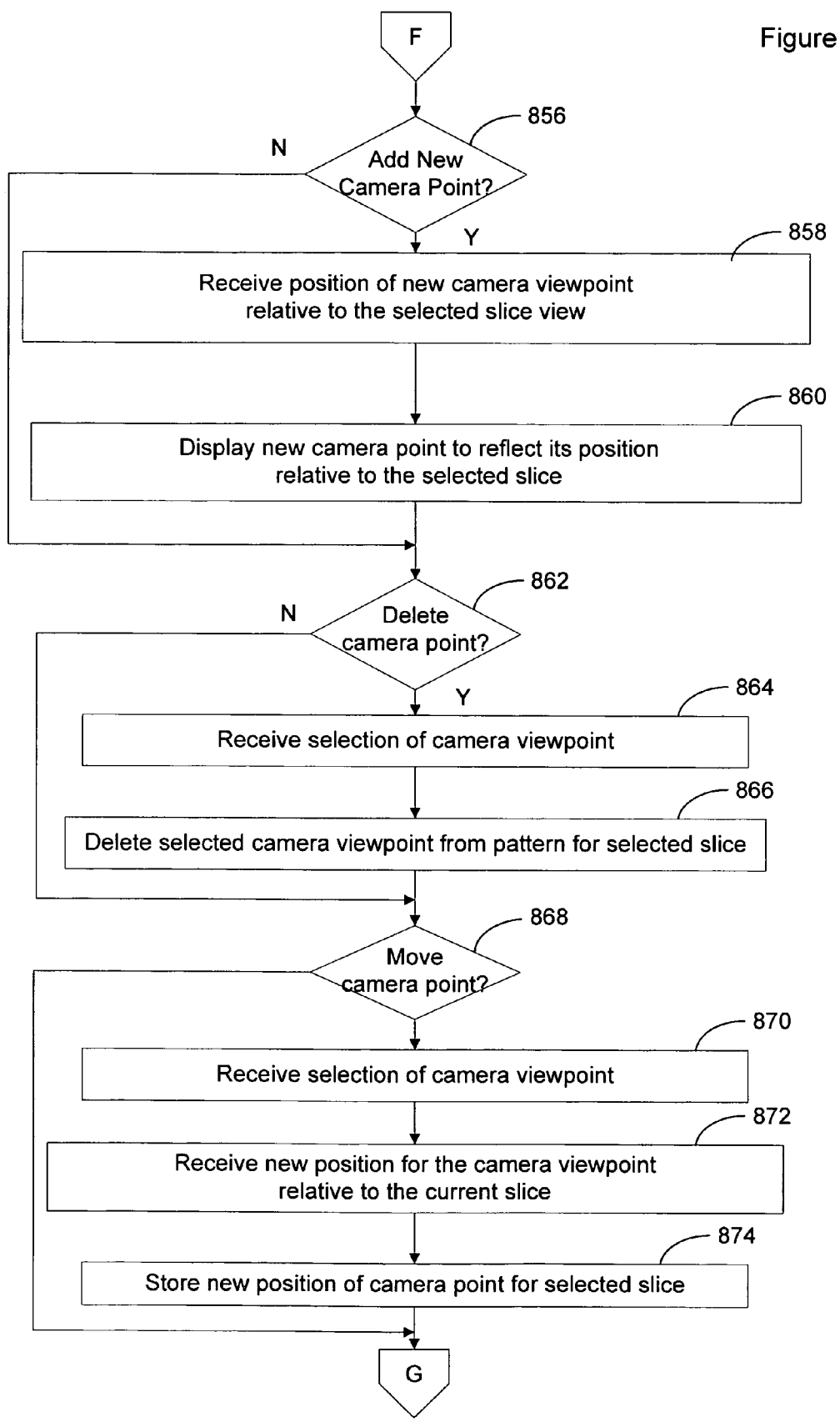

Turning to FIG. 8E, the controller 131 next determines whether a new camera viewpoint is to be added to the pattern of viewpoints associated with the selected slice (step 856). If a new camera viewpoint is to be added, the controller 131 receives a position of the new camera viewpoint relative to the selected slice view (step 858). The controller 131 then displays the new camera viewpoint to reflect its position relative to the selected slice (step 860). In the implementation shown in FIG. 19, the controller 131 may signal that a new viewpoint is to be added by deselecting a currently selected or highlighted viewpoint on the user interface 1900, providing first and second coordinate values 1920 and 1922 via user interface 1900, and then actuating update button 1924 to signal the controller 131 to add a new viewpoint at the first and second coordinate values 1920 and 1922.

If a new camera viewpoint is not to be added or after displaying the new camera viewpoint, the controller 131 determines whether a camera view point is to be deleted (step 862). If a camera point is to be deleted, the controller 131 receives a selection of one of the camera viewpoints to delete (step 864) and deletes the selected camera viewpoint from the pattern of viewpoints associated with the selected slice (step 866). In the implementation shown in FIG. 19, the controller 131 allows the user to select one of the viewpoints 1902 via a mouse click or other stylus input. The user may then signal the controller 131 to delete the selected one of the viewpoints 1902 by actuating the button 1940 (e.g., "Delete Current Dot" button).

Figure 20:
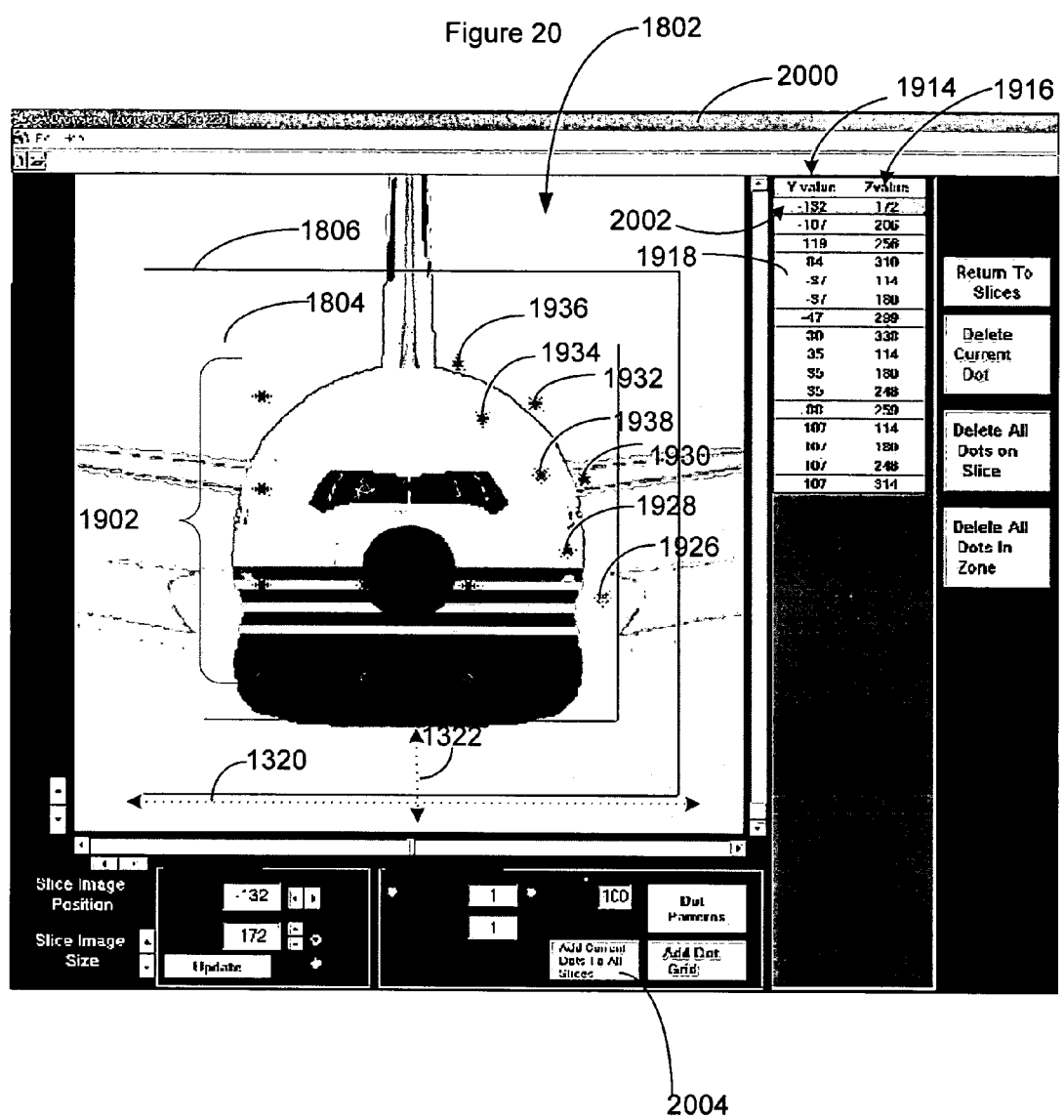

If a camera viewpoint is not to be deleted or after deleting the selected camera viewpoint, the controller 131 determines whether one or more camera viewpoints are to be moved (step 868). If a camera point is to be moved, the controller 131 receives a selection of one of the camera viewpoints to move (step 870). The controller 131 then receives a new position for the selected camera viewpoint relative to the selected slice (step 872) and stores the new position of the camera viewpoint for the selected slice (step 874). The controller 131 may also display the camera viewpoint to reflect its new position relative to the selected slice. In the implementation shown in FIG. 19, the controller 131 allows the user to select one of the viewpoints 1902 via a mouse click or other stylus input. The user may then use the mouse "drag and drop" technique to move the selected viewpoint (e.g., viewpoint 1926) to a new position 2002 as shown in FIG. 20. In one implementation, the user may move multiple viewpoints 1926, 1928, 1930, 1932, 1934, 1936, and 1938 before signaling the controller via update button 1924 to store the pattern of viewpoints 1902 in accordance with the respective current position of each of the viewpoints 1902 as reflected in the panel 1918 of user interface 1900. The user may also select a view point and use panels 1920 and 1922 to enter a new position as text or use the arrow controls to position the selected viewpoint in a pre-determined increment 1525, such as the increments of 1 and 10 that are selectable on the user interface 1900.

Figure 8F:
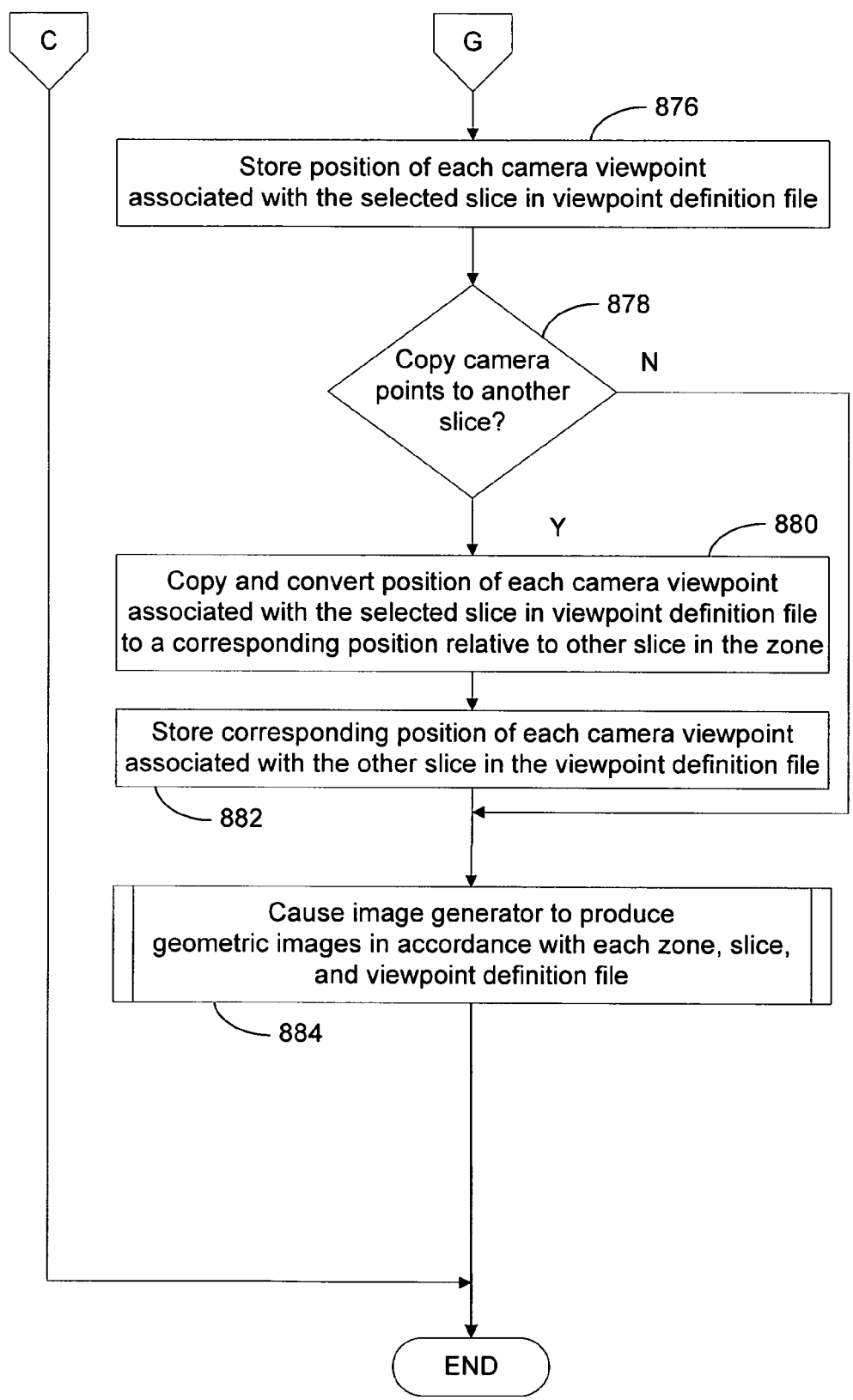
Figure 21:
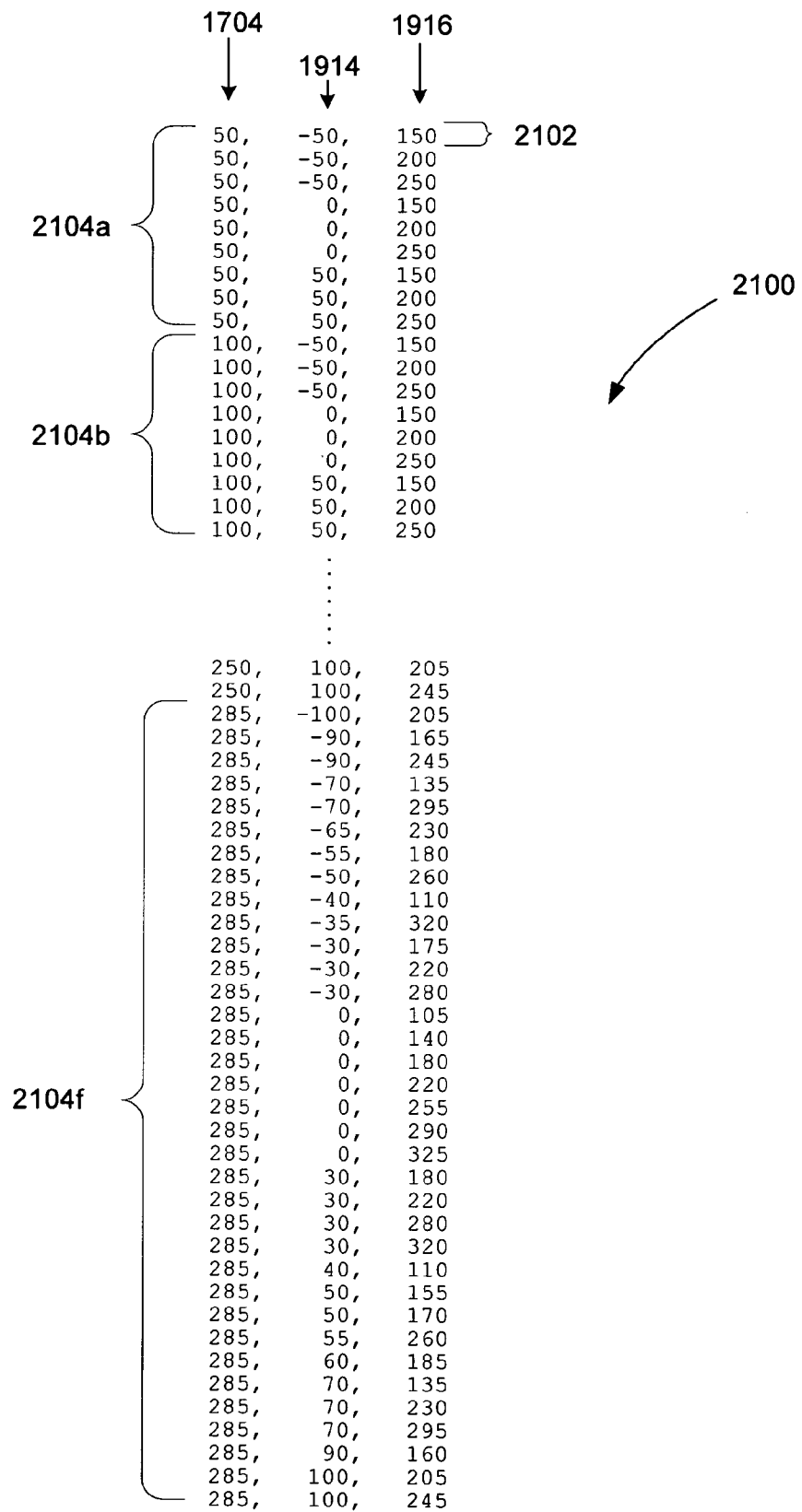
FIG. 21 depicts an exemplary viewpoint definition file generated by the image generator controller in accordance with methods and systems consistent with the present invention.

Turning now to FIG. 8F, if a camera viewpoint is not to be moved or after moving the selected camera viewpoint, the controller 131 stores the position of each camera viewpoint associated with the selected slice in a viewpoint definition file (e.g., viewpoint definition file 144A) (step 876). FIG. 21 depicts an exemplary viewpoint definition file 2100 generated by the controller 131 in accordance with methods and systems consistent with the present invention. In the implementation shown in FIG. 21, each viewpoint definition (e.g., viewpoint definition 2102) includes the first coordinate 1914 (e.g., relative to the y-axis 1320) and the second coordinate 1916 (e.g., relative to the z-axis 1322) defining the position of each viewpoint relative to a respective slice in the zone (e.g. zone 1804). To identify the respective slice associated with each viewpoint in the zone, each viewpoint definition 2102 also includes the first slice coordinate 1704 identifying the plane of the respective slice associated with the viewpoint. In the implementation shown in FIG. 21, the viewpoint definitions are stored in groups 2104a-f in a pre-defined order corresponding to the first slice coordinate 1704 of each slice defined (e.g., 1702a-f) in the respective zone (e.g., zone 1804). However, the viewpoint definitions 2102 may be stored in any order within the viewpoint definition file 2100. In addition, each group 2104a-f of viewpoints associated with a selected slice of the zone 1804 may be stored in separate viewpoint definition files 144A-N.

Next, the controller 131 determines whether to copy the camera viewpoints of the selected slice to another slice (step 878). As shown in FIG. 20, the user may signal the controller 131 to copy the pattern of camera viewpoints 1902 from the selected slice to another slice by actuating button 2004 ("Add Current Dots To All Slices") of user interface 2000. If the camera viewpoints of the selected slice are to be copied, the controller 131 duplicates and converts the position of each camera viewpoint associated with the selected slice in the viewpoint definition file to a corresponding position relative to the other slice in the zone (step 880). The controller 131 then stores the corresponding position of each camera viewpoint associated with the other slice in the viewpoint definition file (step 882). In the example shown in FIG. 21, assuming the slice associated with the viewpoint definition group 2104a is currently selected to be copied, the controller 131 duplicates each viewpoint definition 2102 in the group 2104a associated with the selected slice into a new group 2104b. The controller 131 is able to recognize that the selected slice has a first slice coordinate 1706 of 50 and the next or other slice currently defined for the zone 1804 has a first slice coordinate 1706 of 100. The controller 131 subsequently converts the first slice coordinate 1706 in each viewpoint definition 2102 in the new group 2104b to be the next slice's first slice coordinate 1706 of 100.

In one implementation, when all zone, slices and viewpoints are created, the user may select "save and exit" button 1350 in FIG. 13 to prompt the controller to close and saver all zone, slice and viewpoint definition files 140, 142, and 144. The controller 131 then causes the image generator to produce geometric images 148A-N in accordance with the zone, slice, and viewpoint definition files (step 884) and then ends processing. A user operating on one of the data processing computers 102 or 104A-N is able to selectively navigate the geometric images 148A-N via the image viewer 132 by selecting a zone, a slice associated with the zone, and a viewpoint associated with the slice such that the user can view an area of interest of the object model 52 without having to operate the image generator 50 on the image processing workstation 108.

Figure 23B:
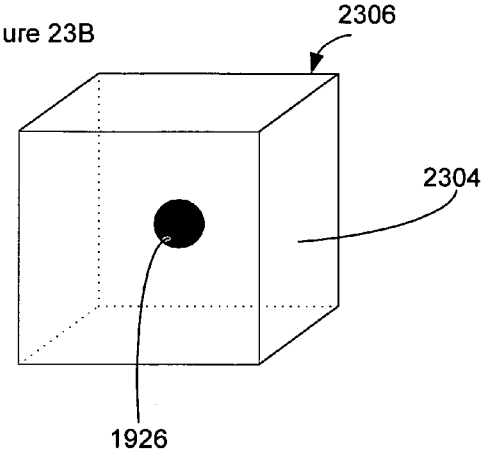
FIG. 23B depicts one of the viewpoints in the pattern of viewpoints displayed in FIG. 23A centered in a cube by the image generator controller in accordance with methods and systems consistent with the present invention.

As further described below, the controller 131 causes the image generator 50 to render six geometric images 148A-N for each camera viewpoint (e.g., 1926 in FIG. 23B) stored in the viewpoint definition file 2100, where the six geometric images 148A-N correspond to the six faces 2304 of a cube 2306 in which the respective camera viewpoint is centered. Thus, when the user via the image viewer 132 selects a viewpoint associated with the slice, the image viewer allows the user to dynamically view images of the geometry of the object model 52 corresponding to the six geometric images associated with the respective viewpoint 1926.

IV. Generating Geometric Images of the Object Model Based on the Zone, Slice, and Viewpoint Definitions FIGS. 24A-F depict a flow diagram illustrating steps in a process 2400 for causing the image generator to produce geometric images in accordance with a defined zone, slices associated with the defined zone, and camera viewpoints associated with each slice. To perform the process 2400 in one implementation, the controller 131 generates a control file, such as exemplary script file 2500 in FIG. 25, including commands to cause the image generator 50 to load a version of the object model 50 and to generate each of the geometric images 148A-N and 162A-N in accordance with the defined zone, the slices associated with the zone, and the camera viewpoints associated with each slice. Appendix A includes a description of the commands in the script file 2500 of FIG. 25 used by the controller 131 to control the Boeing Flythru image generator 50 in accordance with methods and systems consistent with the present invention. In another implementation, the controller 131 may interactively control the image generator 50 in accordance with the process 2400 by providing the image generator 50 with user interface commands equivalent to the commands in the script file 2500. User interface commands for a known image generator 50 that perform the equivalent function of the commands in the script file 2500 may be derived using a known software user interface specification for the image generator 50.

Figure 24A:
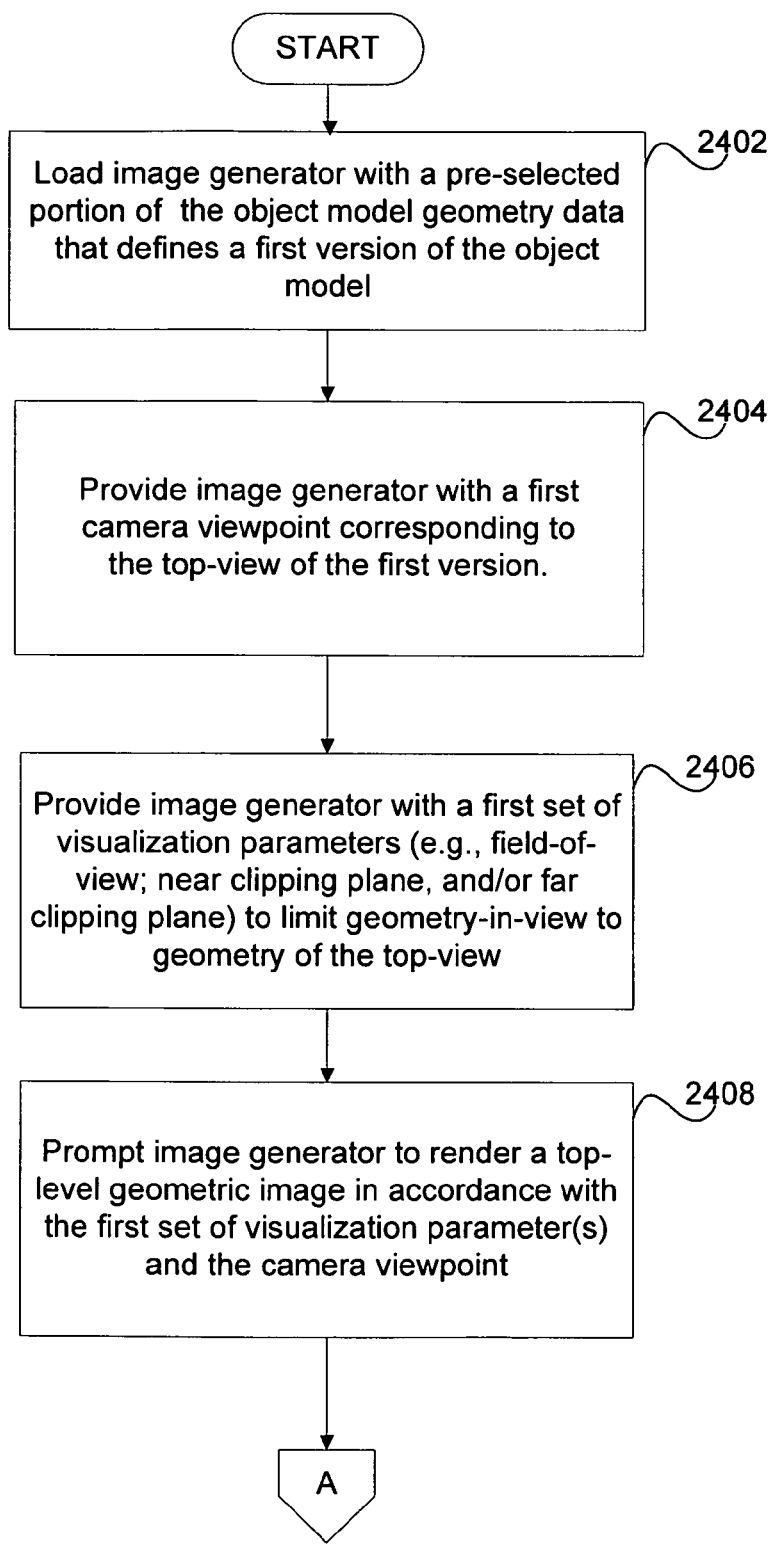
FIGS. 24A-F are flow diagrams illustrating steps in a method for causing the image generator to produce geometric images in accordance with a defined zone, slices associated with the defined zone, and camera viewpoints associated with each slice and centered in a respective cube.

As shown in FIG. 24A, the controller 131 initially loads the image generator with a pre-selected portion of the object model geometry data defining a first version of the object model (step 2402). The pre-selected portion may be all or part of the object model geometry data 112. However, one portion of the object model geometry data 112 may not be required to form the first version of the object model a user is interested in viewing or having others view while operating on data processing computers 102, 104A-N without having to operate the image processing workstation 108. For example, the object model geometry data 112 may correspond to geometry data for multiple versions or configurations of an aircraft, such as the Boeing 777, modeled using the image generator 50. The first version of the aircraft object model 50 that may be selectively re-generated from the geometry data 112 by an engineer operating the image generator 50 on the image processing workstation 108 may have a different tail section or different cockpit configuration than a second version of the aircraft object model 50 that also may be selectively re-generated from the geometry data 112. In one implementation, an engineer experienced in operating the image generator 50 and knowledgeable about how to selectively re-generate the first version of the object model from the geometry data 112 identifies the pre-selected portion of the object model geometry data 112 to load in a query file (e.g., query file 154A) in a format recognizable by the image generator 50. As shown in FIG. 25, the controller 131 may provide a command 2502 with a query filename 2504 (e.g., "z001.fq") in the script file 2500 to cause the image generator 50 to load the pre-selected portion described in the query file 154A having the filename 2504.

Next, the controller 131 provides the image generator 50 with a first camera viewpoint corresponding to the top-level view of the first version of the object model 52 (step 2404). The controller 131 identifies the first camera viewpoint as the viewpoint position in the x-axis 1318, y-axis 1320, and z-axis 1322 of the object model coordinate system required to cause the image generator 50 to orient the first version of the object model so that a top-level (or perspective view) geometric image of the model that encompasses the one or more zones defined in the zone definition files 140A-N may be generated. For example, the controller 131 may derive the position of the first camera viewpoint as the viewpoint required by the image generator 50 to render the top-level view captured in the top-level geometric image 2802 in FIG. 28. In one implementation, the first camera viewpoint may be stored in a spline file 152A having a spline filename 2506 (e.g., "ztop.fs"). The controller 131 generates a command 2508 with the spline filename 2506 in the script file 2500 to provide the image generator 50 with the first camera viewpoint. In another implementation, the top-level geometric image 2802 may be a photograph or artist rendering of the first version of the object model 50. In this implementation, the controller 131 is able to cause the image generator 50 to produce the top-level geometric image 2802 based on the first camera viewpoint or other identifier recognized by the image generator 50 as corresponding to the top-level geometric image. Alternatively, the controller 131 is able to cause the image generator 50 to produce the top-level geometric image 2802 as a background image for the first version of the object model 50 stored as part of the pre-selected portion of the object model geometry data 112 that defines the first version of the object model 50.

The controller 131 then provides the image generator 50 with a first set of visualization parameters (e.g., field of view; near clipping plane, and/or far clipping plane) so geometry in view corresponds to a top level view of the first version (step 2406). For example, the first set of visualization parameters may include a near clipping plane (e.g., as referenced by border 2804 in FIG. 27), to cause the image generator to exclude geometry outside of the clipping plane or border 2804. The geometry in view corresponds to the geometric image 148A (e.g., top-level geometric image 2802) that may be produced by the image generator 50 at the current camera viewpoint (e.g., the first camera viewpoint provided to the image generator 50). The controller 131 may provide the first set of visualization parameters in a state file 150A having a state filename 2510 (e.g., "ztopiz001.fi"). The controller 131 generates a command 2512 with the state filename 2510 in the script file 2500 to provide the image generator 50 with the first visualization parameters. In the implementation in which the top-level geometric image 2802 corresponds to a background image, the controller 131 provides the first visualization parameters to cause the image generator 50 to produce the top-level geometric image 2802 as a background image as shown in FIG. 28.

Next, the controller 131 prompts image generator to render a top-level geometric image in accordance with the first set of visualization parameter(s) and the camera viewpoint (step 2408). As shown in FIG. 25, the controller 131 may trigger the image generator 50 to produce or render the top-level geometric image 2802 by providing a command 2514 to generate an image (e.g., "GenerateImageSequence"). The image viewer 131 allows the user operating on one of the data processing computers 102 or 104A-N to view the top-level geometric image 2802, select a portion of the top-level geometric image 2802 associated with one of the defined zones 1502 . . . 1526, select a slice 1702a-f associated with the selected zone, select a camera viewpoint 2102 associated with the selected slice, and to dynamically view the images of object model 50 geometry corresponding to six geometric images generated from the perspective of the camera viewpoint.

Figure 24B:
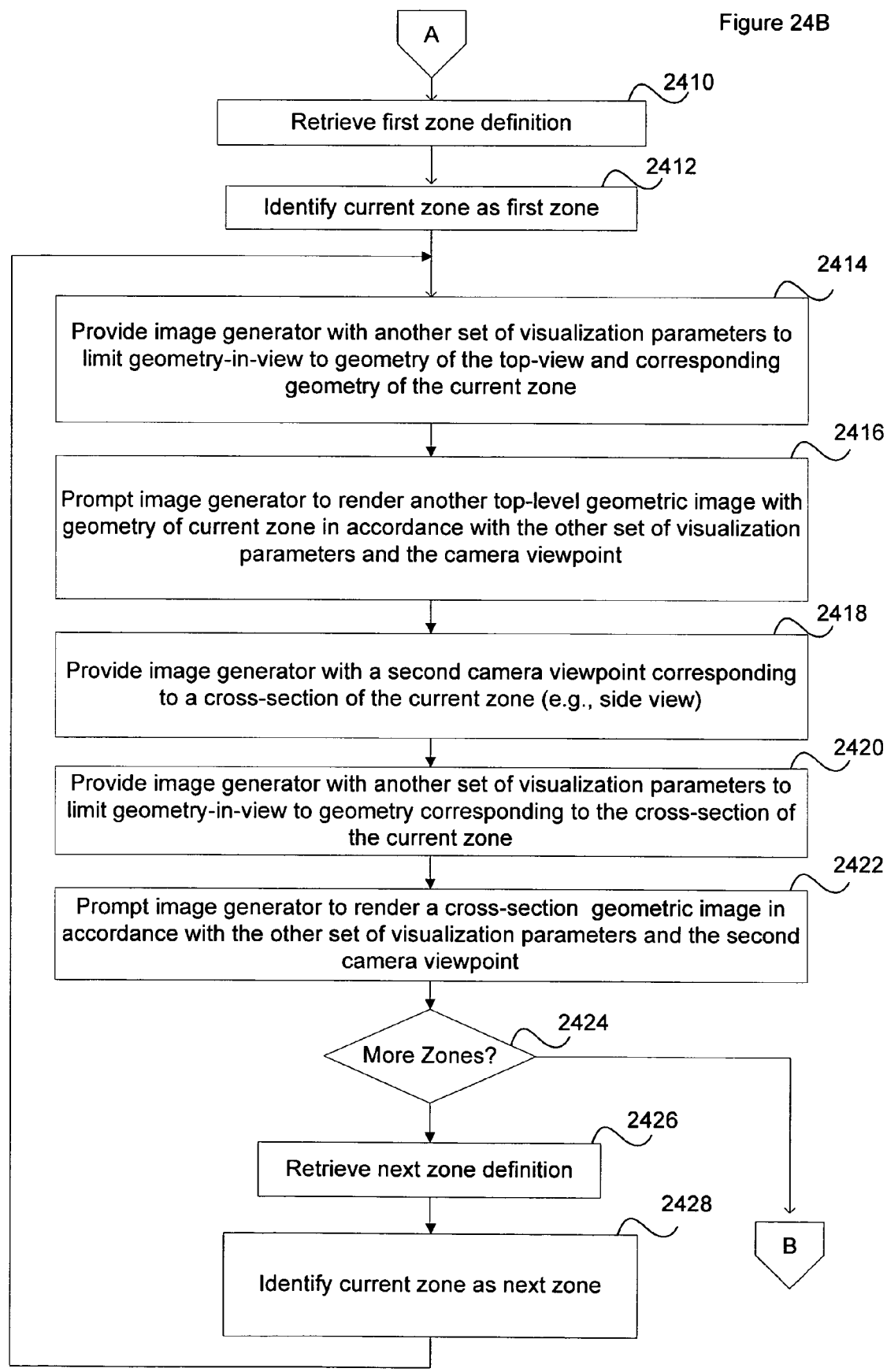
Figure 24C:
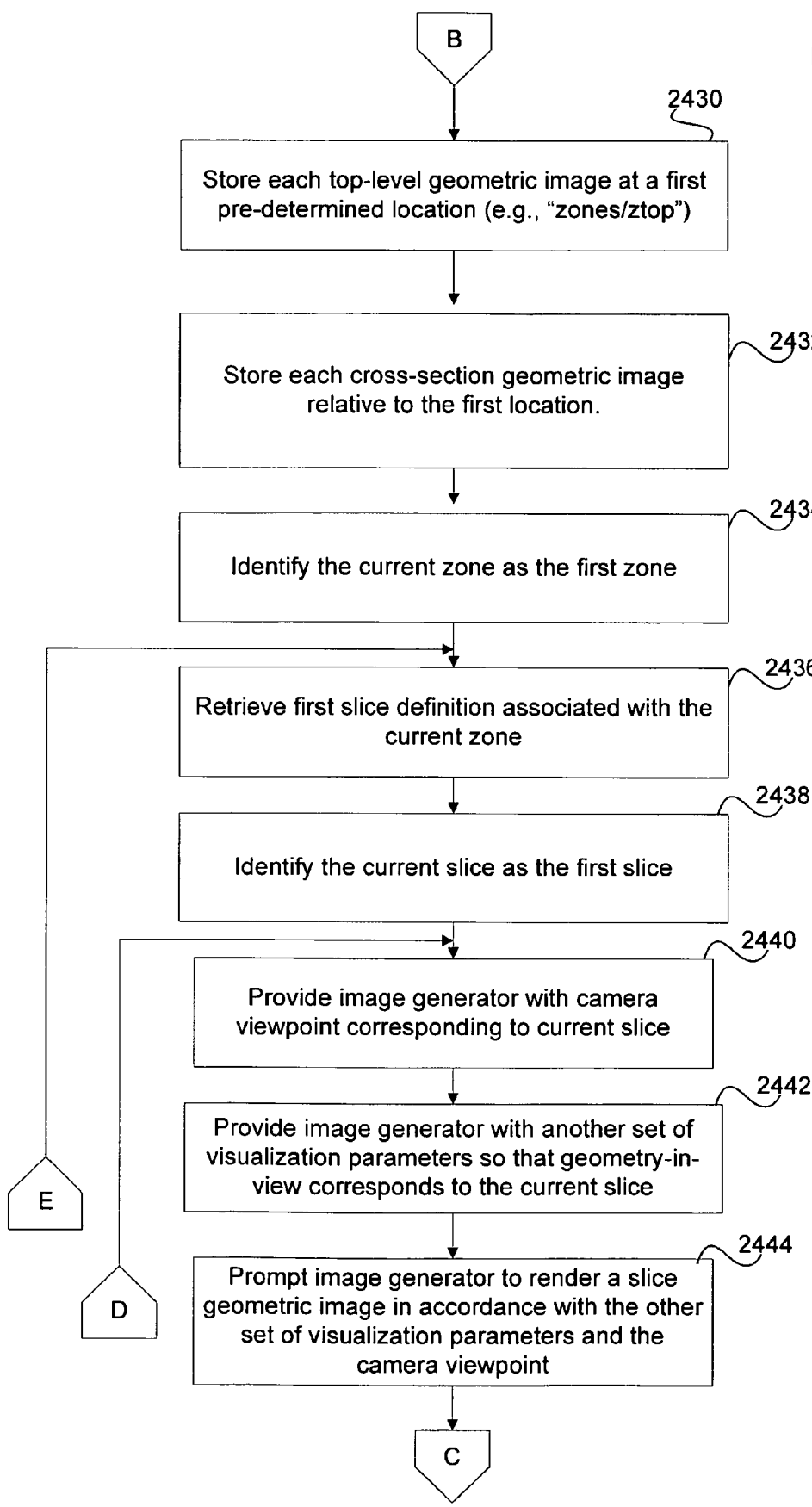

Turning to FIG. 24B, the controller 131 retrieves a first zone definition (step 2410). Continuing with the example shown in FIG. 17, the controller 131 retrieves the definition 1502 associated with the first zone (e.g., the zone identified as "z001" named "Nose") from the zone definition file 1700. In subsequent processing, the controller 131 identifies the current zone as the first zone (step 2412).

Figure 29:
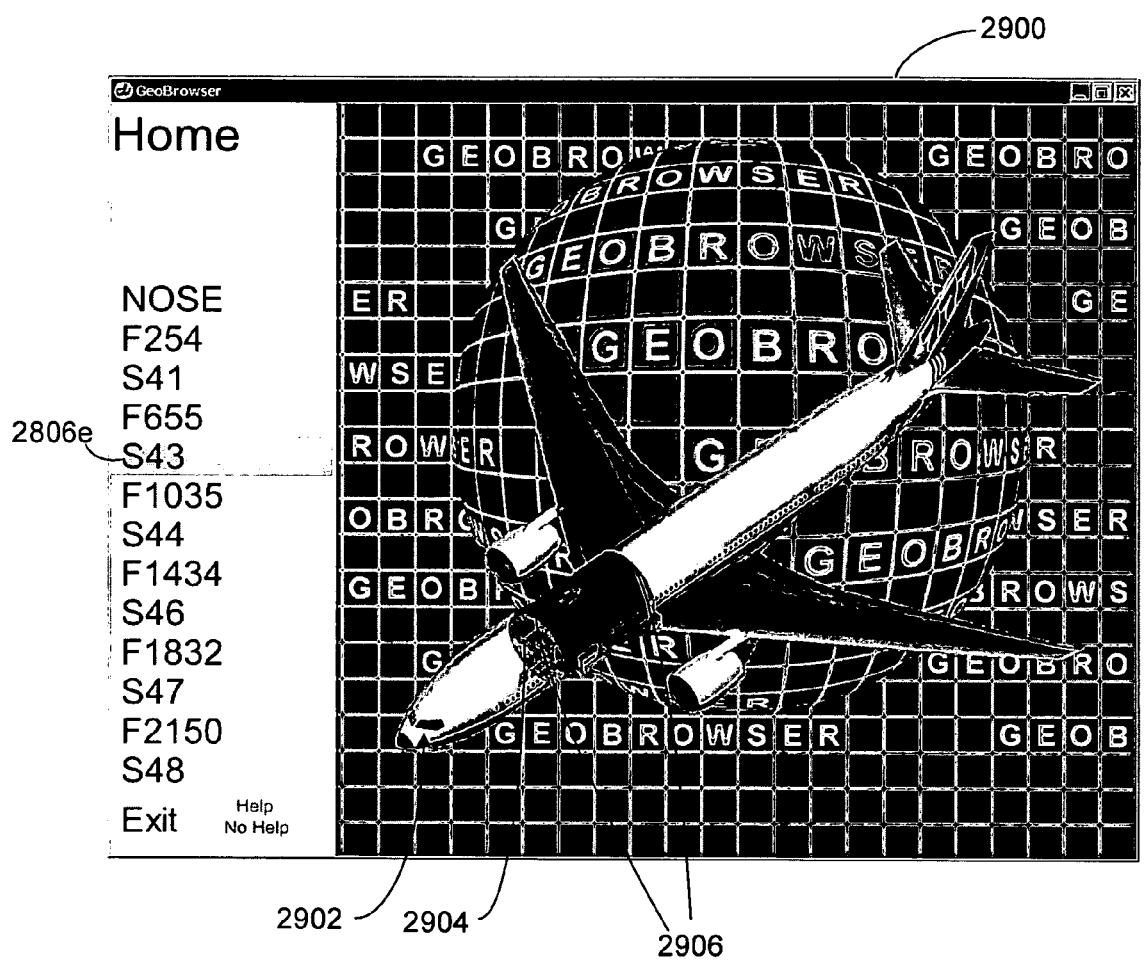
FIGS. 29-30 depict exemplary user interfaces generated by the image viewer, where a top-level geometric image having geometry associated with the selected zone is displayed.
Figure 30:
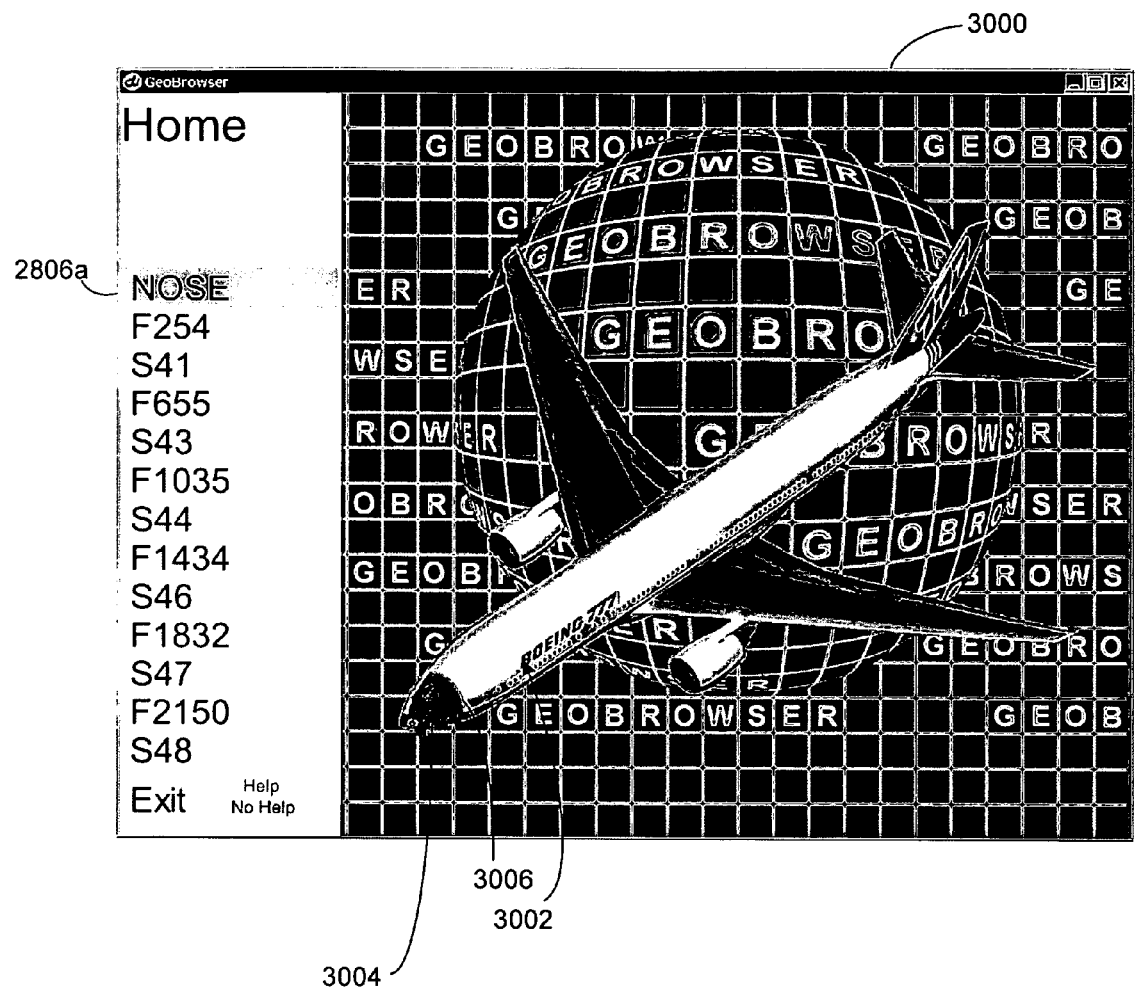

The controller 131 then provides the image generator 50 with another set of visualization parameters to limit geometry in view to geometry of the top-view and corresponding geometry of the current zone (step 2414). The other visualization parameters may include a near clipping plane derived by the controller 131 from the coordinates 1324, 1326, 1328, 1330, 1332, and 1334 that identify the position and dimensions of the current zone within the x, y, z coordinate system of the object model 50 such that geometry of other defined zones (e.g., as reflected in zone definitions 1504 . . . 1506) is excluded when the image generator 50 is requested by the controller 131 to render another top-level geometric image, such as the top-level geometric image 2902 with geometry 2904 of the "S43" zone in view as shown in FIG. 29 or the top-level geometric image 3002 with geometry 3004 of the "Nose" zone in view as shown in FIG. 30. For this example, the reference number 3006 (and 2906 in FIG. 29) identifies the respective clipping plane derived by the controller 131 and provided to the image generator 50 to exclude geometry of other defined zones 1504 . . . 1506. As shown in FIG. 25, the controller 131 may store the other set of visualization parameters with the near clipping plane 3004 in the state file 150A, which the controller 131 commands the image generator to load via command 2514 in the script file 2500.

Next, the controller 131 prompts image generator to render another top-level geometric image in accordance with the other set of visualization parameters and the camera viewpoint (step 2416). As shown in FIG. 25, the controller 131 may trigger the image generator 50 to produce or render the other top-level geometric image 3002 by providing the image generator 50 with the command 2514. In this implementation, the command 2514 signals the image generator 50 to produce or render a top-level geometric image for each viewpoint stored in the preceding spline file 2506. Accordingly, the controller 131 may store the first camera viewpoint in the spline file 2506 multiple times in accordance with a corresponding number of top-level geometric images (e.g., 2802, 2902, and 3002) to be produced.

Next, the controller 131 provides image generator 50 with a second camera viewpoint corresponding to a cross section (e.g., side view) of the current zone (step 2418), provides the image generator 50 with another set of visualization parameters to limit the geometry in view to geometry corresponding to the cross section of the current zone (step 2420), and prompts the image generator 50 to render a cross section geometric image (e.g., cross section geometric image 3102 in FIG. 31) in accordance with the other set of visualization parameters and the second camera viewpoint (step 2422). The second camera viewpoint may be derived by the controller 131 from the x-coordinate 1528 for the left side of the cross section (e.g., slice selection image boundary 1602), the y-coordinate 1530 for the bottom of the cross-section, width 1532, and height 1534, x-coordinate 1536 of the center location of the cross-section, which are stored as part of the zone definition (e.g., zone definition 1502 in FIG. 15) of the current zone. In one implementation, the controller 131 provides the second camera viewpoint to the image generator 50 via a command 2516 in FIG. 25 to load the second camera viewpoint stored in the spline file 2518 associated with the command 2516. The other set of visualization parameters is stored in the state file 2520 and provided to the image generator 50 by the controller 131 via command 2522. The other set of visualization parameters in state file 2520 includes a near clipping plane to limit the geometry in view to geometry corresponding to the cross section of the current zone as reflected by the cross section geometric image 3102. In the example shown in FIG. 31, the clipping plane is referenced by edges 3104 of the image 3102. As shown in FIG. 25, the controller 131 may trigger the image generator 50 to produce the cross section geometric image 3102 by providing the image generator 50 with another command 2524.

Returning to FIG. 24B, the controller 131 next determines whether there are more defined zones (step 2424). In one implementation in which zones definitions are stored in a single file (e.g., zone definition file 140A), the controller 131 checks whether there is another zone definition 1502 . . . 1526 in the file 140A. In the implementation in which zone definitions are stored in multiple files 140A-N, the controller 131 checks each file 140A-N for another zone definition.

If there are more defined zones, the controller 131 retrieves a next zone definition (step 2426), identifies the current zone as the next zone (step 2428), and continues processing as step 2414 to generate a top-level geometric image for the next zone.

If there are no more defined zones, the controller 131 stores each top-level geometric image at a first pre-determined location (step 2430). For example, the controller 131 stores each top-level geometric image 2802, 2902, and 3002 at the first pre-determined location identified by the network storage path "zones/ztop" 2526 in FIG. 25. The controller 131 also may store each top-level geometric image associated with a zone (e.g., top-level geometric image 3002) with a filename prefix 2528 (e.g., "zbgz001") identifying the image 3002 as a top-level image (e.g., "zbgz") and reflects the identifier 1338 (e.g., "z001") of the zone. The image viewer 132, when provided with the first pre-determined location 2526, is able to locate geometric images 148A-N associated with a zone by using the respective zone identifier 1338.

The controller 131 also stores each cross section geometric image with relative to the first location (step 2432). For example, the controller 131 may store each cross section geometric image 3102 at the first pre-determined location 2526 with a different filename prefix 2530 (e.g., "zziz001") that identifies the image 3102 as a cross section (e.g., "zziz") and reflects the identifier 1338 (e.g., "z001") of the zone.

After generating a top-level geometric image and a cross section geometric image for each defined zone, the controller 131 identifies the current zone as the first zone (e.g., "z001") (step 2434). The controller 131 then retrieves the first slice definition (e.g., slice definition 1702a) associated with the current zone (step 2436) and identifies the current slice as the first slice (step 2438). Thus, the current slice may be initially identified by the controller 131 as the slice having a plane positioned at the first slice coordinate 1704 of 50 along the axis (e.g., the x-axis 1318) of the cross section (e.g., slice selection image boundary 1602) of the current zone. However, the controller 131 may identify each slice associated with the current zone in no particular order for subsequent processing.

Next, the controller 131 provides the image generator 50 with the camera viewpoint corresponding to the current slice (step 2440), provides image generator with another set of visualization parameters so that the geometry in view corresponds to the current slice (step 2442), and prompts the image generator 50 to render a slice geometric image (e.g., slice geometric image 3208 in FIG. 32B) in accordance with the other set of visualization parameters and the camera viewpoint (step 2444). The controller 131 derives the camera viewpoint corresponding to the current slice from the slice coordinates 1708 and 1710 stored in the respective slice definition 1702a-f. In one implementation, the controller 131 may store the camera viewpoint corresponding to the current slice in the spline file 2532 so that this camera viewpoint is provided to the image generator 50 via the command 2534. In this implementation, the controller 131 recognizes that the image generator 50 will render a geometric image 148A-N for each camera viewpoint stored in the spline file 2532 provided with the command 2534.

Figure 32A:
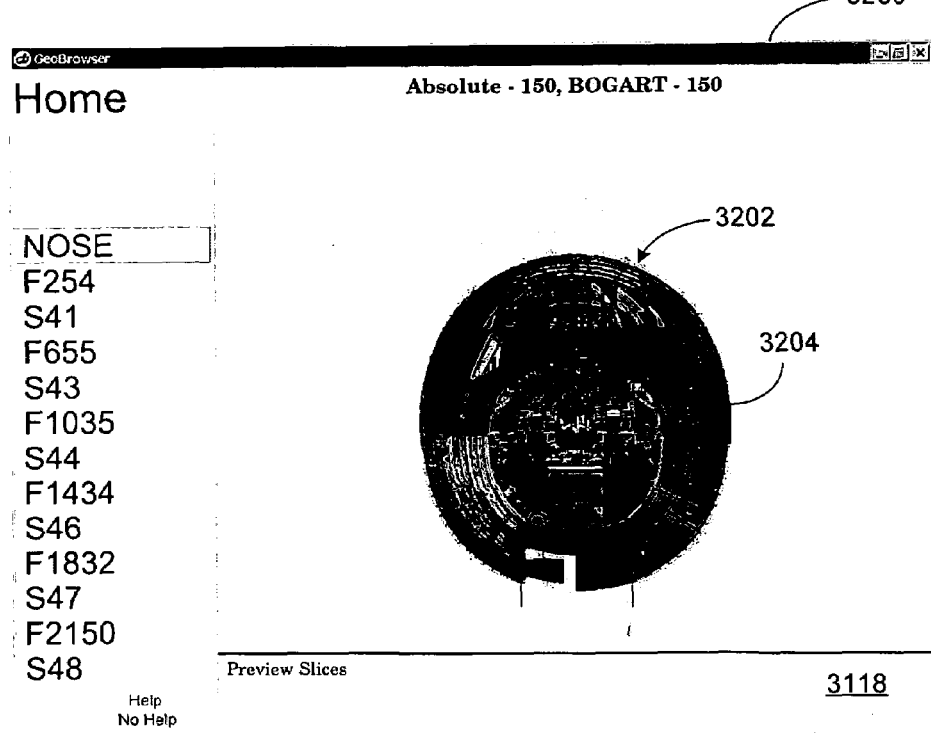
FIG. 32A depicts an exemplary user interface generated by the image viewer, where one of the slices associated with the selected zone is displayed in accordance with methods and systems consistent with the present invention.
Figure 32B:
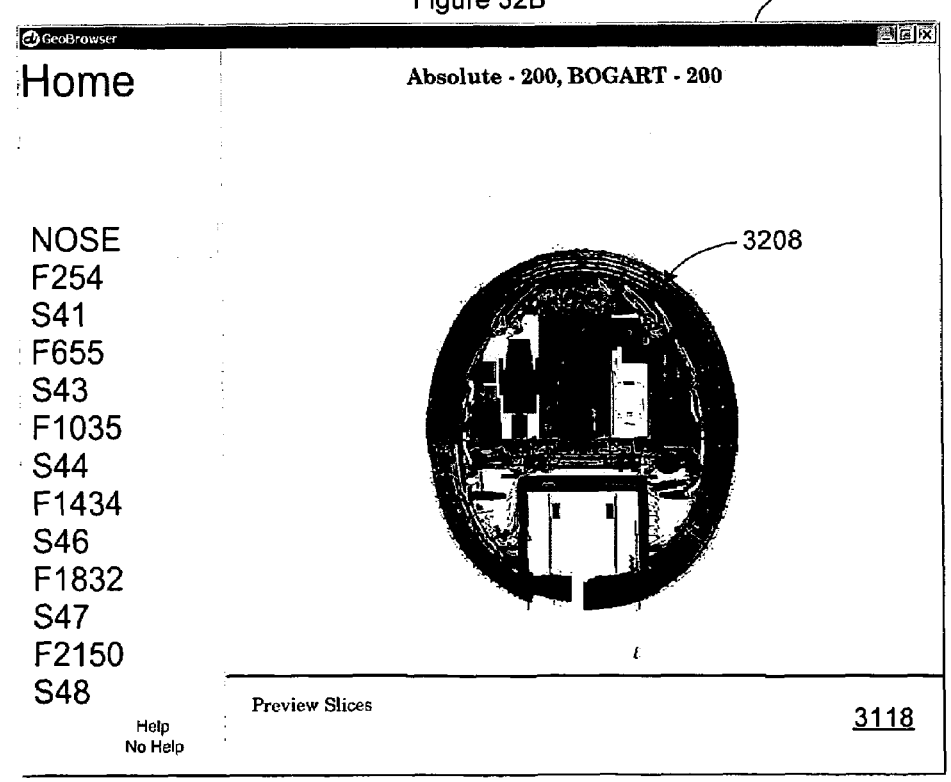
FIG. 32B depicts an exemplary user interface generated by the image viewer, where another of the slices associated with the selected zone is displayed in accordance with methods and systems consistent with the present invention.

The other visualization parameters may include a near clipping plane as referenced by edges 3204 of the slice image geometric image 3202 in FIG. 32A. The near clipping plane may be derived by the controller 131 from the y-coordinate 1538 for the left side, the z-coordinate 1540 for the bottom, the width 1542, and the height 1544 of the slice image boundary 1806 stored as part of the definition (e.g., zone definition 1502 in FIG. 15) of the current zone. As shown in FIG. 25, the controller 131 may provide the other set of visualization parameters with the near clipping plane 3204 in the state file 2536, which the controller 131 commands the image generator to load via command 2538 in the script file 2500. The controller 131 may trigger the image generator 50 to produce the cross section geometric image 3102 by providing the image generator 50 with a corresponding command 2540 to render an image based on the previously provided viewpoint.

Figure 24D:
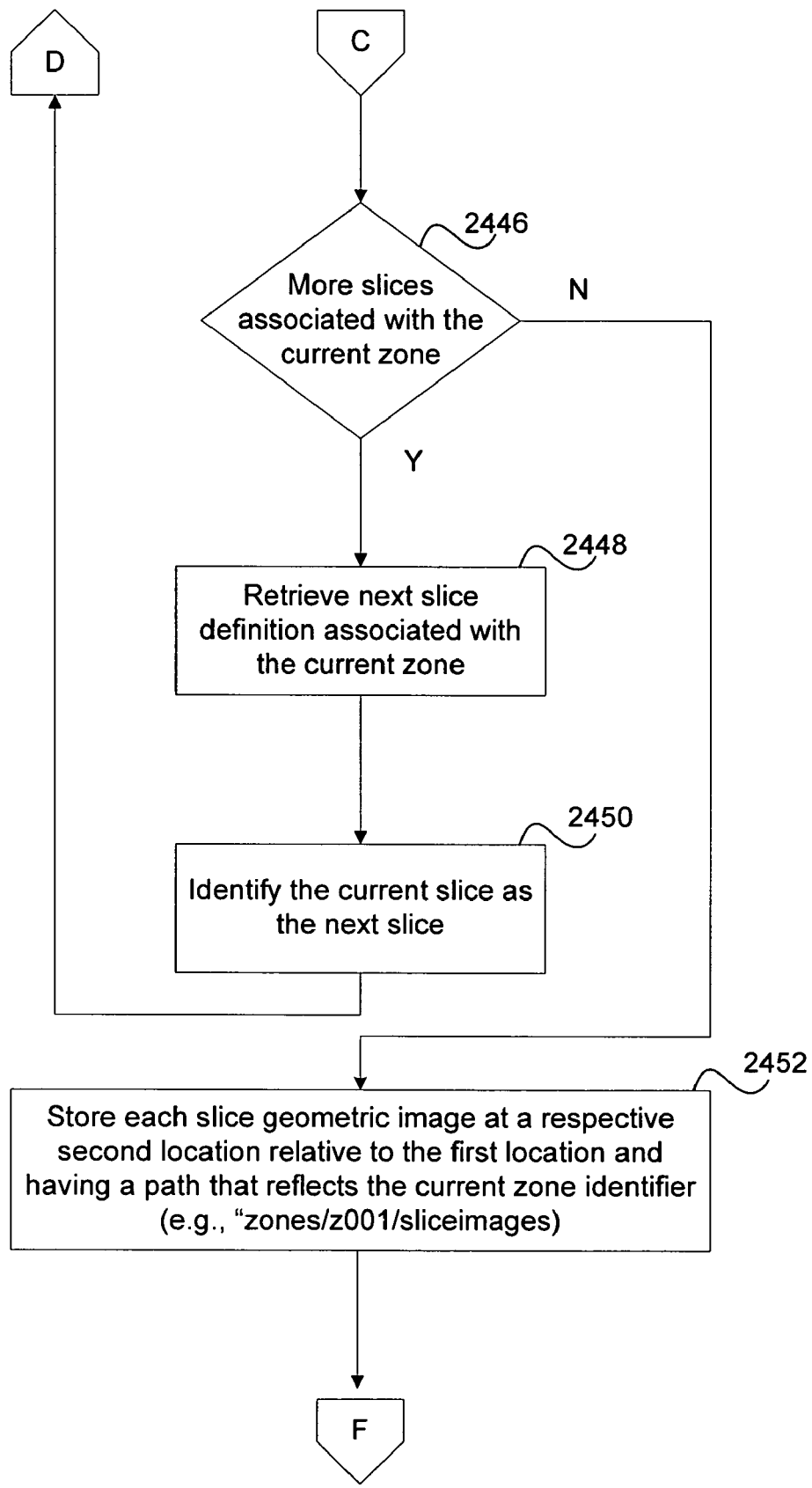
Figure 24E:
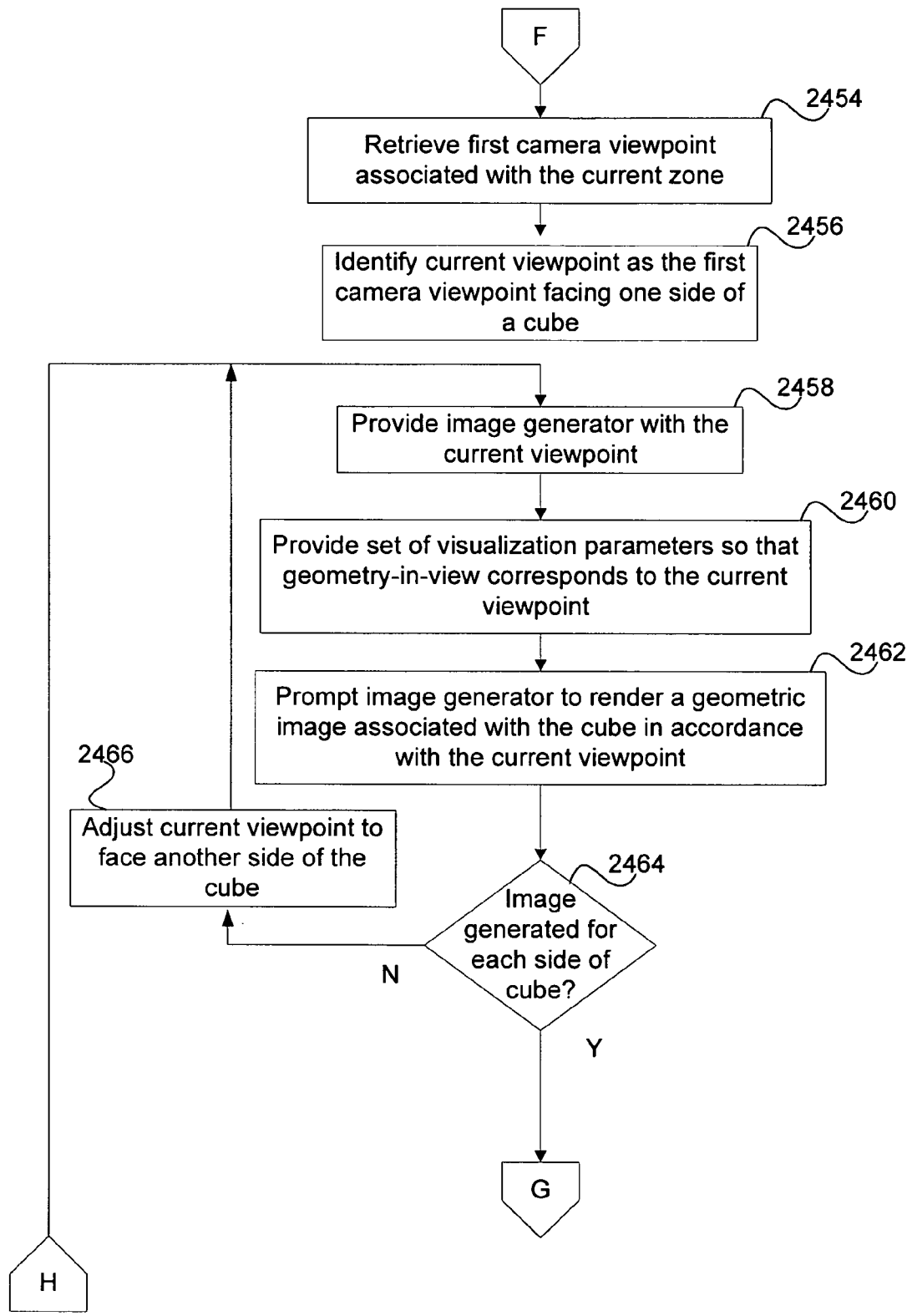
Figure 24F:
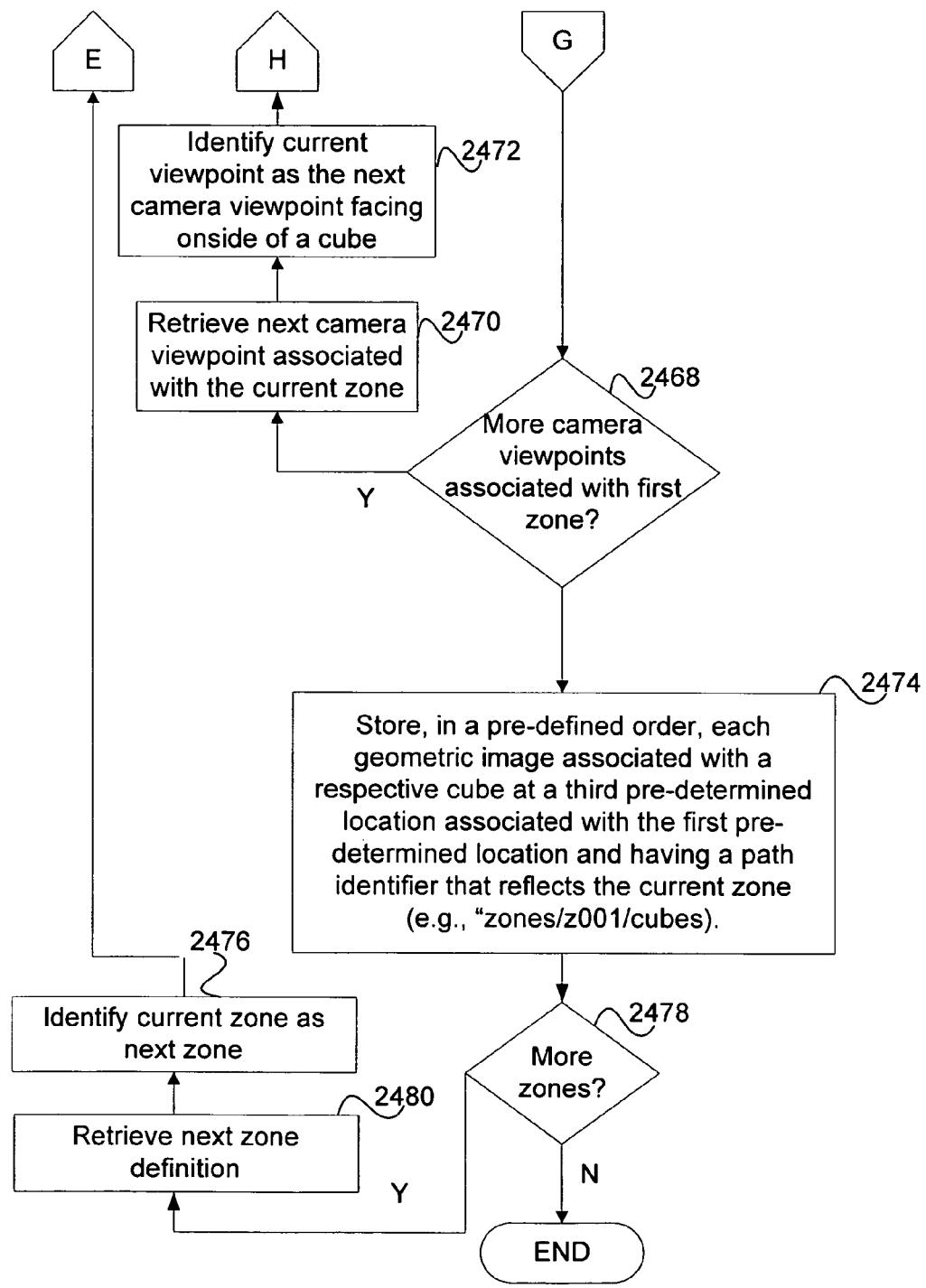

Turning to FIG. 24D, the controller 131 determines whether there is more slices associated with the current zone (step 2646). For example, the controller 131 may identify whether there is another slice definition 1702a-f in the slice definition file 1700 associated with the current zone.

If there are more slices associated with the current zone, the controller 131 retrieves the next slice definition associated with the current zone (step 2448), identifies the current slice as the next slice (step 2450), and continues processing at step 2440 so a slice geometric image is generated for each slice associated with the current zone.

If there are no more slices associated with the current zone, the controller 131 stores each slice geometric image at a second pre-determined location 2542 relative to the first pre-determined location 2526 and having the path identifier that reflects the current zone (e.g., "zones/z001/sliceimages") (step 2452).

Turning to FIG. 26E, the controller 131 next retrieves the first camera viewpoint in the viewpoint definition file 2100 associated with the current zone (step 2454). As described above, each camera viewpoint definition (e.g., viewpoint definition 2102) includes the first coordinate 1914 (e.g., relative to the y-axis 1320) and the second coordinate 1916 (e.g., relative to the z-axis 1322) that defines the position of each camera viewpoint relative to a respective slice in the zone (e.g. zone 1804).

The controller 131 next identifies the current viewpoint for subsequent processing as the first camera viewpoint facing one side of a cube (step 2456). As described in reference to FIG. 23B, the controller 131 causes the image generator 50 to render six geometric images (e.g., images 148D-I) corresponding to the six faces 2304 of a cube 2306 in which the current viewpoint is centered. Initially, the controller 131 may set the camera orientation for the current viewpoint to any of the six sides 2304 of the cube 2306 so that image generator is positioned to look to the rear, front, top, bottom, left, or right of the current camera viewpoint. In accordance with methods and systems consistent with the present invention as further described below, the image viewer 131 allows a user to dynamically view a cubic volume of 3D scenes generated by the image viewer 131 using the six geometric images (148D-I) associated with a respective camera viewpoint.

Next, the controller 131 provides image generator 50 with the current viewpoint (step 2458), provides a set of visualization parameters to the image generator 50 so that geometry in view corresponds to the current viewpoint (step 2460), and prompts the image generator 50 to render a geometric image associated with the cube in accordance with the current viewpoint (step 2462). The set of visualization parameters includes the camera orientation (e.g., Aft, For, Top, Bot, Rht, or Lft) for the current viewpoint corresponding to the respective face 2304 of the cube encompassing the current viewpoint as depicted in FIG. 23.

In one implementation, the controller 131 stores the current camera viewpoint for each face 2304 of the cube 2306 encompassing the current viewpoint in a single spline file 2544, which is provided to the image generator via corresponding load command 2546. In this implementation, the controller 131 recognizes that the image generator 50 will render a geometric image 148D-I for each camera viewpoint stored in the spline file 2544 provided with the command 2546.

The controller 131 may trigger the image generator 50 to produce the geometric image associated with the current viewpoint (e.g., the camera viewpoint facing the one side 2304 of the cube 2306) by providing the image generator 50 with a corresponding command 2548 to render an image based on the previously provided current viewpoint.

The controller 131 then determines whether a geometric image is generated for each side of the cube (step 2464). If a geometric image has not been generated for each side of the cube, the controller 131 adjusts the current viewpoint to face another side of the cube (step 2466) and continues processing at step 2458.

If a geometric image has been generated for each side of the cube, the controller 131 determines whether there are more camera viewpoints associated with the first zone (step 2468). If there are more camera viewpoints associated with the first zone, the controller 131 retrieves a next camera viewpoint associated with the current zone (step 2470) and identifies current viewpoint as the next camera viewpoint facing onside of a cube (step 2472).

If there are no more camera viewpoints associated with the first zone, the controller 131 stores, in a pre-defined order, each geometric image associated with a respective cube at a third pre-determined location associated with the first pre-determined location and having a path identifier that reflects the current zone (e.g., "zones/z001/cubes 2550 in FIG. 25) (step 2474).

The controller 131 then determines whether there are more zones defined for the project (step 2478). If there are more zones defined, the controller 131 retrieves a next zone definition (step 2480), identifies the current zone as the next zone (step 2476) and continues processing at step 2436. If there are no more zones defined, the controller 131 ends processing.

Figure 26:
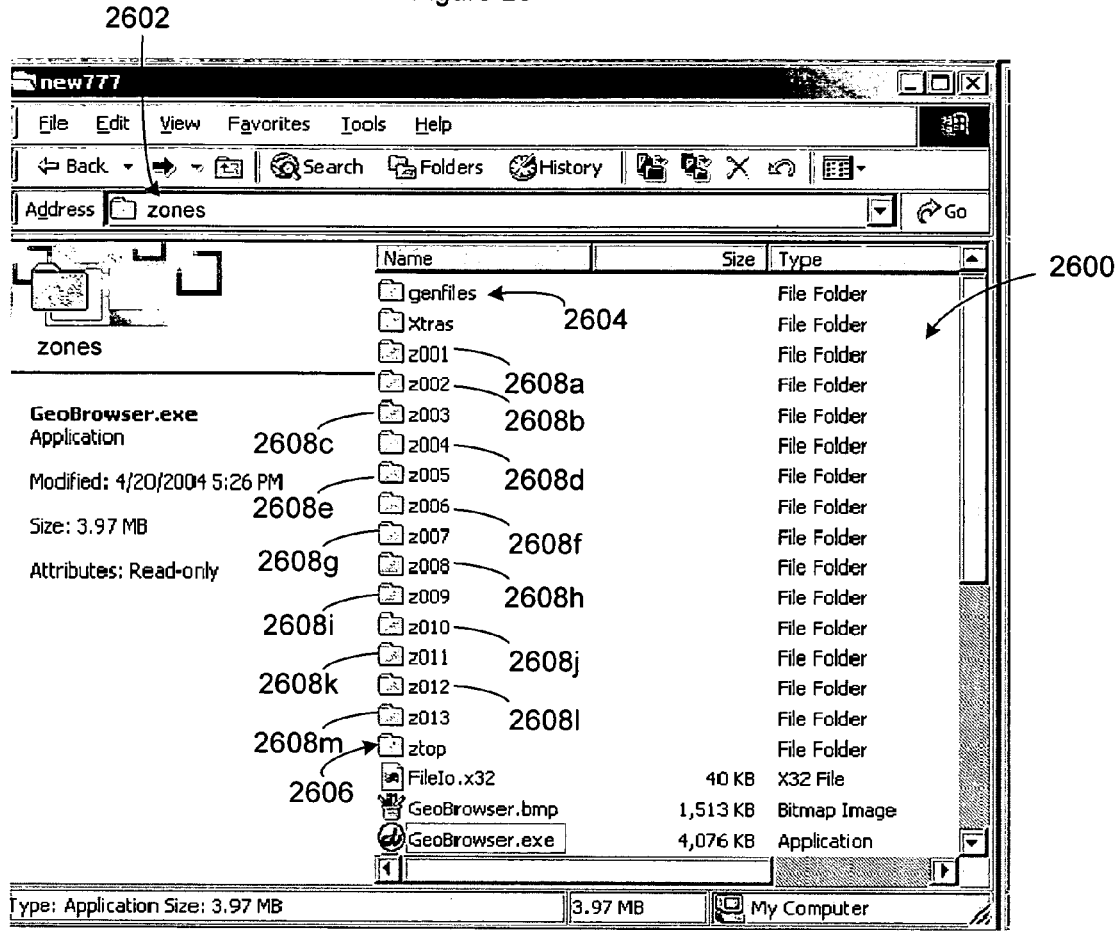
FIG. 26 depicts an exemplary hierarchical structure generated by the image generator controller at a pre-determined location for storing the geometric images produced in accordance with methods and systems consistent with the present invention.

FIG. 26 depicts an exemplary hierarchical structure 2600 generated by the controller 131 at the first pre-determined location 2602 (e.g., "zones" storage directory on the network 106) for storing the geometric images 148A-N and 162A-N so that the image viewer 131 operating on a data processing computer 102 or 104A-N is able to access the geometric images 148A-N or 162A-N in accordance with methods and systems consistent with the present invention. In one implementation, the controller 131 stores each zone definition file 140A-N used to produce the geometric images 140A-N, each slice definition file 142A-N associated with a respective zone definition file, and each viewpoint definition file 144A-N associated with a respective slice definition file in a first directory 2604 ("zones/genfiles") relative to the first location 2602 such that the image viewer 132 is able to locate the definition files 140A-N, 142A-N, and 144A-N when provided with the first location 2602. In this implementation, top-level geometric images 2802, 2902, and 3002 are stored in a second directory 2606 ("zones/ztop") relative to the first location 2602. In this implementation, cross section geometric images 3102 are also stored in the second directory 2606 ("zones/ztop"). In the example shown in FIG. 26, the controller 131 generates a respective zone directory 2608*a-m* for each zone defined in the one or more zone definition files 140A-N stored in the first directory 2604 ("zones/genfiles").

Each zone directory 2608*a-m* has a first subdirectory (not shown in FIG. 26) for storing slice geometric images (e.g., slice geometric images 3202 and 3306) associated with the respective zone. Each first subdirectory of each zone directory 2608*a-m* corresponds to a respective second pre-determined location 2542 described above (e.g., "zones/z001/sliceimages" in FIG. 25).

Each zone directory 2608*a-m* also has a second subdirectory (not shown in FIG. 26) for storing the six geometric images for each camera viewpoint defined for the respective zone in association with a respective slice of the zone. Each second subdirectory of each zone directory 2608*a-m* corresponds to a respective third pre-determined location 2550 described above (e.g., "zones/z001/cubes" in FIG. 25).

V. Selectively Navigating the Geometric Images of the Object Model Using the Zone, Slice, and Viewpoint Definitions FIGS. 27A-G depict a flow diagram illustrating steps in a process 2700 for selectively navigating the geometric images produced in accordance with methods and systems consistent with the present invention. The process 2700 may be performed by the image viewer 132 operating on one or more of the data processing computers 102, 104A-N.

Initially, the image viewer 132 receives a path to the first pre-determined location (e.g., "zones") (step 2702). In one implementation, the image viewer 132 may be programmed to know the first pre-determined location 2602. Alternatively, the controller 131 may provide the first pre-determined location 2602 via web page 158.

The image viewer 132 then identifies the first top-level geometric image stored at the first pre-determined location (e.g., "zones/ztop") (step 2704). In one implementation, the image viewer 132 retrieves the first top-level geometric image stored at the first pre-determined location 2602. In another implementation, the name of the each top-level geometric image may include an index to distinguish the top-level geometric images stored at the first pre-determined location 2602. For example, in this implementation, the image viewer may recognize the name "tbgr00000.jpeg" includes a prefix "tbgr" identifying the top-level geometric image 2802 associated with the zone definition file 1500 stored at the first pre-determined location 2602 (e.g., "zones/ztop").

Next, the image viewer 132 identifies the zone definition file 140A associated with the top-level geometric image (step 2706) and identifies each zone defined in the file (step 2708). In one implementation, the image viewer 132 identifies the zone definition file 140A by searching the respective zone directory 2608*a* for the zone definition file 140A, which may have a unique filename (e.g., "zones.*") or filename extension (e.g., "zones.gzd"). The image viewer 132 recognizes the storage format for a respective zone definition file 1500 and, thus, is able to identify each zone definition 1502 . . . 1526 within the file 1500.

The image viewer 132 then retrieves the identifier or name associated with each zone (step 2710) and displays the top-level geometric image in association with each zone identifier or name (step 2712). FIG. 28 depicts an exemplary user interface 2800 generated by the image viewer 132, where the top-level geometric image 2802 is displayed in association with each zone name 2806*a-m* retrieved from column 1340 of the zone definition file 1500. The image viewer is able to correlate each zone name 2806*a-m* to a respective zone definition 1502 . . . 1526 and to a corresponding zone identifier 1338 in FIG. 15.

Next, the image viewer 132 determines whether a zone identifier or name is selected or triggered (step 2714). The user may use a mouse or other data input technique to select or trigger one of the displayed zone names 2806*a-m*. In one implementation, the image viewer 132 allows the user to first visually preview the geometry in each zone by moving the mouse over the displayed zone names 2806*a-m* or by moving the mouse over the image 2804, which temporarily selects or triggers the respective zone identifier. If the mouse is over an area of the image 2804 that contains zone geometry, the controller 131 displays the corresponding top-level image with the zone geometry (e.g., top-level geometric image 2902 having geometry 2904) as explained below. If a zone identifier or name has not been selected or triggered, the image viewer 132 may end processing or wait until one is selected.

If a zone identifier or name has been selected or triggered, the image viewer 132 identifies the current zone for subsequent processing as the zone associated with the selected or triggered identifier (step 2716). The image viewer 132 then identifies a next top-level geometric image having geometry associated with the current zone (step 2718), displays the next top-level geometric image with the geometry associated with current zone (step 2720), and highlights the displayed zone identifier or name associated with the current zone (step 2722). For example, if the zone name 2806*e* or 2806*a* is selected, the image viewer 132 is able to identify the corresponding zone definition 1510 and 1502, respectively, in the zone definition file 1500 and then correlate the zone name 2806*e* ("S43" in FIG. 29) or 2806*a* ("NOSE" in FIG. 30) to the respective zone identifier ("z0005" in FIG. 15 and "z001," respectively). The image viewer 132 is also able to identify the next top-level geometric image 2902 or 3002 having geometry 2904 or 3004 associated with the current zone based on the respective zone identifier (e.g., "z005" or "z001"), which may be incorporated into the filename for the top-level geometric image 2902 (e.g., "zbgz005000000.jpeg") or 3002 (e.g., "zbgz00100000.jpeg").

Returning to FIG. 27A, the image viewer 132 next determines whether the current zone identifier has been selected (step 2724). If the current zone identifier has not been selected, the image viewer 132 determines whether displayed geometry of the current zone has been selected (step 2726). The user may use a mouse click or other input technique to re-select the zone name 2806*e* or 2806*a* or to select the displayed geometry 2904 or 3004 of the current zone.

If the displayed geometry of the current zone has not been selected, the image viewer 132 determines whether another zone identifier has been selected or triggered (step 2728). If another zone identifier has not been selected, the image viewer 132 may wait until a user selects a different zone or allow a user to end processing. If another zone identifier has been selected or triggered, the image viewer 132 continues processing at step 2716 to allow the user to selectively view geometry associated with the other selected zone.

Figure 27A:
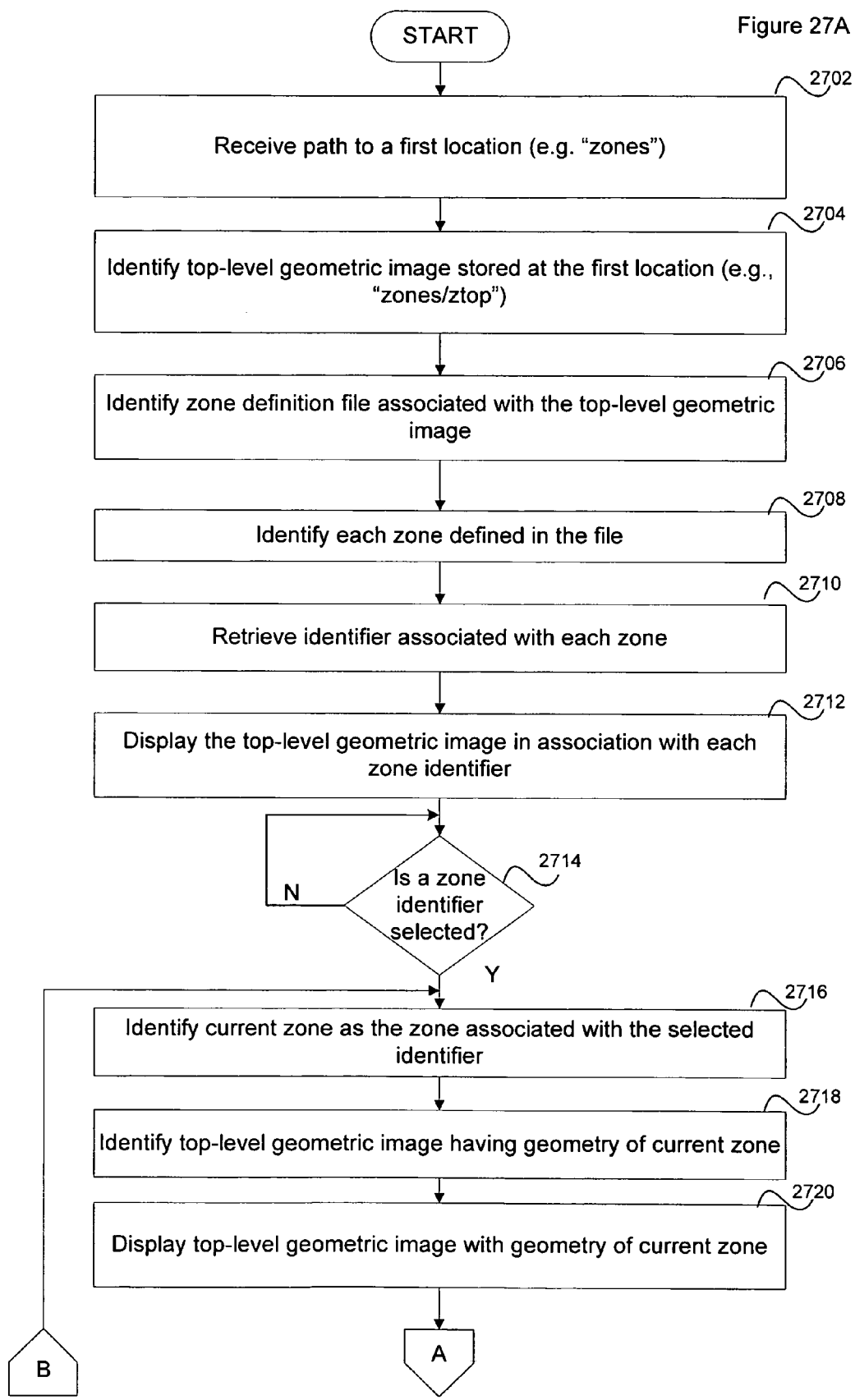
FIGS. 27A-H are flow diagrams illustrating steps in a method for selectively navigating the geometric images produced in accordance with methods and systems consistent with the present invention.
Figure 27B:
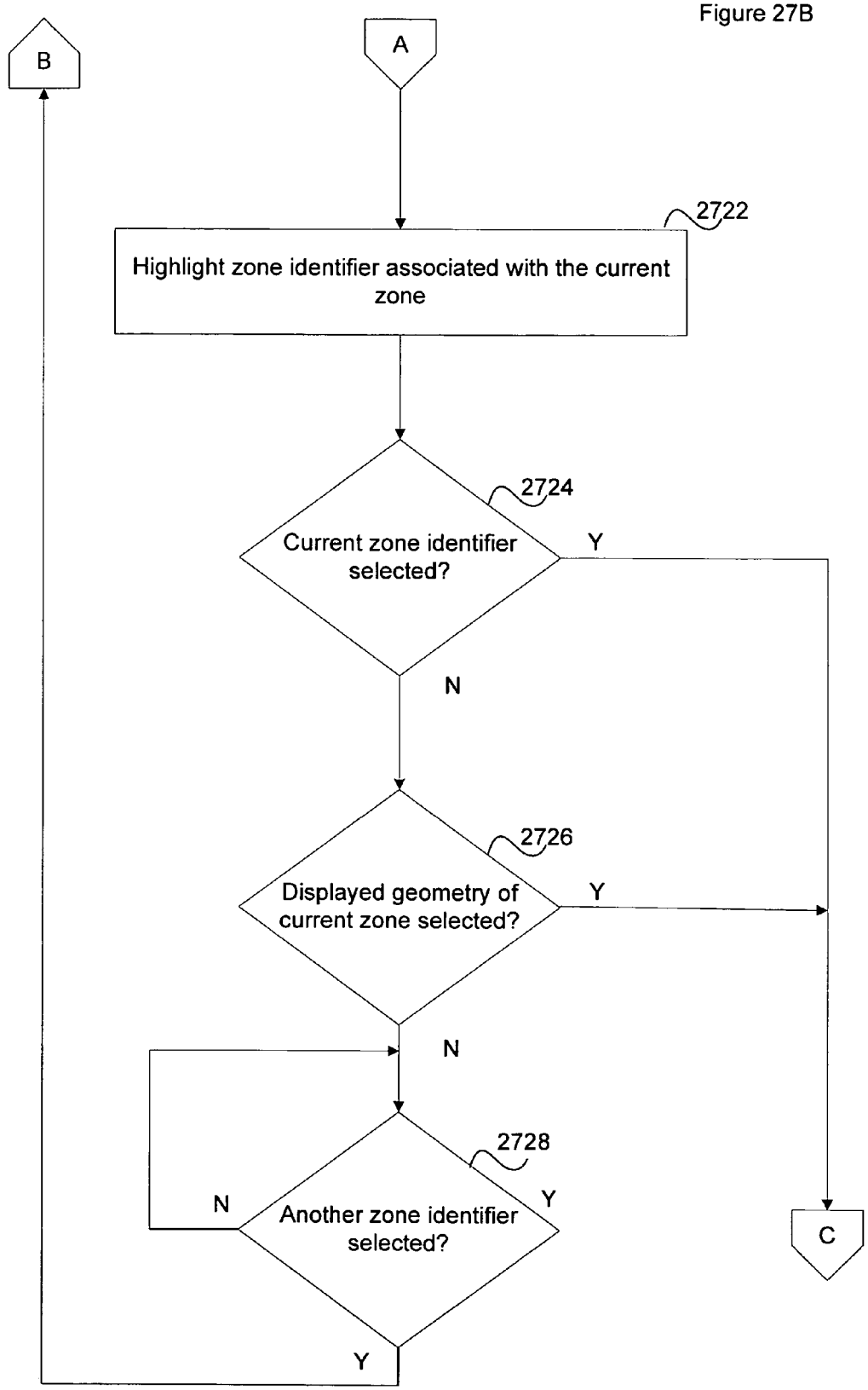
Figure 27C:
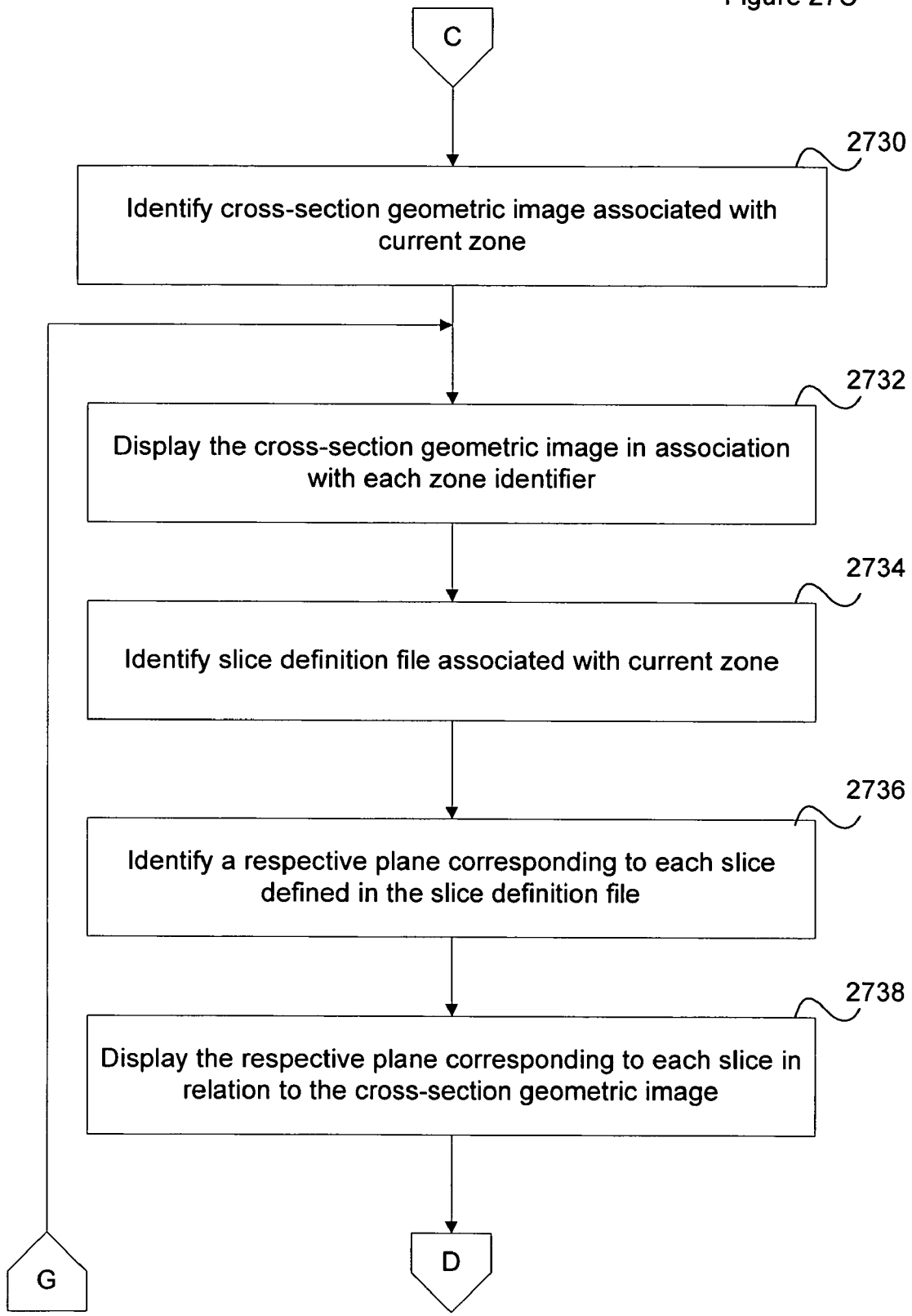
Figure 28:
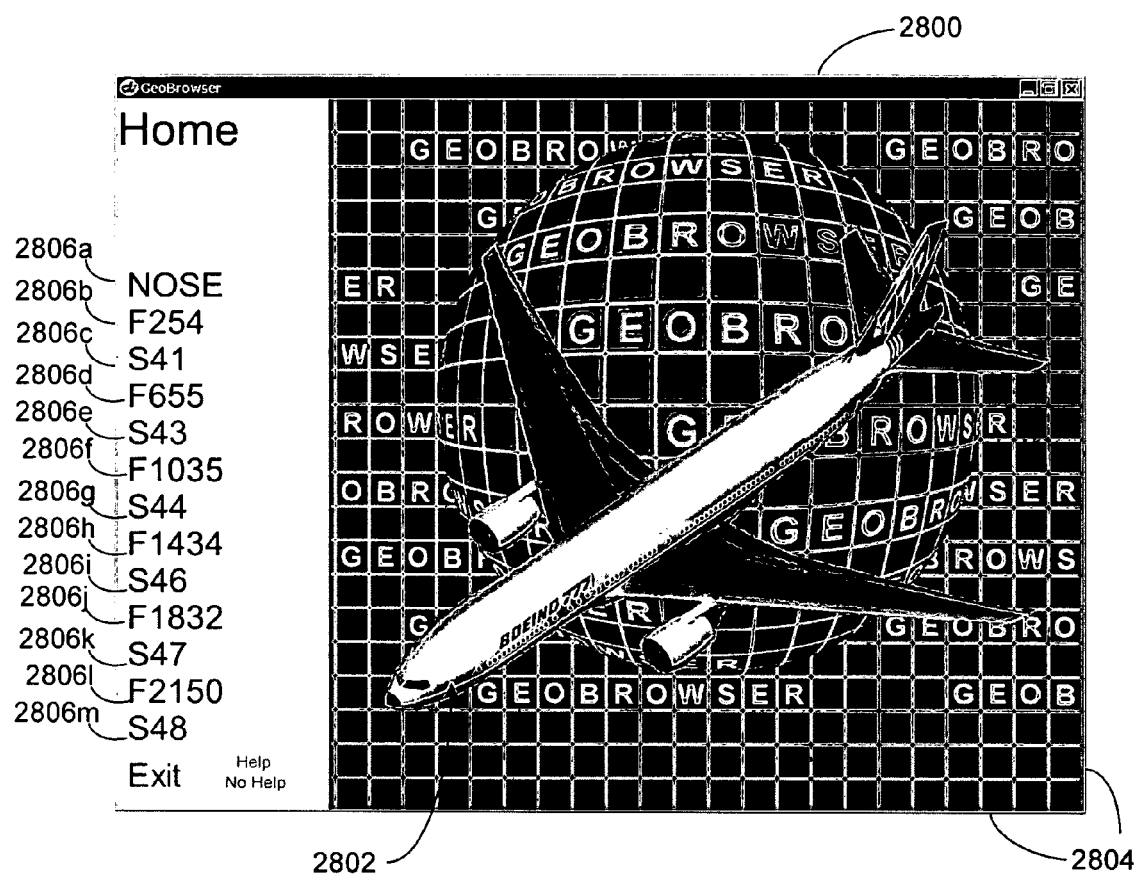
FIG. 28 depicts an exemplary user interface generated by an image viewer of the imaging processing system to allow a user to select a defined zone associated with a version of an object model for viewing geometry of the object model in accordance with methods and systems consistent with the present invention.
Figure 31:
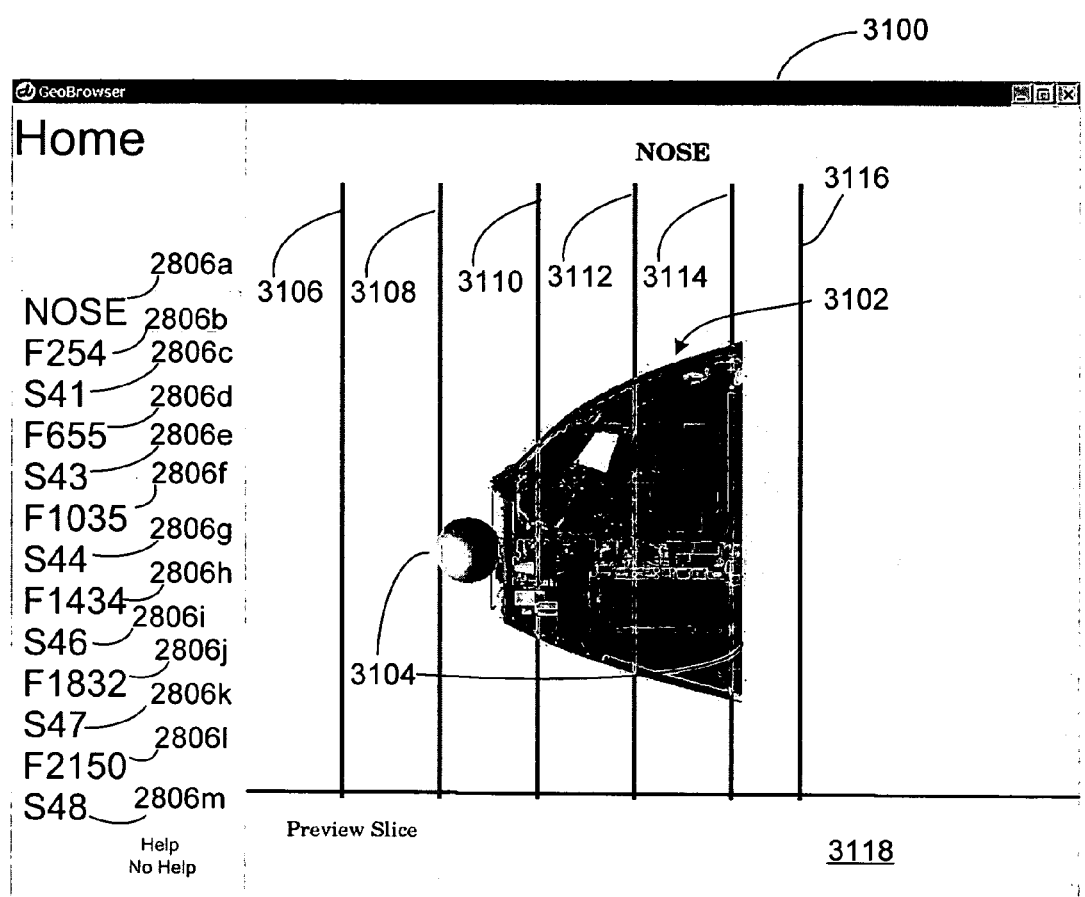
FIG. 31 depicts an exemplary user interface generated by the image viewer, where a cross section geometric image of the selected zone is displayed in association with one or more planes reflecting slices associated with the selected zone.

Turning to FIG. 27C, if the current zone identifier has been selected or if the displayed geometry of the current zone has been selected, the image viewer 132 identifies a cross section geometric image associated with the current zone (step 2730) and displays the cross section geometric image in association with each zone identifier (step 2732). FIG. 31 depicts an exemplary user interface 3100 generated by the image viewer, where the cross section geometric image 3102 (e.g., the side view) of the selected or current zone (e.g., "z001" or "NOSE" zone) is displayed in association with each zone identifier or name 2806*a-m*. The image viewer 132 is able to identify the cross section geometric image (e.g., image 3102 in FIG. 31) based on the current zone's zone identifier 1338 (e.g., "z001"), which may be incorporated into the filename for the cross section geometric image 3102 (e.g., "zziz001000000.jpeg").

The image viewer 132 then identifies a slice definition file associated with current zone (step 2734), identifies a respective plane corresponding to each slice defined in the slice definition file (step 2736), and displays the respective plan corresponding to each slice in relation to the cross section geometric image (step 2738). In one implementation, the image viewer 132 identifies the slice definition file 142A by searching the respective zone directory 2608*a* for the slice definition file 140A, which may have a unique filename or filename extension (e.g., "z001.gsd"). The image viewer 132 recognizes the storage format for a respective slice definition file 1700 and, thus, is able to identify each slice definition 1702*a-f* within the file 1700. The image viewer 132 identifies each slice 1702*a-f* as having a corresponding plane orthogonal to an axis (e.g., the x-axis 1318) of the cross section geometric image of the current zone, where the plane is positioned at the first slice coordinate 1704 along the axis (e.g., the x-axis 1318). For example, when the current zone is the defined zone 1502 identified as "z001," the image viewer 132 generates a plane 3106 . . . 3116 at a corresponding first slice coordinate 1704 (e.g., x-axis coordinate of 50, 100, 150, 200, 250, 285 in FIG. 17) each defined slice 1702*a-f* and displays the planes 3106 . . . 3116 to reflect the first slice coordinate 1704 of each plane 3106 . . . 3116 relative to the cross section geometric image 3102 of the current zone 1502 as shown in FIG. 32.

Figure 27D:
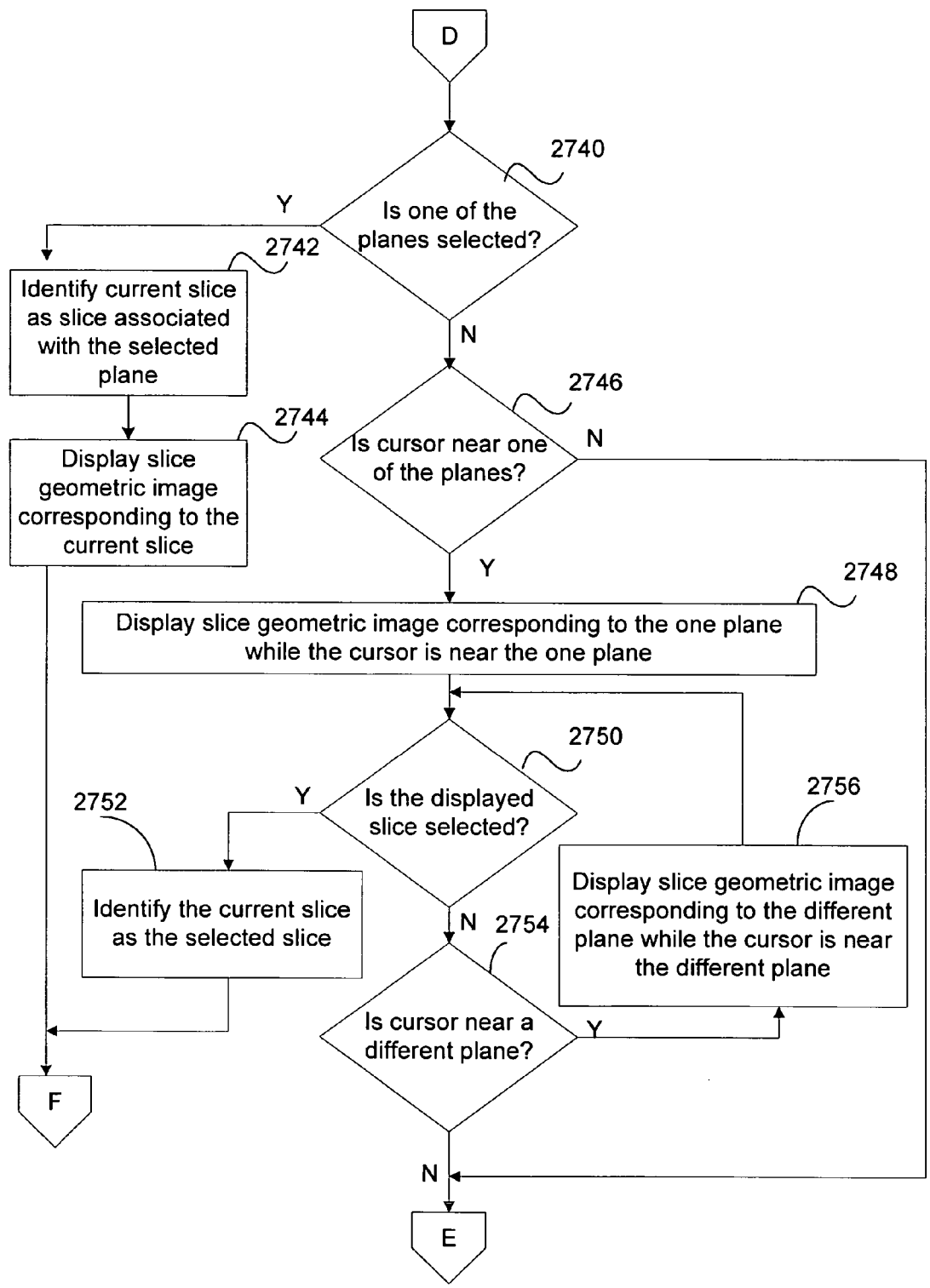
Figure 34:
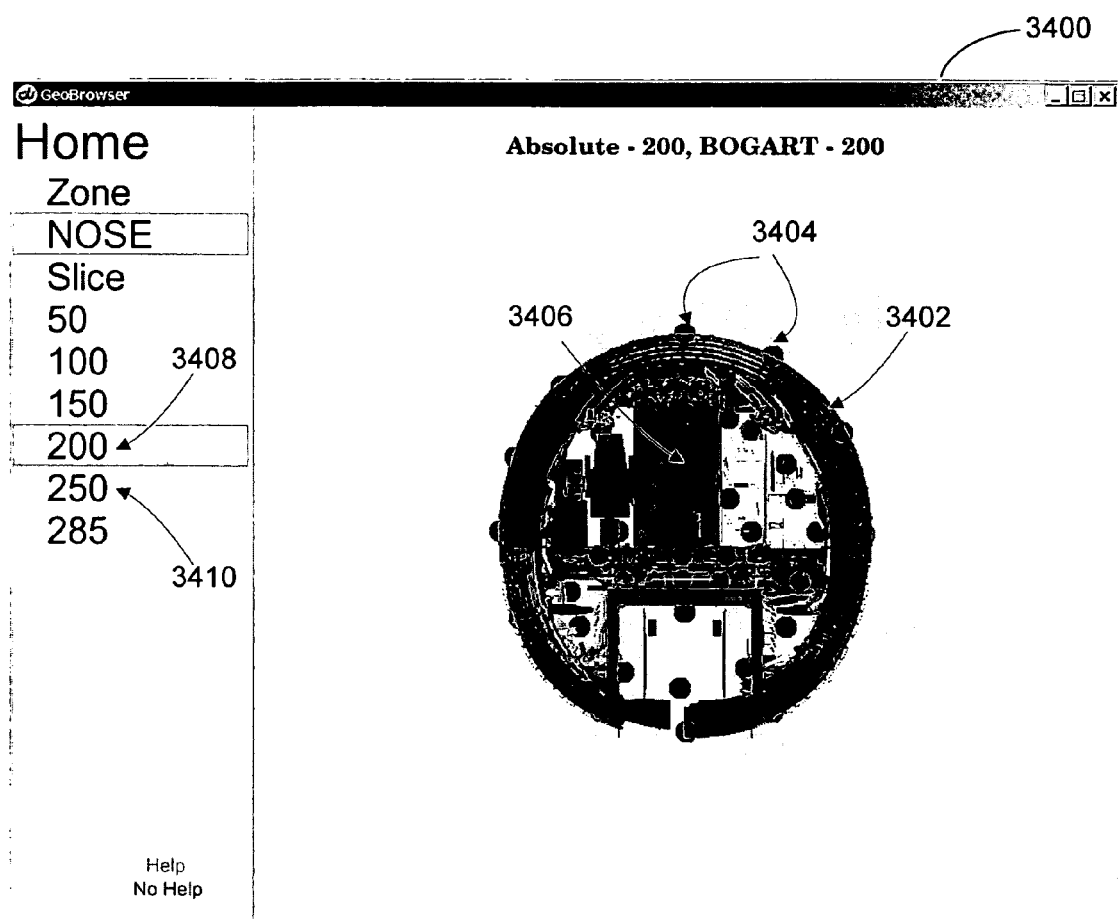
FIG. 34 depicts an exemplary user interface generated by the image viewer, where viewpoints associated with a selected slice are displayed to reflect the position of each viewpoint relative to the selected slice.

Turning to FIG. 27D, the image viewer 132 determines whether one of the planes 3106 . . . 3116 is selected (step 2740). If one of the planes 3106 . . . 3116 is selected, the image viewer 132 identifies the current slice as the slice associated with the selected plane (step 2742) and displays the slice geometric image corresponding to the current slice (step 2744) before continuing processing at step 2773. For example, when the plane 3112 corresponding to the slice 1702*d* at the x-axis coordinate of 200 is selected, the image viewer 132 displays the corresponding slice geometric image 3420 as shown in FIG. 34.

If one of the planes is not selected, the image viewer 132 determines whether the cursor is near one of the planes (step 2746) and displays a slice geometric image corresponding to the one plane while the cursor is near the one plane (step 2748). For example, the user may position a cursor (not shown in FIG. 31) corresponding to the mouse or other directional input device in a panel 3118 of user interface 3100. When the cursor is positioned in the panel 3118 near the plane 3110, the image viewer 132 displays the slice geometric image 3202 in FIG. 32A corresponding to the plane 3118 and maintains the slice geometric image 3202 while the cursor is positioned in the panel 3118 near the plane 3118. The image viewer 132 then determines whether the displayed slice (e.g., slice geometric image 3202) is selected (step 2748). If the displayed slice is selected, the image viewer 132 identifies the current slice as the selected slice (step 2754) and continues processing at step 2773 as described below.

If the displayed slice is not selected, the image viewer 132 determines if the cursor is near a different plane (step 2750), such as plane 3112 in FIG. 31. If the cursor is near a different plane, the image viewer 132 displays a slice geometric image 3208 (in FIG. 32B) corresponding to the different plane 3112 while the cursor is near the different plane 3112 (step 2752), allowing the user to preview the corresponding slice geometric image.

Figure 27E:
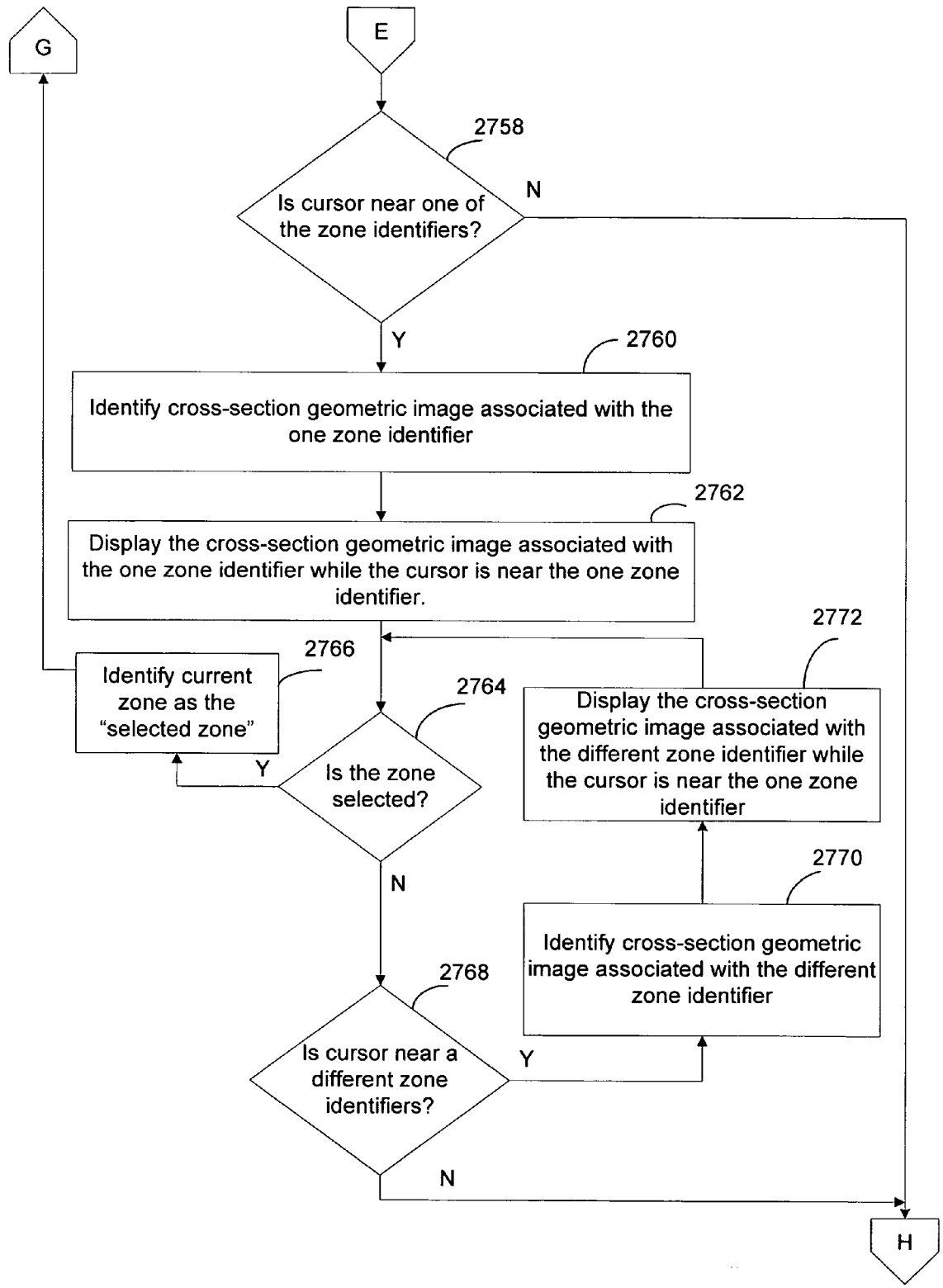

If the cursor is not near one of the planes or not near a different plane, the image viewer 132 determines if the cursor is near one of the zone identifiers or names 2806*a-m* (step 2758). If the cursor is not near one of the zone identifiers or names 2806*a-m*, the image viewer 132 ends processing as shown in FIG. 27E.

If the cursor is near one of the zone identifiers or names 2806*a-m*, the image viewer 132 identifies a cross section geometric image associated with the one zone identifier or name (2760), and displays the side view cross section geometric image associated with the one zone identifier or name while the cursor is near the one zone identifier or name (5862). For example, the user may position a cursor (not shown in FIG. 31) corresponding to the mouse or other directional input device near the zone name 2806*e* ("S43" in FIG. 31). When the cursor is positioned in the zone name 2806*e*, the image viewer 132 displays the corresponding slice geometric image 3302 in FIG. 33A such that a user is able to preview the slice geometric image 3302.

Next, the image viewer 132 determines if the zone is selected (step 2764). If the zone is selected, the image viewer 132 identifies the current zone as the selected zone (step 2766) and continues processing at step 2732.

If the zone is not selected, the image viewer 132 determines if the cursor is near a different zone identifier or name (step 2768). If the cursor is not near a different zone identifier or name, the image viewer 132 may end processing. If the cursor is near a different zone identifier or name (e.g., zone name 2806*f* or "F1035" in FIG. 33B), the image viewer 132 identifies another cross section geometric image 3306 associated with the different zone identifier or name 2806*f* (step 2770), displays the cross section geometric image 3306 associated with the different zone identifier or name 2806*f* while the cursor is near the one zone identifier or name (step 2772), and continues processing at step 2764. Thus, the image viewer 132 allows the user to preview cross section geometric images corresponding to different zones 2806*a-f* without having to navigate through a pre-defined sequence of the geometric images 148A-N of the first version of the object model 52.

Figure 27F:
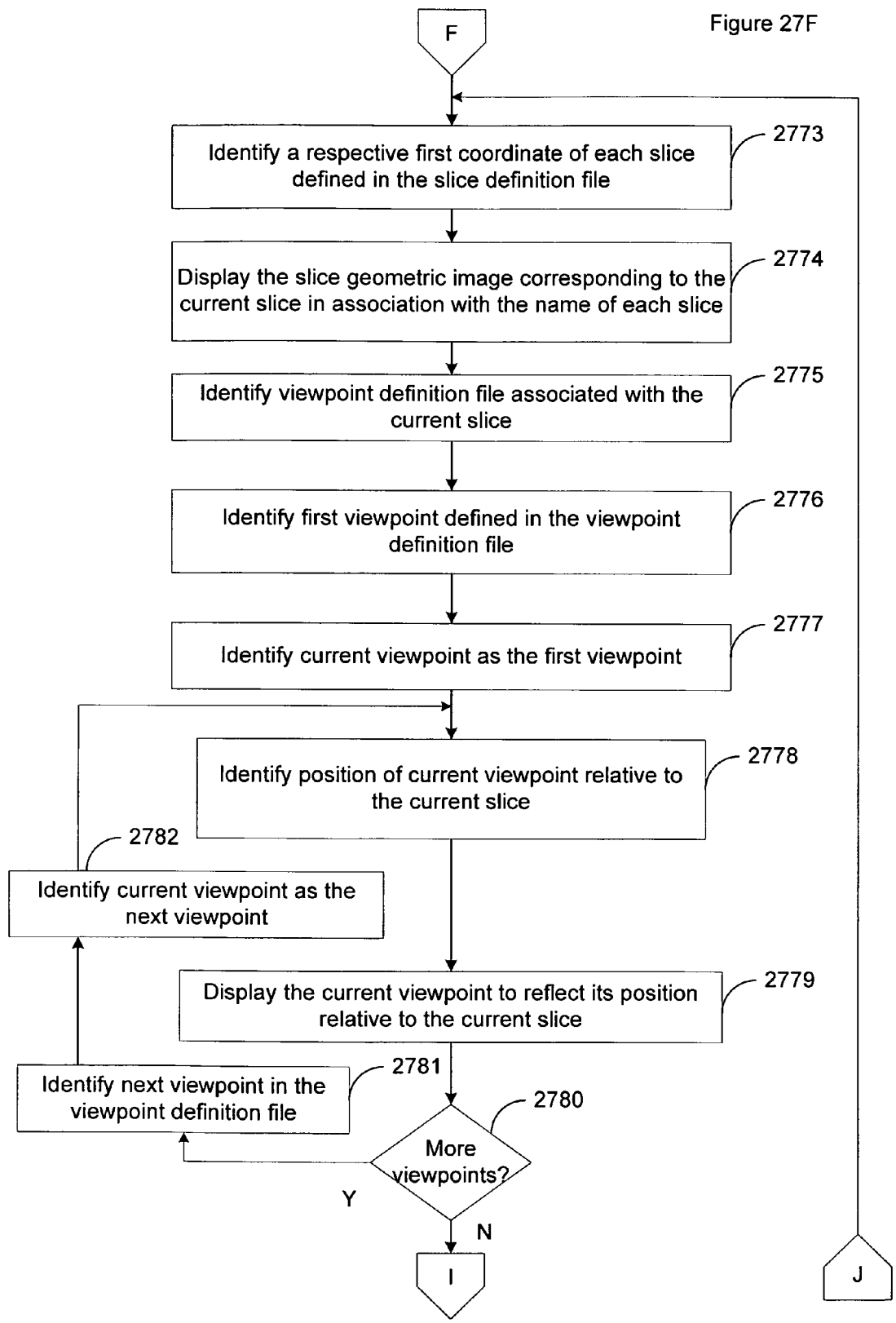

Turning to FIG. 27F, if one to the planes of the current slice is selected or if the displayed slice geometric image is selected, the image viewer 132 identifies a respective first coordinate of each slice defined in the slice definition file (step 2773) and displays the slice geometric image corresponding to the current slice in association with the first coordinate of each slice (step 2774). For example, assuming the plane 3112 in FIG. 31 is selected by the user, the image viewer 132 recognizes that the plane 3112 corresponds to the slice definition 1702*d* and has the x-axis coordinate 1704 of 200. The image viewer 132 then retrieves and displays the slice geometric image 3402 associated with the current zone and slice positioned at the 200 x-axis coordinate.

The image viewer 132 next identifies a viewpoint definition file associated with the current slice (step 2775) and identifies the first viewpoint defined in the viewpoint definition file (step 2776). The image viewer 132 then identifies the current viewpoint as the first viewpoint (step 2777). In one implementation, the image viewer identifies the viewpoint definition file 2100 based on the filename of the viewpoint definition file 2100 that incorporates the zone identifier 1338 (e.g., "z001") in the filename (e.g., "z001.gvd") as discussed above. The image viewer 132 then identifies the current viewpoint as the first viewpoint associated with the viewpoint definition 2102.

The image viewer 132 next identifies the position of the current viewpoint relative to the current slice (step 2778) and displays the current viewpoint to reflect its position relative to the current slice (step 2779). Referencing the current viewpoint definition 2102, the image viewer 132 is able to recognize the first and second coordinates 1914 and 1916 relative to two axes (e.g., y-axis 1320 and z-axis 1322) that define the position of the current viewpoint relative to the current slice (e.g., slice geometric image 3402) of the current zone (e.g., zone identified as "z001"). In the implementation shown in FIG. 34, the image viewer 132 displays a ball 3404 or 3406 at the first and second coordinates to reflect the position of the respective current viewpoint relative to the current slice 3402.

The image viewer 132 then determines whether there are more viewpoints (step 2780). If there are more viewpoints, the image viewer 132 identifies the next viewpoint in the viewpoint definition file (step 2781) and identifies the current viewpoint as the next viewpoint (step 2782) before continuing processing at step 2778 so that each viewpoint associated with the slice is displayed in association with the corresponding slice geometric image 3402.

Figure 27G:
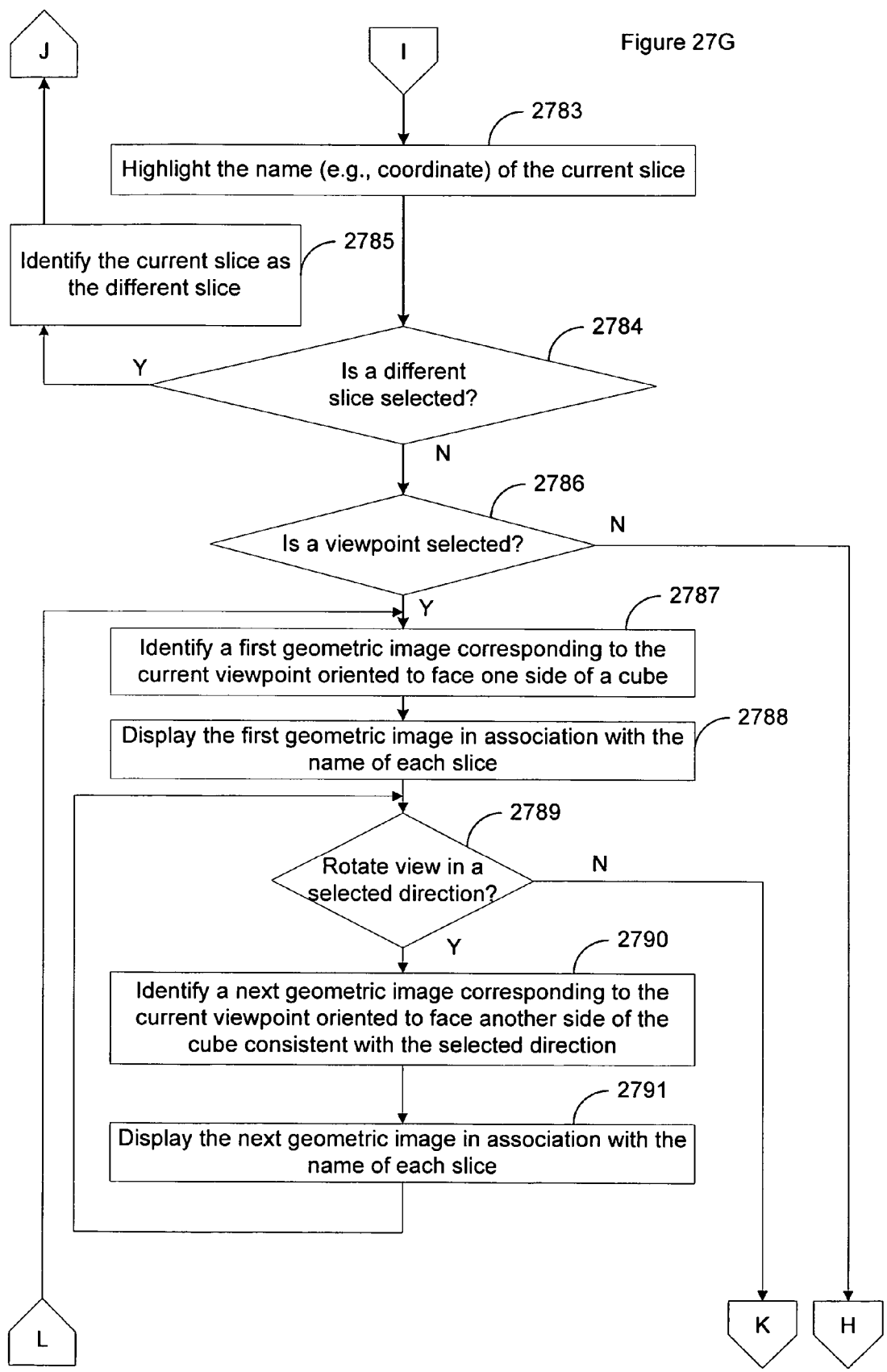
Figure 27H:
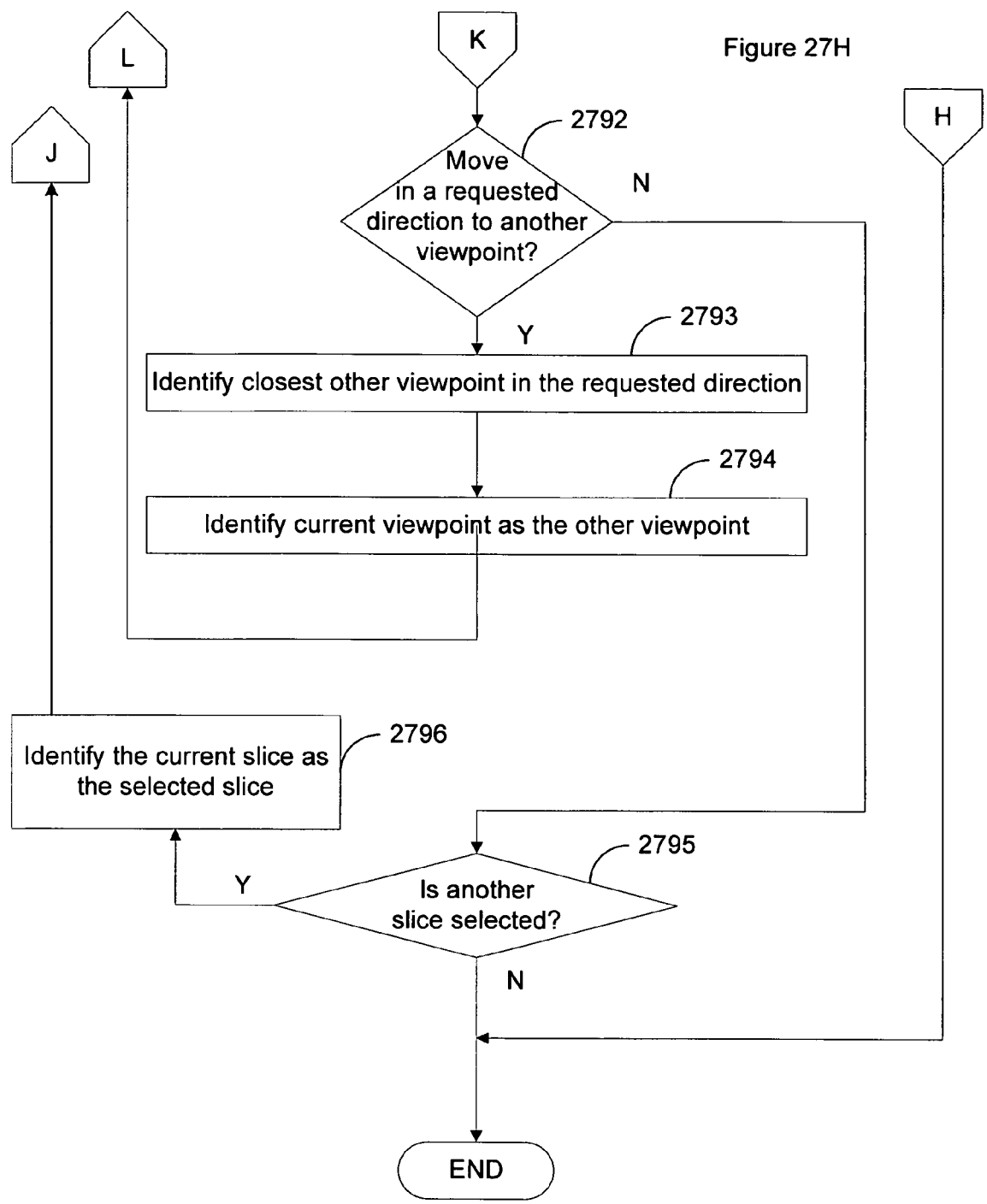

Turning to FIG. 27G, if there are no more viewpoints, the image viewer 132 highlights the name (e.g., the first coordinate 3408 in FIG. 34) of the current slice (step 2783). Thus, the image viewer 132 provides the user with an indication of which slice geometric image is currently displayed.

The image viewer 132 then determines whether a different slice is selected (step 2784). If a different slice is selected, the image viewer 132 identifies the current slice as the different slice (step 2785) and continues processing at step 2773. The user may signal the image viewer 132 that a different slice is selected via a mouse click on another slice name 3410.

Figure 35A:
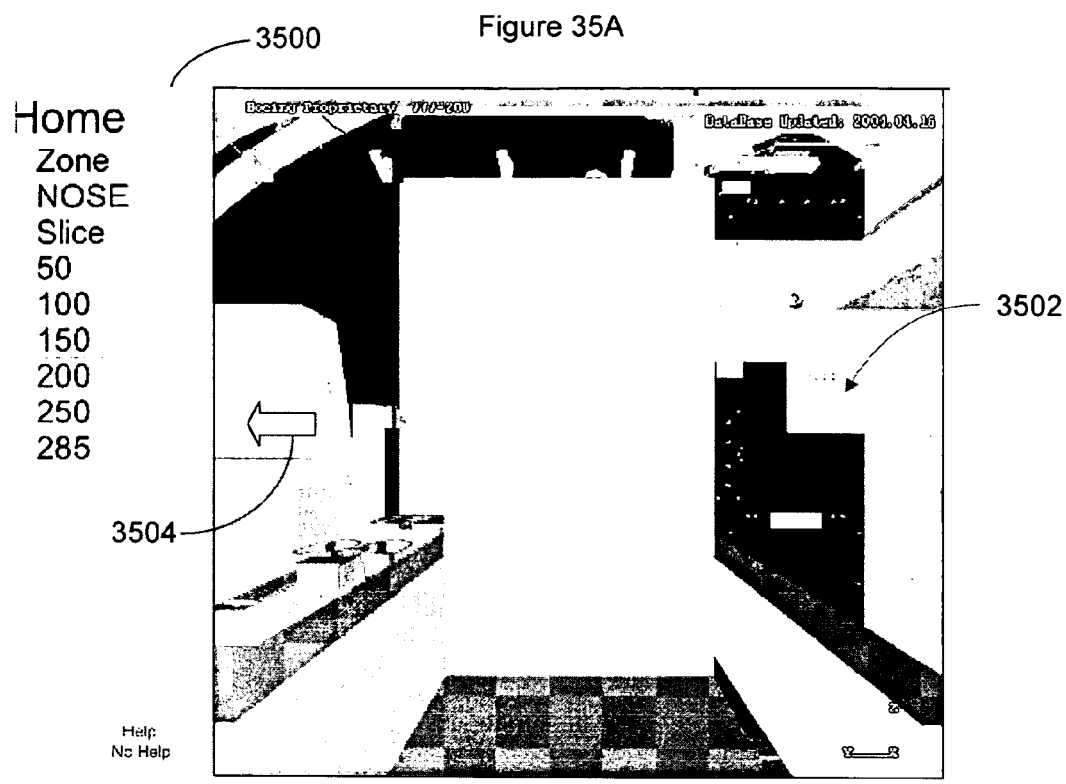
FIGS. 35A-G depict an exemplary user interface generated by the image viewer to allow a user to navigate geometric images associated with a selected viewpoint displayed in FIG. 34.
Figure 35B:
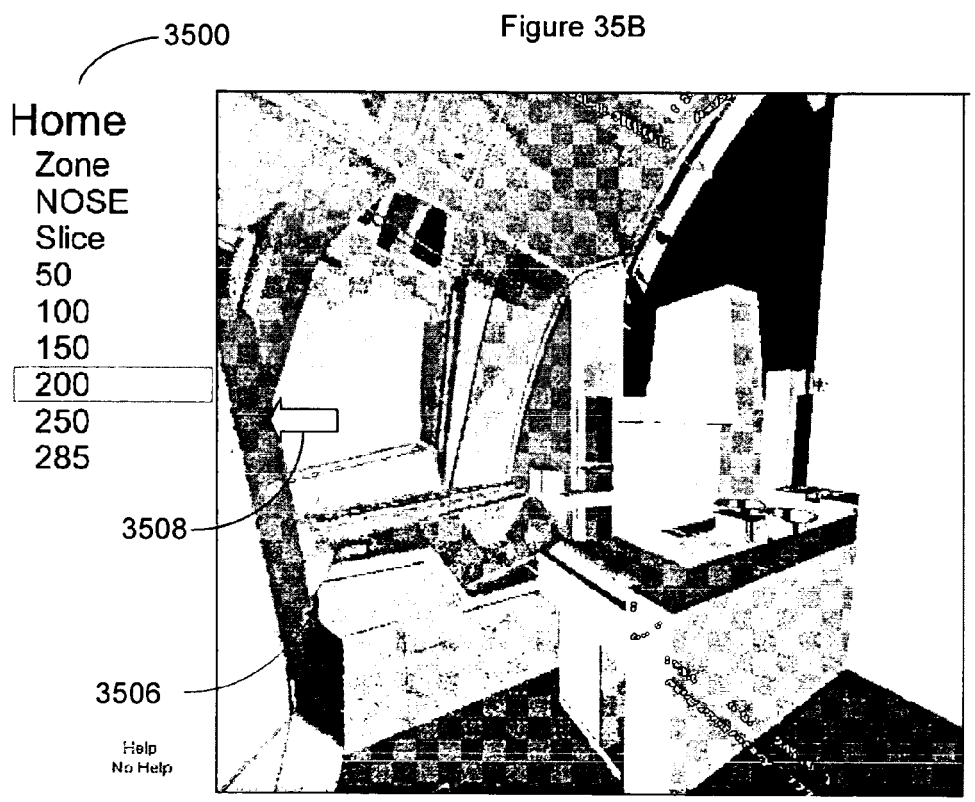
Figure 35C:
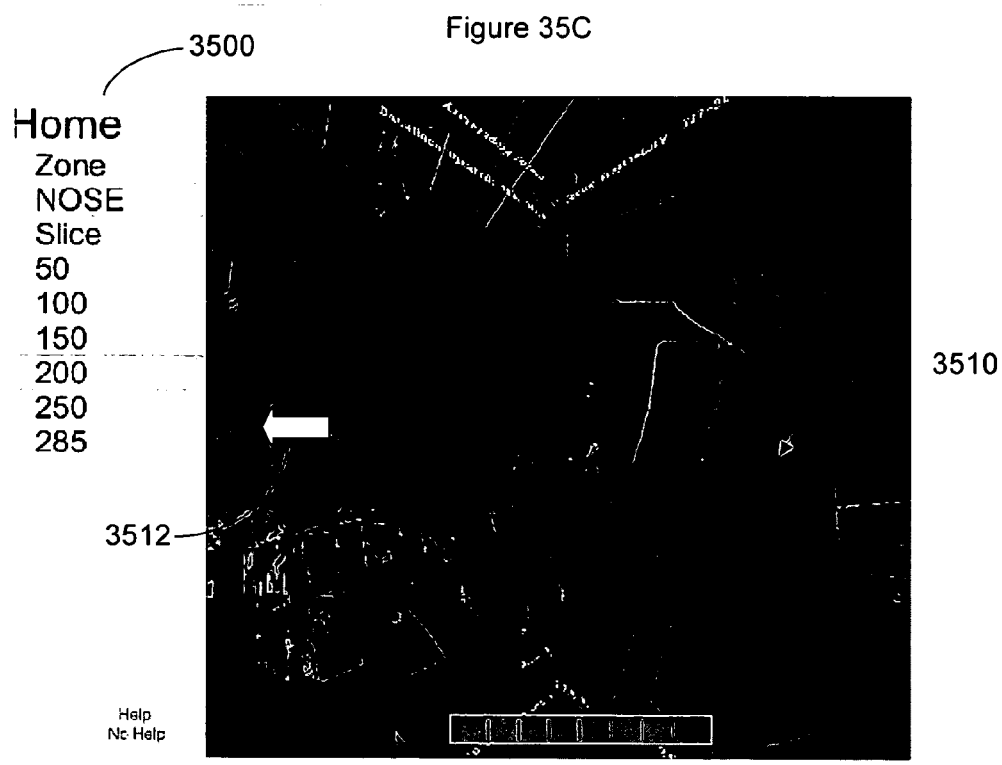
Figure 35D:
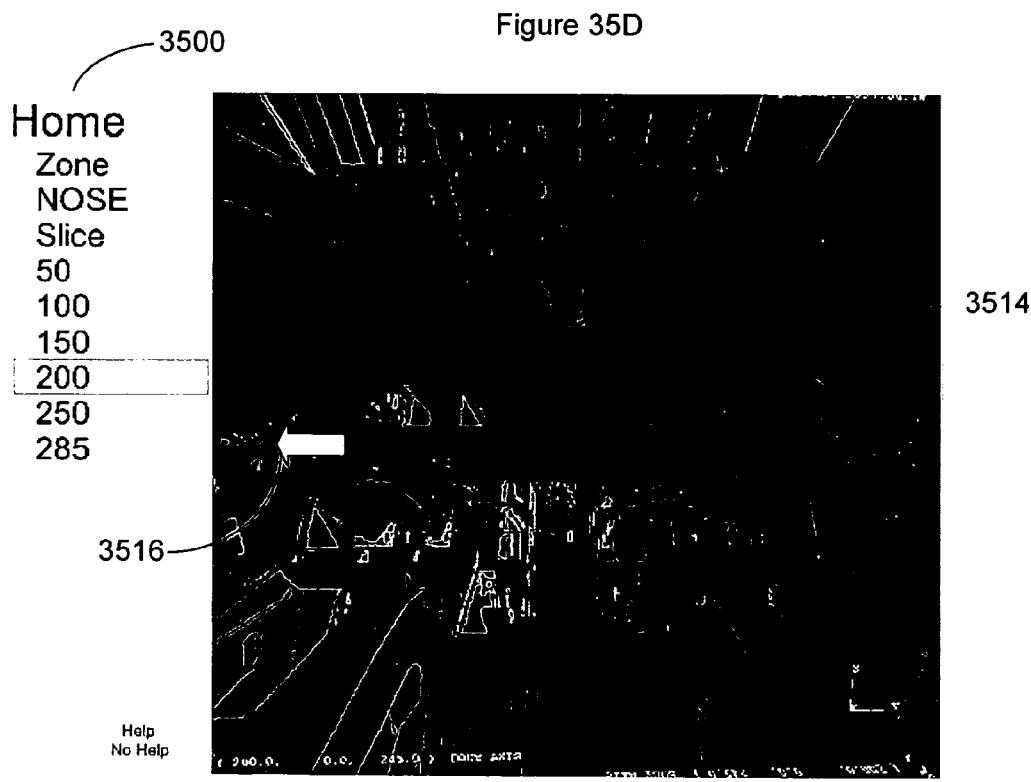
Figure 35E:
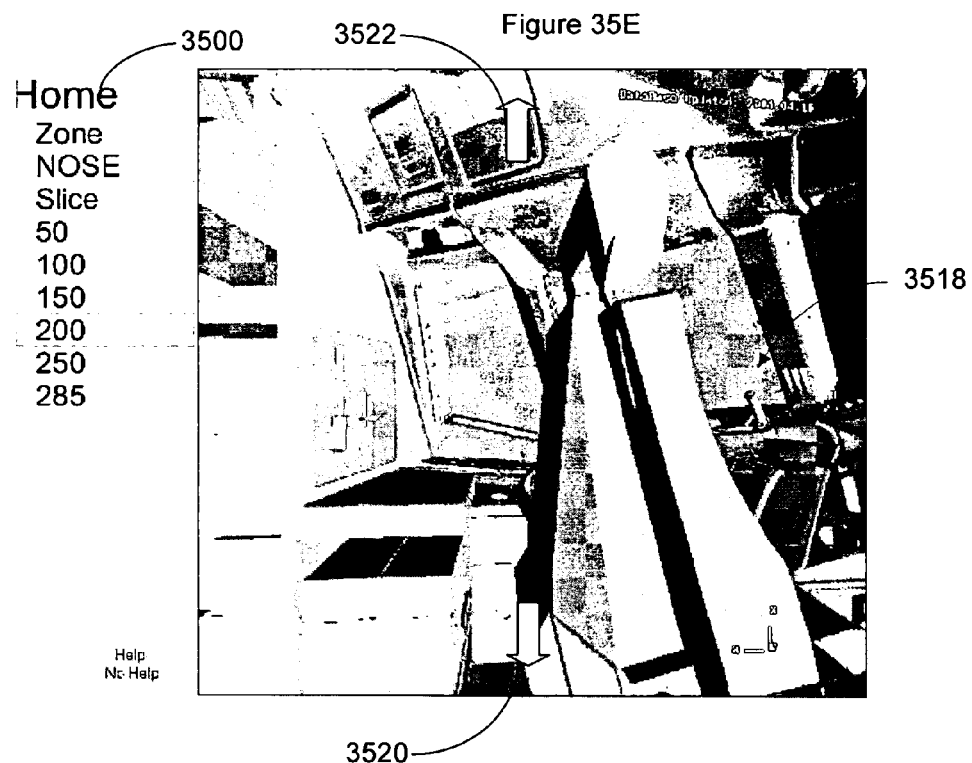
Figure 35F:
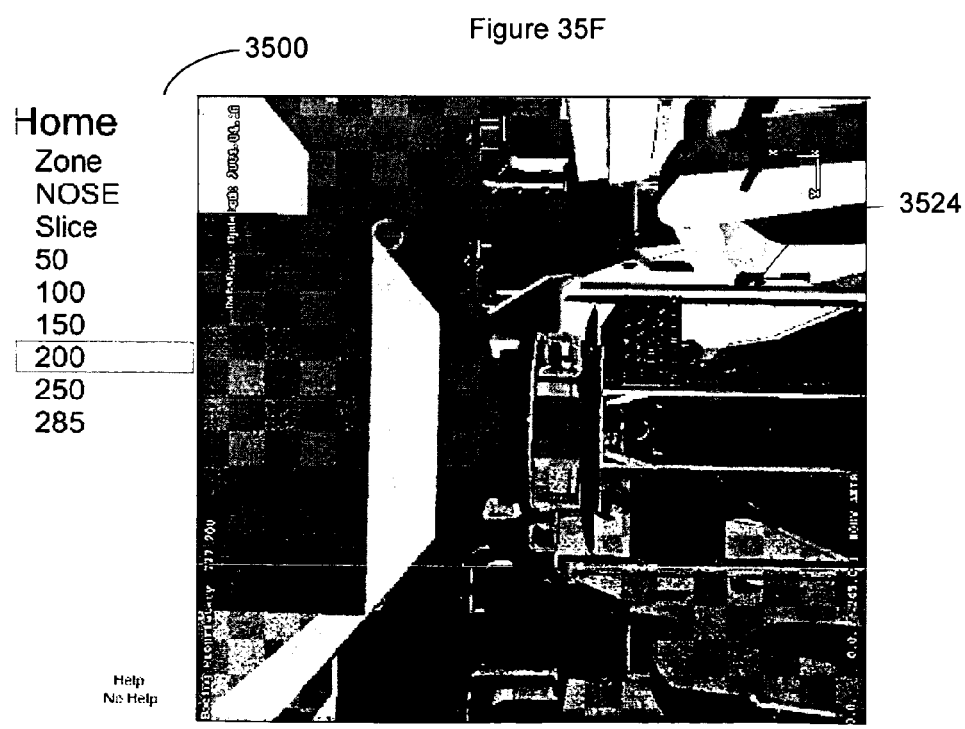
Figure 35G:
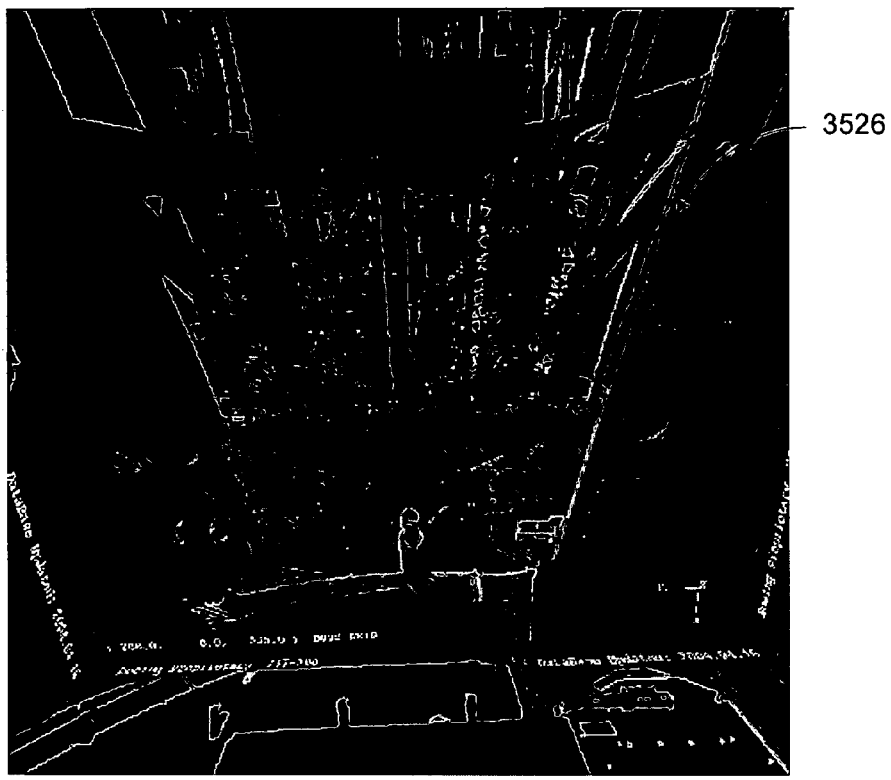

If a different slice is not selected, the image viewer 132 determines whether a viewpoint is selected (step 2786). If a viewpoint is selected, the image viewer 132 identifies a first geometric image associated with the current viewpoint (2787) and displays the first geometric image associated with the current viewpoint (2788). The user may select a viewpoint 3404 or 3406 via a mouse click or other input technique. After receiving the first pre-determined location 2602, the image viewer 132 is able to identify the third pre-determined location (e.g., "zones/z001/cubes 2550 in FIG. 25) where each of the six geometric images (e.g, images 148D-I) associated with the viewpoint 3406 are stored. FIG. 35A depicts an exemplary user interface 3500 displayed by the image viewer 134 in response to the user selecting the viewpoint 3406 in FIG. 34, where the geometric image 3502 corresponds to the first geometric image associated with the viewpoint 3406 and one face 2304 of a cubic volume 2306 generated by the image viewer 132. The image viewer 132 allows a user to navigate seamlessly from the first geometric image 3502 (e.g., "Aft" face 2304 of the cube 2306 associated with the current viewpoint 3406) to another of the six geometric images 3504, 3514, 3518, 3524, and 2526 (e.g., the "Lft," "Fro," "Rht," "Bot," and "Top" faces 2304 of the cube 2306) associated with the current viewpoint 3406.

Returning to FIG. 27G, the image viewer 132 determines whether to rotate the view in a selected direction (step 2789). If the view is to be rotated in a selected direction, the image viewer 132 identifies a next geometric image corresponding to the current viewpoint and oriented to face another side of the cube consistent with the selected direction (step 2790) and displays the next geometric image in association with the name of each slice (step 2791) before continuing processing at step 2789. The user may identify the selected direction 3506 to the image viewer 132 by moving the mouse cursor or other directional input device (such as keyboard arrow keys not shown in the figures) in the selected direction 3506. While the image viewer 132 is able to identify cursor movement in substantially all directions relative to the center of the display, FIGS. 35A-E depict one sequence of selected directions 3506, 3508, 3512, 3516, 3520, and 3522 for navigating between the six geometric images that comprise the cubic volume 2306 or 3-D scene associated with the current viewpoint 3406.

Figure 36:
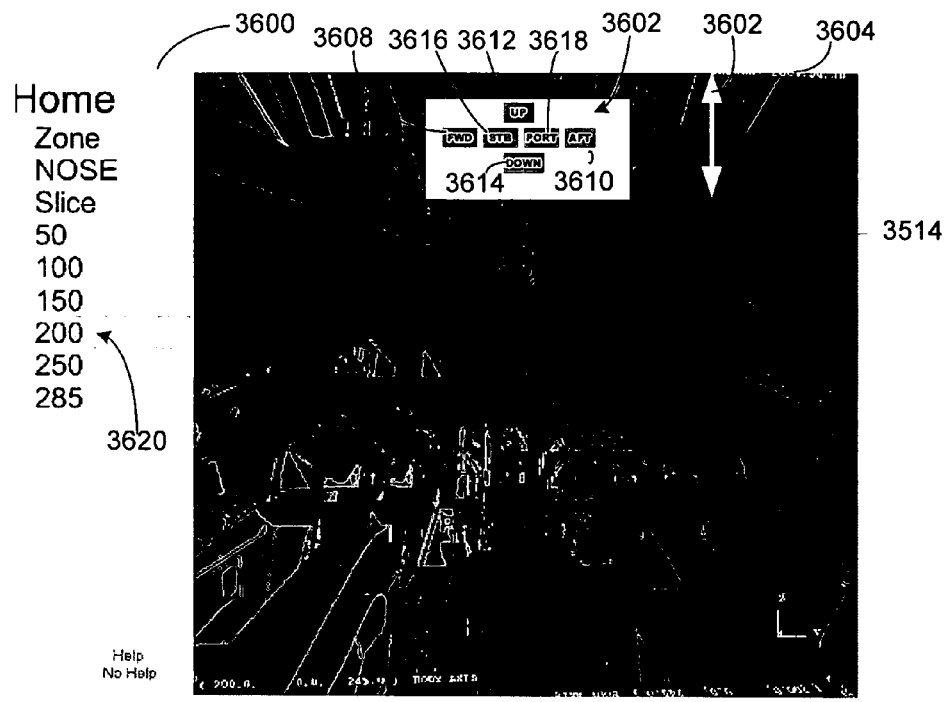
FIG. 36 depicts an exemplary user interface generated by the image viewer to allow a user to navigate from the selected viewpoint to a next closet viewpoint.

If the view is not to be rotated in a selected direction, the image viewer 132 determines whether a request has been received to move in a direction to another viewpoint (step 2792). In one implementation shown in FIG. 36, the user initiates a request to move to another viewpoint by moving the mouse within a predetermined distance 3602 of an edge 3604 of the geometric image 3514 currently being displayed by the image viewer 132, which triggers the image viewer 132 to display a panel 3606. The panel 3606 has a group of directional push buttons 3608, 3610, 3612, 3614, 3616, and 3618 that reflect a respective direction of movement (e.g., "FWD," "AFT," "UP," "DOWN," "STB" or left, and "PORT" or right) from the current viewpoint 3406. The user may select one of the directional push buttons 3608, 3610, 3612, 3614, 3616, and 3618, via a mouse click or other input technique, to request to move in the direction reflected by the one push button.

If a request is received to move in a direction to another viewpoint, the image viewer 132 identifies a closest other viewpoint in the requested direction (step 2793) and identifies the current viewpoint as the other viewpoint (step 2794) before continuing processing at step 2787. In the implementation shown in FIG. 36, after the user identifies a direction of movement by selecting one of the directional push buttons 3608, 3610, 3612, 3614, 3616, and 3618, the image viewer 132 identifies the closet other viewpoint in the direction of movement using a look-up table 3700 in FIG. 37 previously generated by the image viewer from the zone definition files 140A-N, slice definition files 142A-N associated with the zones, and the viewpoint definition files 144A-N associated with the slices of the zones. Each row 3702 in the look-up table 3700 corresponds to a respective viewpoint defined in the viewpoint definition files 144A-N. Each viewpoint row 3702 stores the zone identifier 1338 associated the viewpoint and a viewpoint index 3704 that reflects the number of the respective viewpoint (e.g., current viewpoint 3406) associated with the zone. Each viewpoint row 3702 also includes a first slice coordinate 1704 that identifies the plane of the respective slice associated with the viewpoint. Each viewpoint row 3702 further includes the first coordinate 1914 (e.g., relative to the y-axis 1320) and the second coordinate 1916 (e.g., relative to the z-axis 1322) that defines the position of the viewpoint relative to a respective slice in the zone (e.g. zone 1804).

For each viewpoint row 3702, the image viewer 132 determines the closest other viewpoint in the same slice or in an adjacent slice for each direction reflected by the selected directional push buttons 3608, 3610, 3612, 3614, 3616, and 3618. The image viewer 132 then stores in the viewpoint row 3702 the respective closest viewpoint index for each direction (e.g., "FWD," "AFT," "UP," "DOWN," "STB" or left, and "PORT" or right) from the current viewpoint corresponding to the viewpoint row 3702. In the implementation shown in FIG. 37, each viewpoint row 3702 stores a closest viewpoint "UP" 3706, a closet viewpoint "STB" 3710, a closet viewpoint "DOWN" 3712, and a closet viewpoint "PORT" 3714 in the same slice from the viewpoint position identified in the viewpoint row 3702. When a user selects the "UP" push button, "STB" push button, "DOWN" push button, or "PORT" push button, the image viewer uses the corresponding closest viewpoint 3706, 3710, 3712, and 3714 stored in the current viewpoint's row 3702 as the viewpoint index 3704 to identify the corresponding viewpoint row for the closest viewpoint in the selected direction of the same slice. In the implementation shown in FIG. 37, an index of "9999" indicates to the image viewer 132 that there are no viewpoints in the respective direction.

Each viewpoint row 3702 also stores an index for the next slice in the "AFT" direction 3716 and an index for the closet viewpoint in the next "AFT" slice 3718. Each viewpoint row 3702 further stores an index for the next slice in the "FWD" direction 3720 and an index for the closet viewpoint in the next "FWD" slice 3722.

Figure 38:
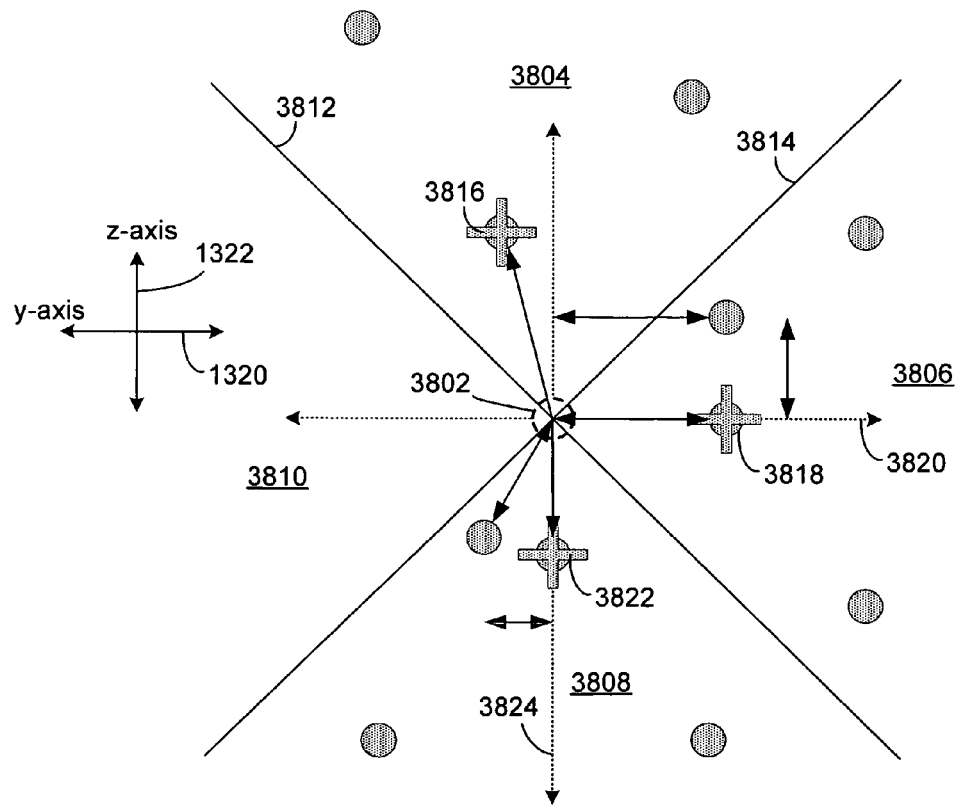
FIG. 38 depicts an exemplary diagram used by the image viewer to derive the next closet viewpoint from the selected viewpoint for each selectable direction.
Figure 39:
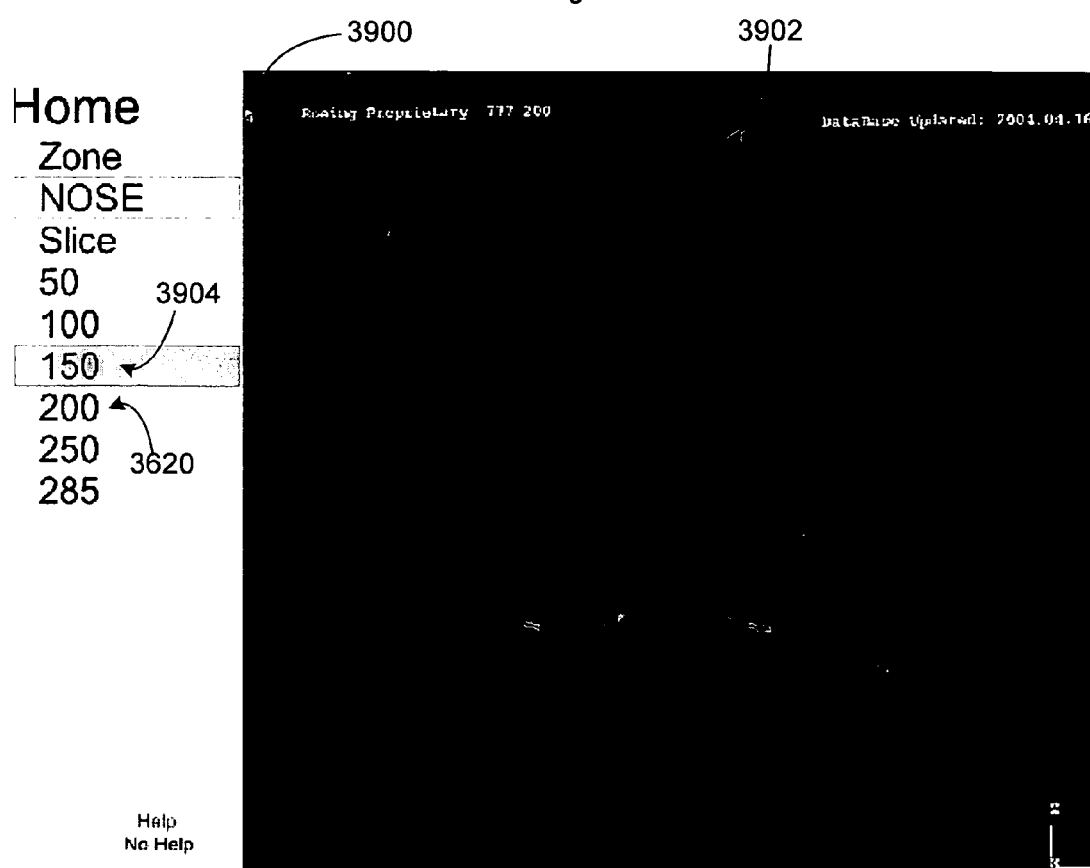
FIG. 39 depicts an exemplary user interface generated by the image viewer in response to a user request to navigate to another geometric image.

FIG. 38 depicts an exemplary diagram 3800 used by the image viewer 132 to derive the next closet viewpoint from the selected or current viewpoint 3406 for each selectable direction (e.g., "FWD," "AFT," "UP," "DOWN," "STB" or left, and "PORT" or right). As shown in the diagram 3800, the image viewer identifies the current viewpoint 3802 and divides the area surrounding the current viewpoint into four equal quadrants 3804, 3806, 3808, and 3810 using two perpendicular axis 3812 and 3814 that bisect the current viewpoint 3802 at approximately 45 degrees from axis parallel to the z-axis 1322 and the y-axis 1320. Each quadrant 3804, 3806, 3808, and 3810 encompasses other viewpoints in the same slice as the current viewpoint in a respective direction from the current viewpoint (e.g., "UP", "PORT or right", "DOWN", and "STB or left" of the current viewpoint 3802). In the example shown in FIG. 37, the image viewer 132 is able to recognize that the "STB or left" quadrant 3810 does not encompass any other viewpoints and assigns an index of "9999" as the closest viewpoint "STB" 3710 in the Table 3700 for the viewpoint row corresponding to the viewpoint 3802. The image viewer 132 is also able to recognize that viewpoint 3816 is the closest viewpoint in the "UP" quadrant 3804 to the current viewpoint 3802. The image viewer 132 is also able to recognize that the viewpoint 3818 is the closet viewpoint in the "PORT or right" quadrant 3818 to the current viewpoint 3802 and to the y-axis 3820 that bisects the current viewpoint 3802. Similarly, the image viewer 132 is also able to recognize that the viewpoint 3822 is the closest viewpoint in the "DOWN" quadrant 3808 to the current viewpoint 3802 and to the z-axis 3824 that bisects the current viewpoint 3802 perpendicular to the y-axis 3820.

If a request is not received to move in a direction to another viewpoint, the image viewer 132 determines whether another slice is selected (step 2795). In one implementation, the image viewer 132 determines that another slice is selected when the user selects the "FWD" push button 3608 or the "AFT" push button 3606 to signal the image viewer 132 to select the closest viewpoint along the x-axis (i.e., the center axis of the current viewpoint 3802 perpendicular to the y-axis 3820) in the next slice adjacent to the current slice associated with the current viewpoint 3802. In the example shown in FIG. 36, when the "FWD" push button 3608 is actuated by the user, the image viewer 130 displays user interface 3900 with the first 3902 of six geometric images corresponding to the next slice (e.g., slice 3904 at "150" along the x-axis 1318) adjacent to the current slice (e.g., slice 3620 at "200" along the x-axis 1318) in the "FWD" direction along the x-axis.

If another slice is selected, the image viewer 132 identifies the current slice as the selected slice (step 2796) and continues processing at step 2773. If another slice is not selected or a viewpoint is not selected, the image viewer 132 ends processing.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. Additionally, the described implementation includes software, such as the bus management tool, but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A method in an image processing system for defining and viewing geometry of an object model, the method comprising:
    displaying at least one view of the object model, wherein displaying at least one view comprises displaying a first view of the object relative to a second view of the object model;
    defining a zone of the object model using the at least one view, wherein defining a zone comprises receiving a plurality of dimensions of the zone corresponding to a first portion of the first view and a first portion of the second view;
    defining a slice of the object model in relation to the zone;
    defining a camera viewpoint in association with the slice so that the camera viewpoint has a position and an orientation relative to the zone;
    and generating, via the a first data processing computer, a command sequence to cause the an image generator to produce a geometric image of the object model in accordance with the camera viewpoint.

2. A method of claim 1, wherein the plurality of dimensions includes a plurality of coordinates that define a size and a position of the zone within a coordinate system associated with the object model.

3. A method of claim 1, further comprising displaying a first window over the first view to reflect the first portion of the first view associated with the zone.

4. A method of claim 3, wherein the first view is a top view of the object model.

5. A method of claim 4, wherein the top view is a top-level geometric image of the object model.

6. A method of claim 1, further comprising displaying a second window over the second view to reflect the first portion of the second view associated with the zone.

7. A method of claim 6, wherein the second view is a side view of the object model.

8. A method of claim 7, wherein the side view is a cross section geometric image of the object model.

9. A method of claim 1, the step of defining a slice comprises receiving a slice selection image boundary associated with a second portion of the second view of the zone, and displaying the slice selection image boundary over the second view to reflect the second portion relative to the zone.

10. A method of claim 9, further comprising generating another command sequence to cause the image generator to produce a cross section geometric image of the object model based on the slice selection image boundary and storing the cross section geometric image in association with a definition of the zone.

11. A method of claim 10, wherein the image processing system includes a second data processing computer connected via a network to the first processing computer, the second data processing computer having a viewer operatively configured to identify the zone definition, to display an identification of the zone based on the zone definition, and to display the cross section geometric image associated with the zone definition in response to selection of the identification.

12. A method of claim 11, further comprising generating a third command sequence to cause the image generator to produce a top-level geometric image of the object model based on the zone definition and storing the cross section geometric image in association with the zone definition, wherein the top-level geometric image reflects geometry of the zone.

13. A method of claim 12, wherein the identification is a name corresponding to the zone.

14. A method of claim 13, wherein the identification is the geometry of the zone.

15. A method of claim 11, wherein the step of defining a slice further comprises setting a first coordinate of the slice along an axis of the zone to correspond to a first distance in front of the zone in response to the selection of a corresponding option.

16. A method of claim 11, wherein the step of defining a slice further comprises setting a first coordinate of the slice along an axis of the zone to correspond to a second distance behind the zone in response to the selection of a corresponding option.

17. A method of claim 11, wherein the slice is one of a pre-determined number of slices to be defined when a corresponding option is selected, and the step of defining a slice further comprises setting a first coordinate of each of the slices so that the slices are equally spaced within and along an axis of the zone.

18. A method of claim 11, wherein the slice is one of a number of slices to be defined with the zone when a corresponding option is selected such that each slice is spaced at a pre-determined interval from an adjacent one of the slices.

19. A method of claim 11, wherein the step of defining a slice further comprises setting a first coordinate of the slice along an axis of the zone to correspond to a third distance from another axis of the zone in response to the selection of a corresponding option.

20. A method of claim 11, wherein the step of defining a slice further comprises defining a position of the slice to include a first slice coordinate along an axis of the zone, and the step of defining a camera viewpoint further comprises receiving a boundary for the slice, the slice boundary being disposed in a plane at the first slice coordinate and encompassing the camera viewpoint.

21. A method of claim 20, further comprising generating a fourth command sequence to cause the image generator to produce a slice geometric image of the object model based on the slice boundary and storing the slice geometric image in association with a definition of the slice.

22. A method of claim 21, wherein the viewer is operatively configured to identify the slice definition, to display a line in association with the cross section geometric image to reflect the position of the slice relative to the zone, and to display the slice geometric image in response to selection of the line.

23. A method of claim 22, wherein the step of defining a camera viewpoint further comprises displaying a third view of the object model corresponding to the slice, and displaying the camera viewpoint in association with the third view to reflect the camera viewpoint position relative to the slice.

24. A method of claim 23, wherein the third view corresponds to the slice geometric image.

25. A method of claim 23, wherein the step of defining a camera viewpoint further comprises receiving a position for a new camera viewpoint relative to the slice, and displaying the new camera viewpoint in association with the third view to reflect the new camera viewpoint position relative to the slice.

26. A method of claim 23, wherein the camera viewpoint is one of a plurality of viewpoints associated with the slice, and the step of defining a camera viewpoint further comprises receiving a selection of one of the plurality of viewpoints and deleting the selected one from the plurality of viewpoints.

27. A method of claim 23, wherein the step of defining a camera viewpoint further comprises receiving a new position for the camera viewpoint relative to the slice and displaying the camera viewpoint in association with the third view to reflect the new camera viewpoint position.

28. A method of claim 23, wherein the position of the camera viewpoint is within a cube having a plurality of sides, and the step of generating, via the first data processing computer, a command sequence further comprises causing the image generator to produce a plurality of geometric images of the object model from the camera viewpoint position and corresponding to the sides of the cube.

29. A method of claim 28, wherein the step of defining a slice further comprises associating a camera orientation designator with a definition of the slice and storing the slice definition in association with the zone definition, wherein the viewer is operatively configured to identify the camera orientation designator and selectively display a first of the plurality of geometric images based on the camera orientation designator.

30. A method of claim 29, wherein the step of defining a camera viewpoint further comprises associating the position of the camera viewpoint with a definition of the camera viewpoint and storing the camera viewpoint definition in association with the slice definition, wherein the viewer is operatively configured to identify the camera viewpoint definition, to display the camera viewpoint in association with the slice geometric image to reflect the camera viewpoint position, and to display the first of the plurality of geometric images in response to a selection of the camera viewpoint.

31. A method of claim 30, wherein the step of defining a slice further comprises associating the position of the camera viewpoint with a definition of the camera viewpoint and storing the camera viewpoint definition in association with the slice definition, wherein the viewer is operatively configured to identify the camera viewpoint definition, to display the camera viewpoint in association with the slice geometric image to reflect the camera viewpoint position, and to display the first of the plurality of geometric images in response to a selection of the camera viewpoint.

32. A method of claim 1, wherein the zone is a first of a plurality of zones of the object model defined using the at least one view.

33. A method of claim 32, wherein each zone definition includes a respective one of a plurality of zone identifiers, a first plurality of coordinates that identify a position of the respective zone in relation to the at least one view, a first plurality of dimensions for deriving a slice selection image boundary relative to the zone, and a second plurality of dimensions for deriving a slice image boundary orthogonal to the slice selection image boundary.

34. A method of claim 33, wherein the slice is a first of a plurality of slices of the object model defined in relation to the first zone.

35. A method of claim 34, wherein each slice definition includes a first coordinate along an axis of the first zone and a second plurality of coordinates that identify a slice camera viewpoint in a plane parallel to the respective slice.

36. A method of claim 35, wherein the camera viewpoint is one of a plurality of camera viewpoints defined in association with the first slice and each camera viewpoint definition includes the position of the respective camera viewpoint relative to the first slice.

37. A method of claim 36, further comprising:

generating a second command sequence to cause the image generator to produce a plurality of top-level geometric images of the object model based on the plurality of zone definitions, each top-level geometric image reflects geometry of a respective one of the plurality of zones and is associated with the zone identifier of the respective one of the plurality of zones;

generating a third command sequence to cause the image generator to produce a plurality of cross section geometric images of the object model, each cross section geometric image corresponding to the slice selection image boundary in a respective one of the zone definitions; and generating a fourth command sequence to cause the image generator to produce a plurality of slice geometric images of the object model, each slice geometric image corresponding to the slice boundary in a respective one of the zone definitions.

38. A method of claim 37, wherein the image processing system includes a second data processing computer connected via a network to the first processing computer, the second data processing computer having a viewer operatively configured to identify each of the zone definitions, to display each of the zone identifiers, and to display one of the plurality of top-level geometric images corresponding to a selected one of the zone identifiers.

39. A method of claim 38, wherein the viewer is operatively configured to display one of the plurality of cross section geometric images corresponding to the selected one zone identifier when the zone identifier is re-selected.

40. A method of claim 39, wherein, when the selected one zone identifier is the first zone, the viewer is operatively configured to identify each slice defined in relation to the first zone, and to display a plurality of planes in association with the one cross section geometric image such that each plane reflects the first coordinate of in a respective slice definition.

41. A method of claim 40, wherein the viewer is operatively configured to display one of the plurality of slice geometric images corresponding to a selected one of the plurality of planes.

42. A method of claim 41, wherein, when the selected one plane corresponds to the first slice, the viewer is operatively configured to identify each camera viewpoint defined in association with the first slice and to display each camera viewpoint to reflect the position of the respective camera viewpoint relative to the first slice.

43. A method of claim 42, wherein the viewer is operatively configured to display the geometric image of the object model in response to the selection of the first camera viewpoint.

44. An image processing system, comprising:
   a first data processing computer connected via a network to an image processing computer having an image generator and an object model produced using the image generator;
   means for displaying at least one view of the object model, wherein displaying at least one view comprises means for displaying a first view of the object relative to a second view of the object model;
   means for defining a zone of the object model using the at least one view, wherein the means for defining a zone comprises means for receiving a plurality of dimensions of the zone corresponding to a first portion of the first view and a first portion of the second view;
   means for defining a slice of the object model in relation to the zone;
   means for defining a camera viewpoint in association with the slice so that the camera viewpoint has a position mid an orientation relative to the zone; and
   means for generating, via the first data processing computer, a command sequence to cause the image generator to produce a geometric image of the object model in accordance with the camera viewpoint.

45. An image processing system of claim 44, wherein the plurality of dimensions includes a plurality of coordinates that define a size and a position of the zone within a coordinate system associated with the object model.

46. An image processing system of claim 44, further comprising means for displaying a first window over the first view to reflect the first portion of the first view associated with the zone.

47. An image processing system of claim 46, wherein the first view is a top-level geometric image of the object model.

48. An image processing system of claim 44, further comprising means for displaying a second window over the second view to reflect the first portion of the second view associated with the zone.

49. An image processing system of claim 48, wherein the second view is a side view of the object model.

50. An image processing system of claim 49, wherein the side view is a cross section geometric image of the object model.

51. An image processing system of claim 44, the means for defining a slice comprises means for receiving a slice selection image boundary associated with a second portion of the second view of the zone, and means for displaying the slice selection image boundary over the second view to reflect the second portion relative to the zone.

52. An image processing system of claim 51, further comprising means for generating another command sequence to cause the image generator to produce a cross section geometric image of the object model based on the slice selection image boundary and means for storing the cross section geometric image in association with a definition of the zone.

53. An image processing system of claim 52, wherein the image processing system includes a second data processing computer connected via the network to the first processing computer, the second data processing computer having a viewer operatively configured to identify the zone definition, to display an identification of the zone based on the zone definition, and to display the cross section geometric image associated with the zone definition in response to selection of the identification.

54. An image processing system of claim 53, further comprising means for generating a third command sequence to cause the image generator to produce a top-level geometric image of the object model based on the zone definition and means for storing the cross section geometric image in association with the zone definition, wherein the top-level geometric image reflects geometry of the zone.

55. An image processing system of claim 54, wherein the identification is one of a name corresponding to the zone and the geometry of the zone.

56. An image processing system of claim 53, wherein the means for defining a slice further comprises means for setting a first coordinate of the slice along an axis of the zone to correspond to a first distance in front of the zone in response to the selection of a corresponding option.

57. An image processing system of claim 53, wherein the means for defining a slice further comprises means for setting a first coordinate of the slice along an axis of the zone to correspond to a second distance behind the zone in response to the selection of a corresponding option.

58. An image processing system of claim 53, wherein the slice is one of a pre-determined number of slices to be defined when a corresponding option is selected, and the means for defining a slice further comprises means for setting a first coordinate of each of the slices so that the slices are equally spaced within and along an axis of the zone.

59. An image processing system of claim 53, wherein the slice is one of a number of slices to be defined with the zone when a corresponding option is selected such that each slice is spaced at a pre-determined interval from an adjacent one of the slices.

60. An image processing system of claim 53, wherein the means for defining a slice further comprises means for setting a first coordinate of the slice along an axis of the zone to correspond to a third distance from another axis of the zone in response to the selection of a corresponding option.

61. An image processing system of claim 53, wherein the means for defining a slice further comprises means for defining a position of the slice to include a first slice coordinate along an axis of the zone, and the means for defining a camera viewpoint further comprises means for receiving a boundary for the slice, the slice boundary being disposed in a plane at the first slice coordinate and encompassing the camera viewpoint.

62. An image processing system of claim 61, further comprising means for generating a fourth command sequence to cause the image generator to produce a slice geometric image of the object model based on the slice boundary and storing the slice geometric image in association with a definition of the slice.

63. An image processing system of claim 62, wherein the viewer is operatively configured to identify the slice definition, to display a line in association with the cross section geometric image to reflect the position of the slice relative to the zone, and to display the slice geometric image in response to selection of the line.

64. An image processing system of claim 63, wherein the means for defining a camera viewpoint further comprises means for displaying a third view of the object model corresponding to the slice, and displaying the camera viewpoint in association with the third view to reflect the camera viewpoint position relative to the slice.

65. An image processing system of claim 64, wherein the third view corresponds to the slice geometric image.

66. An image processing system of claim 64, wherein the means for defining a camera viewpoint further comprises means for receiving a position for a new camera viewpoint relative to the slice, and displaying the new camera viewpoint in association with the third view to reflect the new camera viewpoint position relative to the slice.

67. An image processing system of claim 64, wherein the camera viewpoint is one of a plurality of viewpoints associated with the slice, and the means for defining a camera viewpoint further comprises means for receiving a selection of one of the plurality of viewpoints and deleting the selected one from the plurality of viewpoints.

68. An image processing system of claim 64, wherein the means for defining a camera viewpoint further comprises means for receiving a new position for the camera viewpoint relative to the slice and displaying the camera viewpoint in association with the third view to reflect the new camera viewpoint position.

69. An image processing system of claim 64, wherein the position of the camera viewpoint is within a cube having a plurality of sides, and the means for generating, via the first data processing computer, a command sequence further comprises means for causing the image generator to produce a plurality of geometric images of the object model from the camera viewpoint position and corresponding to the sides of the cube.

70. An image processing system of claim 69, wherein the means for defining a slice further comprises means for associating a camera orientation designator with a definition of the slice and storing the slice definition in association with the zone definition, wherein the viewer is operatively configured to identify the camera orientation designator and selectively display a first of the plurality of geometric images based on the camera orientation designator.

71. An image processing system of claim 70, wherein the means for defining a camera viewpoint further comprises means for associating the position of the camera viewpoint with a definition of the camera viewpoint and storing the camera viewpoint definition in association with the slice definition, wherein the viewer is operatively configured to identify the camera viewpoint definition, to display the camera viewpoint in association with the slice geometric image to reflect the camera viewpoint position, and to display the first of the plurality of geometric images in response to a selection of the camera viewpoint.

72. An image processing system of claim 71, wherein the means for defining a slice further comprises means for associating the position of the camera viewpoint with a definition of the camera viewpoint and storing the camera viewpoint definition in association with the slice definition, wherein the viewer is operatively configured to identify the camera viewpoint definition, to display the camera viewpoint in association with the slice geometric image to reflect the camera viewpoint position, and to display the first of the plurality of geometric images in response to a selection of the camera viewpoint.

73. An image processing system of claim 44, wherein the zone is a first of a plurality of zones of the object model defined using the at least one view.

74. An image processing system of claim 73, wherein each zone definition includes a respective one of a plurality of zone identifiers, a first plurality of coordinates that identify a position of the respective zone in relation to the at least one view, a first plurality of dimensions for deriving a slice selection image boundary relative to the zone, and a second plurality of dimensions for deriving a slice image boundary orthogonal to the slice selection image boundary.

75. An image processing system of claim 74, wherein the slice is a first of a plurality of slices of the object model defined in relation to the first zone.

76. An image processing system of claim 75, wherein each slice definition includes a first coordinate along an axis of the first zone and a second plurality of coordinates that identify a slice camera viewpoint in a plane parallel to the respective slice.

77. An image processing system of claim 76, wherein the camera viewpoint is one of a plurality of camera viewpoints defined in association with the first slice and each camera viewpoint definition includes the position of the respective camera viewpoint relative to the first slice.

78. An image processing system of claim 77, further comprising:
  means for generating a second command sequence to cause the image generator to produce a plurality of top-level geometric images of the object model based on the plurality of zone definitions, each top-level geometric image reflects geometry of a respective one of the plurality of zones and is associated with the zone identifier of the respective one of the plurality of zones;
  means for generating a third command sequence to cause the image generator to produce a plurality of cross section geometric images of the object model, each cross section geometric image corresponding to the slice selection image boundary in a respective one of the zone definitions; and
  means for generating a fourth command sequence to cause the image generator to produce a plurality of slice geometric images of the object model, each slice geometric image corresponding to the slice boundary in a respective one of the zone definitions.

79. An image processing system of claim 78, wherein the image processing system includes a second data processing computer connected via the network to the first processing computer, the second data processing computer having a viewer operatively configured to identify each of the zone definitions, to display each of the zone identifiers, and to display one of the plurality of top-level geometric images corresponding to a selected one of the zone identifiers.

80. An image processing system of claim 79, wherein the viewer is operatively configured to display one of the plurality of cross section geometric images corresponding to the selected one zone identifier when the zone identifier is re-selected.

81. An image processing system of claim 80, wherein, when the selected one zone identifier is the first zone, the viewer is operatively configured to identify each slice defined in relation to the first zone, and to display a plurality of planes in association with the one cross section geometric image such that each plane reflects the first coordinate of in a respective slice definition.

82. An image processing system of claim 81, wherein the viewer is operatively configured to display one of the plurality of slice geometric images corresponding to a selected one of the plurality of planes.

83. An image processing system of claim 82, wherein, when the selected one plane corresponds to the first slice, the viewer is operatively configured to identify each camera viewpoint defined in association with the first slice and to display each camera viewpoint to reflect the position of the respective camera viewpoint relative to the first slice.

84. An image processing system of claim 83, wherein the viewer is operatively configured to display the geometric image of the object model in response to the selection of the first camera viewpoint.

85. A computer-readable medium containing instructions that cause an image processing system having an image generator controller program and a viewer program to perform a method, the image processing system having a plurality of data processing computers operatively connected to a network and an image processing computer operatively connected to the network, the image processing computer having an image generator and an object model produced by the image generator, the method comprising:
displaying at least one view of the object model, wherein displaying at least one view comprises displaying a first view of the object relative to a second view of the object model;
defining a zone of the object model using the at least one view, wherein defining a zone comprises receiving a plurality of dimensions of the zone corresponding to a first portion of the first view and a first portion of the second view;
defining a slice of the object model in relation to the zone;
defining a camera viewpoint in association with the slice so that the camera viewpoint has a position and an orientation relative to the zone; and
generating, via a first of the data processing computers, a command sequence to cause the image generator to produce a geometric image of the object model in accordance with the camera viewpoint.

86. A computer-readable medium of claim 85, wherein the zone is a first of a plurality of zones of the object model defined using the at least one view.

87. A computer-readable medium of claim 86, wherein each zone definition includes a respective one of a plurality of zone identifiers, a first plurality of coordinates that identify a position of the respective zone in relation to the at least one view, a first plurality of dimensions for deriving a slice selection image boundary relative to the zone, and a second plurality of dimensions for deriving a slice image boundary orthogonal to the slice selection image boundary.

88. A computer-readable medium of claim 87, wherein the slice is a first of a plurality of slices of the object model defined in relation to the first zone.

89. A computer-readable medium of claim 88, wherein each slice definition includes a first coordinate along an axis of the first zone and a second plurality of coordinates that identify a slice camera viewpoint in a plane parallel to the respective slice.

90. A computer-readable medium of claim 89, wherein the camera viewpoint is one of a plurality of camera viewpoints defined in association with the first slice and each camera viewpoint definition includes the position of the respective camera viewpoint relative to the first slice.

91. A computer-readable medium of claim 90, the method further comprising:
generating a second command sequence to cause the image generator to produce a plurality of top-level geometric images of the object model based on the plurality of zone definitions, each top-level geometric image reflects geometry of a respective one of the plurality of zones and is associated with the zone identifier of the respective one of the plurality of zones;
generating a third command sequence to cause the image generator to produce a plurality of cross section geometric images of the object model, each cross section geometric image corresponding to the slice selection image boundary in a respective one of the zone definitions; and
generating a fourth command sequence to cause the image generator to produce a plurality of slice geometric images of the object model, each slice geometric image corresponding to the slice boundary in a respective one of the zone definitions.

92. A computer-readable medium of claim 91, wherein the viewer program is operatively configured to identify each of the zone definitions, to display each of the zone identifiers, and to display one of the plurality of top-level geometric images corresponding to a selected one of the zone identifiers.

93. A computer-readable medium of claim 92, wherein the viewer program is operatively configured to display one of the plurality of cross section geometric images corresponding to the selected one zone identifier when the zone identifier is re-selected.

94. A computer-readable medium of claim 93, wherein, when the selected one zone identifier is the first zone, the viewer program is operatively configured to identify each slice defined in relation to the first zone, and to display a plurality of planes in association with the one cross section geometric image such that each plane reflects the first coordinate of in a respective slice definition.

95. A computer-readable medium of claim 94, wherein the viewer program is operatively configured to display one of the plurality of slice geometric images corresponding to a selected one of the plurality of planes.

96. A computer-readable medium of claim 95, wherein, when the selected one plane corresponds to the first slice, the viewer program is operatively configured to identify each camera viewpoint defined in association with the first slice and to display each camera viewpoint to reflect the position of the respective camera viewpoint relative to the first slice.

97. A computer-readable medium of claim 96, wherein the viewer program is operatively configured to display the geometric image of the object model in response to the selection of the first camera viewpoint.

98. A method in an image processing system for viewing geometry of an object model, the method comprising:
providing a data processing computer with access to a zone definition, slice definitions associated with the zone definition, and viewpoint definitions associated with the slice definitions, wherein the data processing computer is a first of a pluraliw of data processing computers on a network, and each of the plurality of data processing computers is provided access to the zone definition, the slice definitions, and the viewpoint definitions;
receiving, via the data processing computer, an indication of a first of the viewpoint definitions associated with one of the slice definitions;
identifying, via the data processing computer, a first of the geometric images corresponding to the first viewpoint definition; and
displaying the first geometric image on the data processing computer.

99. A method of claim 98, further comprising
determining whether a request has been received to rotate geometry in view in a selected direction;
when it is determined that a request has been received to rotate geometry in view in a selected direction,
identifying a next geometric image corresponding to the first viewpoint definition and consistent with the selected direction; and
displaying the next geometric image on the data processing computer.

100. A method of claim 98, further comprising
determining whether a request has been received to move in a direction to another viewpoint;
when it is determined that a request has been received to move in a direction to another viewpoint,
identifying another viewpoint closest to the first viewpoint in the requested direction, the other viewpoint corresponding to another of the viewpoint definitions associated with the one slice definition;
identifying a second of the geometric images corresponding to the other viewpoint definition; and
displaying the second geometric image on the data processing computer.

101. A method of claim 98, further comprising:
determining whether a request has been received to move in a direction to another viewpoint associated with another slice;
when it is determined that a request has been received to move in a direction to another viewpoint associated with another slice,
identifying another slice adjacent to the first viewpoint in the requested direction, the other slice corresponding to a second of the slice definitions;
identifying another viewpoint closest to the first viewpoint, the other viewpoint corresponding to another of the viewpoint definitions associated with the second slice definition;
identifying a third of the geometric images corresponding to the other viewpoint definition associated with the second slice definition; and
displaying the third geometric image on the data processing computer.

102. A method of claim 98, wherein the step of displaying the first geometric image on the data processing computer further comprises displaying the first geometric image in association with a plurality of slice identifications corresponding to the slice definitions, and further comprising:
determining whether one of the slice identifications has been selected;
when it is detennined that one of the slice identifications has been selected,
identifying a slice geometric image from among the geometric images that corresponds to the selected slice; and
displaying the slice geometric image on the data processing computer.

103. A method of claim 102, wherein the step of displaying the slice geometric image further comprises:
identifying each viewpoint definition associated with the selected slice;
displaying each viewpoint associated with the selected slice to reflect the position of the respective viewpoint relative to the slice geometric image.

104. A method of claim 98, wherein the zone definition is a first of a plurality of zone definitions used to generate a plurality of geometric images, and the step of receiving an indication of a first of the viewpoint definitions further comprises:
identifying, via the data processing computer, each zone definition;
displaying a plurality of zone identifications associated with the zone definitions;
determining whether one of the zone identifications has been selected;
when it is determined that one of the zone identifications has been selected,
identifying one of the geometric images as a top-level geometric image corresponding to the selected zone identification; and
displaying the top-level geometric image on the data processing computer.

105. A method of claim 104, wherein the top-level geometric image reflects geometry of the zone corresponding to the selected zone identification, further comprising:
determining whether the geometry of the zone has been selected;
when it is determined that the geometry of the zone has been selected,
identifying another of the geometric images as a cross-section geometric image corresponding to the selected zone identification; and
displaying the cross section geometric image on the data processing computer.

106. A method of claim 104, further comprising:
determining whether the selected zone identification has been re-selected;
when it is determined that the selected zone identification has been re-selected,
identifying another of the geometric images as a cross-section geometric image corresponding to the selected zone identification; and
displaying the cross section geometric image on the data processing computer.

107. A method of claim 105, further comprising:
determining whether the selected zone identification corresponds to the first zone definition;
when the selected zone identification corresponds to the first zone definition,
identifying each slice definition associated with the first zone definition; and displaying a plurality of planes in association with the cross section geometric image such that each plane reflects each slice of the first zone.

108. A method of claim 107, further comprising:
determining whether one of the planes is selected;
when it is detennined that one of the planes is selected, identifying a slice geometric image from among the geometric images that corresponds to the selected plane; and
displaying the slice geometric image on the data processing computer.

109. A method of claim 108, wherein the step of displaying the slice geometric image further comprises:
identifying each viewpoint definition associated with the selected plane;
displaying each viewpoint associated with the selected plane to reflect the position of the respective viewpoint relative to the slice geometric image.

110. A method of claim 108, wherein the step of receiving an indication of a first of the viewpoint definitions further comprises receiving a selection of the displayed first viewpoint.

111. An image processing system, comprising:
a storage haying a plurality of zone definitions of an object model produced using an image generator hosted on an image processing computer, a plurality of slice definitions associated with the zone definitions and a plurality of viewpoint definitions associated the slice definitions, the storage further having a plurality of geometric images of the object model produced using an image generator in accordance with the zone definitions, the slice definitions, and the viewpoint definitions; and
a data processing computer including a memory having an image viewer program that identifies each zone from the zone definitions, displays a respective identifier for each of the zones, determines whether one of the zone identifiers has been selected; when it is determined that one of the zone identifiers has been selected, identifies one of the geometric images as a top-level geometric image corresponding to the selected zone identifier; and displays the top-level geometric image, the data processing computer further including a processor to run the image viewer program.

112. An image processing system of claim 111, wherein the top-level geometric image reflects geometry of the zone corresponding to the selected zone identifier, and the image viewer program further determines whether the geometry of the zone has been selected, when it is determined that the geometry of the zone has been selected, identifies another of the geometric images as a cross-section geometric image corresponding to the selected zone identifier, and displays the cross section geometric image.

113. An image processing system of claim 111, wherein the image viewer program further determines whether the selected zone identifier has been re-selected, when it is detennined that the selected zone identifier has been re-selected, identifies another of the geometric images as a cross-section geometric image corresponding to the selected zone identifier, and displays the cross section geometric image.

114. An image processing system of claim 113, wherein, when the selected zone identifier has been reselected, the image viewer program further identifies each slice definition associated with the selected zone identifier, and displays a plurality of planes in association with the cross section geometric image such that each plane reflects each slice of the selected zone.

115. An image processing system of claim 114, wherein the image viewer program further determines whether one of the planes is selected, when it is determined that one of the planes is selected, identifies a slice geometric image from among the geometric images that corresponds to the selected plane, and displays the slice geometric image.

116. An image processing system of claim 115, wherein, when it is detennined that one of the planes is selected, the image viewer program further identifies each viewpoint definition associated with the selected plane and displays each viewpoint associated with the selected plane to reflect the position of the respective viewpoint relative to the slice geometric image.

117. An image processing system of claim 116, wherein the image viewer program further determines whether one of the displayed viewpoints associated with the selected plane has been selected, when it is determined that one of the displayed viewpoints has been selected, identifies a first of the geometric images that corresponds to the selected viewpoint, and displays the first geometric image.

118. An image processing system of claim 117, wherein the image viewer program further determines whether a request has been received to rotate geometry in view in a selected direction, when it is determined that a request has been received to rotate geometry in view in a selected direction, identifies a next geometric image corresponding to the selected viewpoint and consistent with the selected direction, and displays the next geometric image.

119. An image processing system of claim 117, wherein the image viewer program further determines whether a request has been received to move in a direction to another viewpoint, when it is determined that a request has been received to move in a direction to another viewpoint, identifies another viewpoint closest to the selected viewpoint in the requested direction, the other viewpoint corresponding to another of the viewpoint definitions associated with the selected plane, identifies a second of the geometric images corresponding to the other viewpoint definition, and displays the -second geometric image.

120. An image processing system of claim 117, wherein the image viewer program further determines whether a request has been received to move in a direction to another viewpoint associated with another slice, when it is determined that a request has been received to move in a direction to another viewpoint associated with another slice, identifies another slice adjacent to the selected viewpoint in the requested direction, the other slice corresponding to a second of the slice definitions, identifies another viewpoint closest to the first viewpoint, the other viewpoint corresponding to another of the viewpoint definitions associated with the second slice definition, identifies a third of the geometric images corresponding to the other viewpoint definition associated with the second slice definition, and displays the third geometric image.

121. An image processing system of claim 117, wherein the image viewer program further displays the first geometric image in association with a plurality of slice identifications corresponding to the slice definitions, determines whether one of the slice identifications has been selected, when it is determined that one of the slice identifications has been selected, identifies another slice geometric image from among the geometric images that corresponds to the selected slice; and displays the other slice geometric image.

122. A computer-readable medium containing instructions that cause an image processing system having a viewer program to perform a method, the image processing system having a plurality of zone definitions of an object model produced using an image generator hosted on an image processing computer, a plurality of slice definitions associated with the zone definitions, a plurality of viewpoint definitions associated the slice definitions, and a plurality of geometric images of the object model produced using an image generator in accordance with the zone definitions, the slice definitions, and the viewpoint definitions, the method comprising:
   identifying each zone from the zone definitions;
   displaying a respective identifier for each of the zones;
   determining whether one of the zone identifiers has been selected;
   when it is determined that one of the zone identifiers has been selected,
      identifying one of the geometric images as a top-level geometric image corresponding to the selected zone identifier; and
      displaying the top-level geometric image.

123. A computer-readable medium of claim 122, wherein the top-level geometric image reflects geometry of the zone corresponding to the selected zone identifier, and the method further comprises:
   determining whether the geometry of the zone has been selected,
   when it is determined that the geometry of the zone has been selected,
      identifying another of the geometric images as a cross-section geometric image corresponding to the selected zone identifier, and
      displaying the cross section geometric image.

124. A computer-readable meditun of claim 123, wherein the method further comprises:
   determining whether the selected zone identifier has been re-selected,
   when it is determined that the selected zone identifier has been re-selected,
      identifying another of the geometric images as a cross-section geometric image corresponding to the selected zone identifier;
      and displaying the cross section geometric image.

125. A computer-readable medium of claim 124, wherein the step of displaying the cross section geometric image further comprises:
   identifying each slice definition associated with the selected zone identifier; and
   displaying a plurality of planes in association with the cross section geometric image such that each plane reflects each slice of the selected zone.

126. A computer-readable medium of claim 125, wherein the method further comprises:
   determining whether one of the planes is selected;
   when it is determined that one of the planes is selected,
      identifying a slice geometric image from among the geometric images that corresponds to the selected plane, and
      displaying the slice geometric image.

127. A computer-readable medium of claim 126, wherein the method further comprises:
   when it is determined that one of the planes is selected, identifying each viewpoint definition associated with the selected plane, and displaying each viewpoint associated with the selected plane to reflect the position of the respective viewpoint relative to the slice geometric image.

128. A computer-readable medium of claim 127, wherein the method further comprises: determining whether one of the displayed viewpoints associated with the selected plane has been selected, when it is determined that one of the displayed viewpoints has been selected, identifying a first of the geometric images that corresponds to the selected viewpoint, and displaying the first geometric image.

129. A computer-readable medium of claim 128, wherein the method further comprises: determining whether a request has been received to rotate geometry in view in a selected direction, when it is determined that a request has been received to rotate geometry in view in a selected direction, identifying a next geometric image corresponding to the selected viewpoint and consistent with the selected direction, and displaying the next geometric image.

130. A computer-readable medium of claim 128, wherein the method further comprises: determining whether a request has been received to move in a direction to another viewpoint;
   when it is determined that a request has been received to move in a direction to another viewpoint,
      identifying another viewpoint closest to the selected viewpoint in the requested direction, the other viewpoint corresponding to another of the viewpoint definitions associated with the selected plane;
      identifying a second of the geometric images corresponding to the other viewpoint definition; and
      displaying the second geometric image.

131. A computer-readable medium of claim 128, wherein the method further comprises:
   determining whether a request has been received to move in a direction to another viewpoint associated with another slice,
   when it is determined that a request has been received to move in a direction to another viewpoint associated with another slice,
      identifying another slice adjacent to the selected viewpoint in the requested direction, the other slice corresponding to a second of the slice definitions;
      identifying another viewpoint closest to the first viewpoint, the other viewpoint corresponding to another of the viewpoint definitions associated with the second slice definition;
      identifyiiig a third of the geometric images corresponding to the other viewpoint definition associated with the second slice definition; and
      displaying the third geometric image.

132. A computer-readable medium of claim 128, wherein the method further comprises:
   displaying the first geometric image in association with a plurality of slice identifications corresponding to the slice definitions;
   determining whether one of the slice identifications has been selected;
   when it is determined that one of the slice identifications has been selected,
      identifying another slice geometric image from among the geometric images that corresponds to the selected slice; and
      displaying the other slice geometric image.

* * * * *